United States Patent [19]

Fujisawa et al.

[11] Patent Number: 5,852,597
[45] Date of Patent: Dec. 22, 1998

[54] RECORDING MEDIUM REPRODUCING APPARATUS ACCOMMODATING A PLURALITY OF RECORDING MEDIA AND HAVING A REDUCED HEIGHT

[75] Inventors: Shinichi Fujisawa, Akiruno; Takashi Takemoto, Sagamihara, both of Japan

[73] Assignee: Teac Corporation, Tokyo, Japan

[21] Appl. No.: 802,235

[22] Filed: Feb. 19, 1997

[30] Foreign Application Priority Data

Feb. 20, 1996 [JP] Japan ................................. 8-032328
Jun. 3, 1996 [JP] Japan ................................. 8-140401

[51] Int. Cl.$^6$ ............................ G11B 17/04; G11B 17/22
[52] U.S. Cl. ............................... 369/192; 369/34; 369/38
[58] Field of Search .................................. 369/36, 37, 38, 369/192, 270

[56] References Cited

U.S. PATENT DOCUMENTS

| | | | |
|---|---|---|---|
| 4,701,899 | 10/1987 | D'Alayer De Costemor D'Arc | 369/36 |
| 4,833,552 | 5/1989 | Agostini et al. | 360/92 |
| 5,187,695 | 2/1993 | Schindler et al. | 369/37 |
| 5,226,032 | 7/1993 | Ikedo et al. | 369/178 |
| 5,508,994 | 4/1996 | Nakamichi et al. | 369/192 |

*Primary Examiner*—Stuart S. Levy
*Assistant Examiner*—Tod Kupstas
*Attorney, Agent, or Firm*—Michael N. Meller

[57] ABSTRACT

A recording medium reproducing apparatus which has a reduced height as compared to the conventional recording medium reproducing apparatus of the same type. The recording medium reproducing apparatus reproduces a selected one of a plurality of recording media accommodated therein. A recording medium reproducing unit reproduces one of the recording media. A recording medium accommodating unit has a plurality of recording medium accommodating sections each accommodating one of the recording media. A recording medium conveying mechanism conveys the recording media between the recording medium reproducing unit and the recording medium accommodating unit. A recording medium reproducing unit supporting mechanism rotatably supports the recording medium reproducing unit. A recording medium accommodating unit supporting mechanism rotatably supports the recording medium accommodating unit. A rotating mechanism rotates both the recording medium reproducing unit and the recording medium accommodating unit when one of the recording medium is conveyed between the recording medium reproducing unit and the recording medium accommodating unit so that the recording medium reproducing unit is substantially aligned with one of the recording medium accommodating sections.

6 Claims, 66 Drawing Sheets

FIG. 3C    FIG. 3A
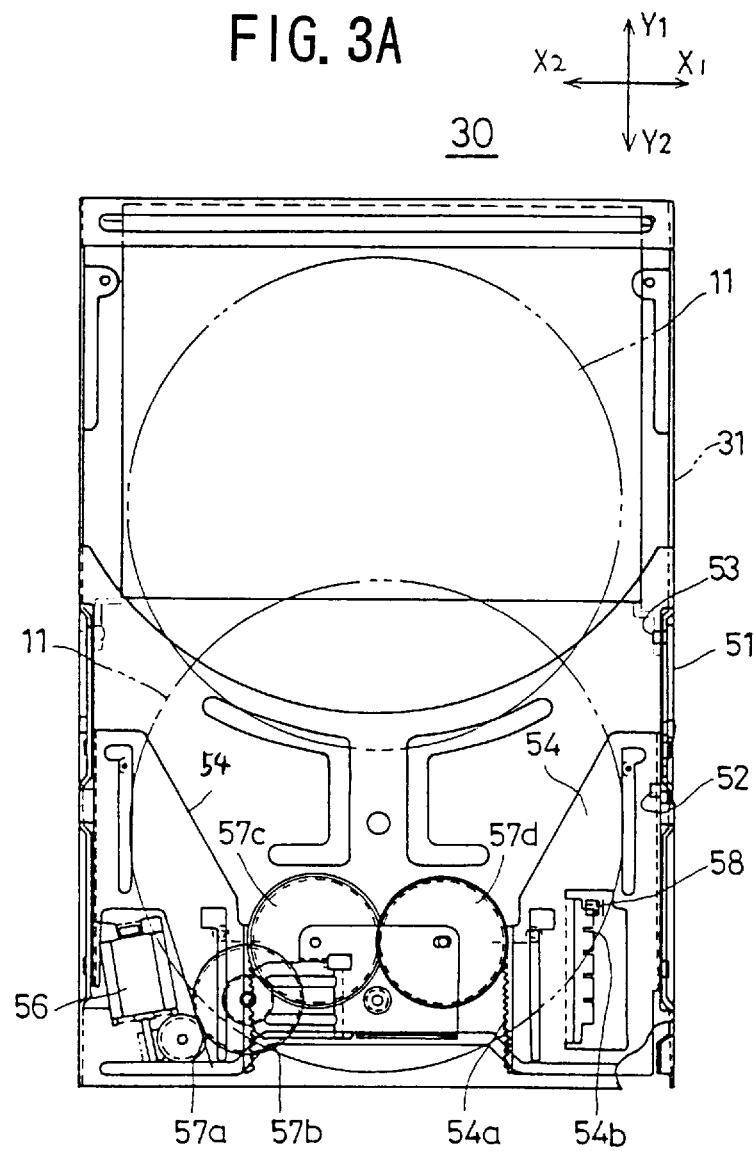
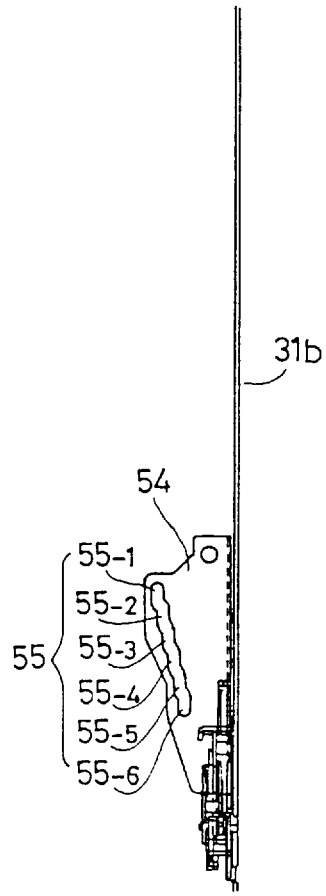
FIG. 3B
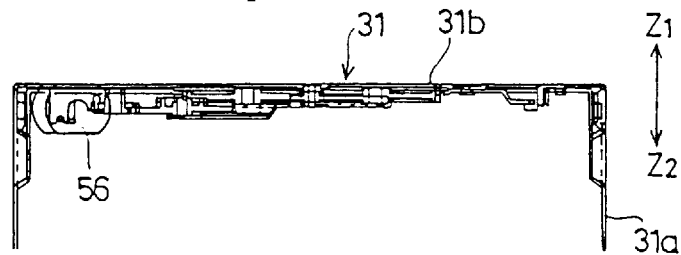

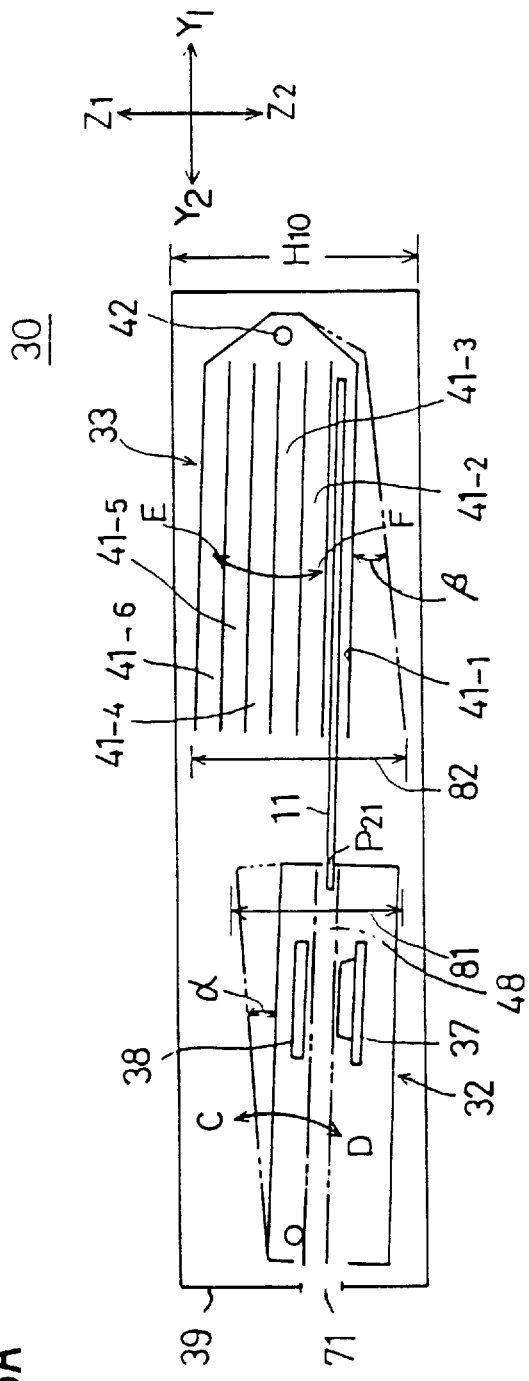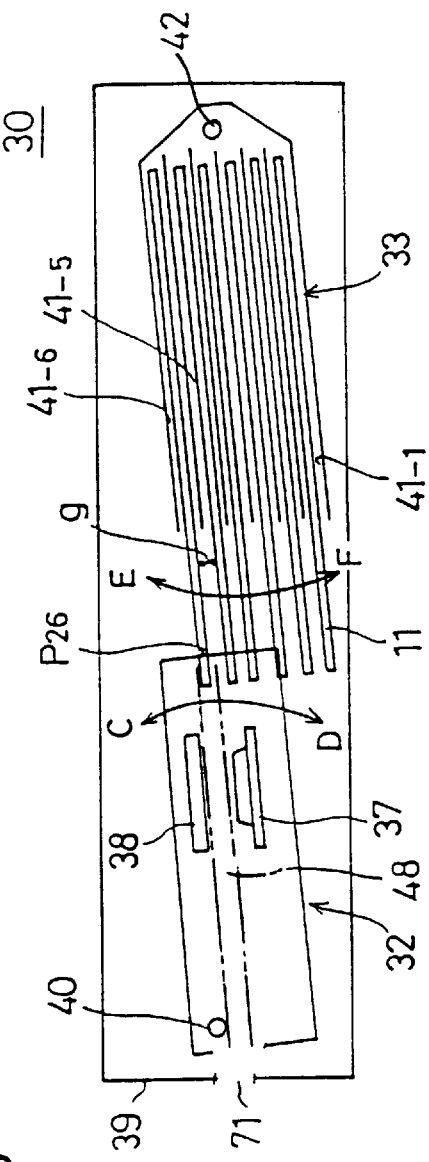
FIG. 8A
FIG. 8B

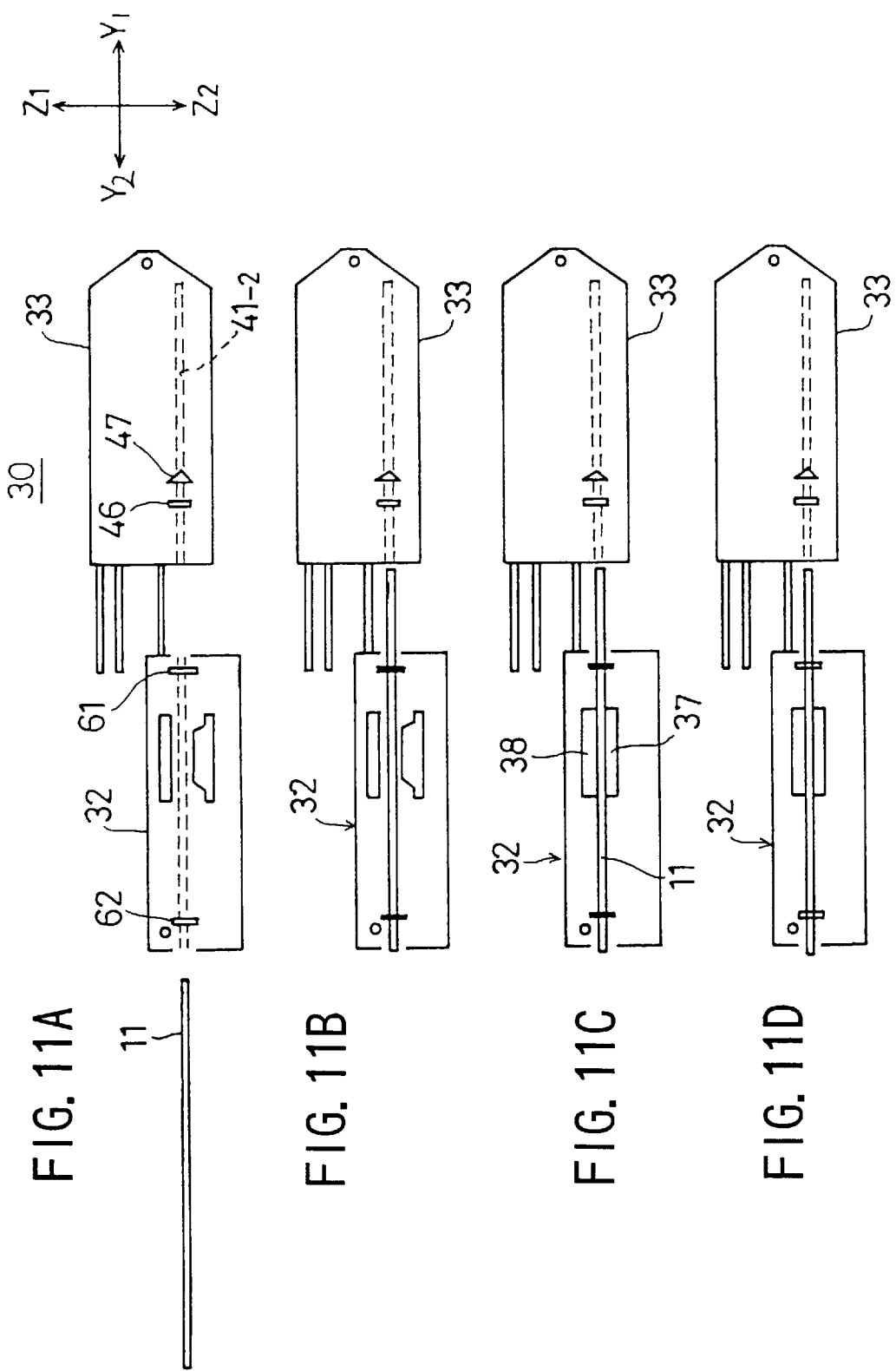

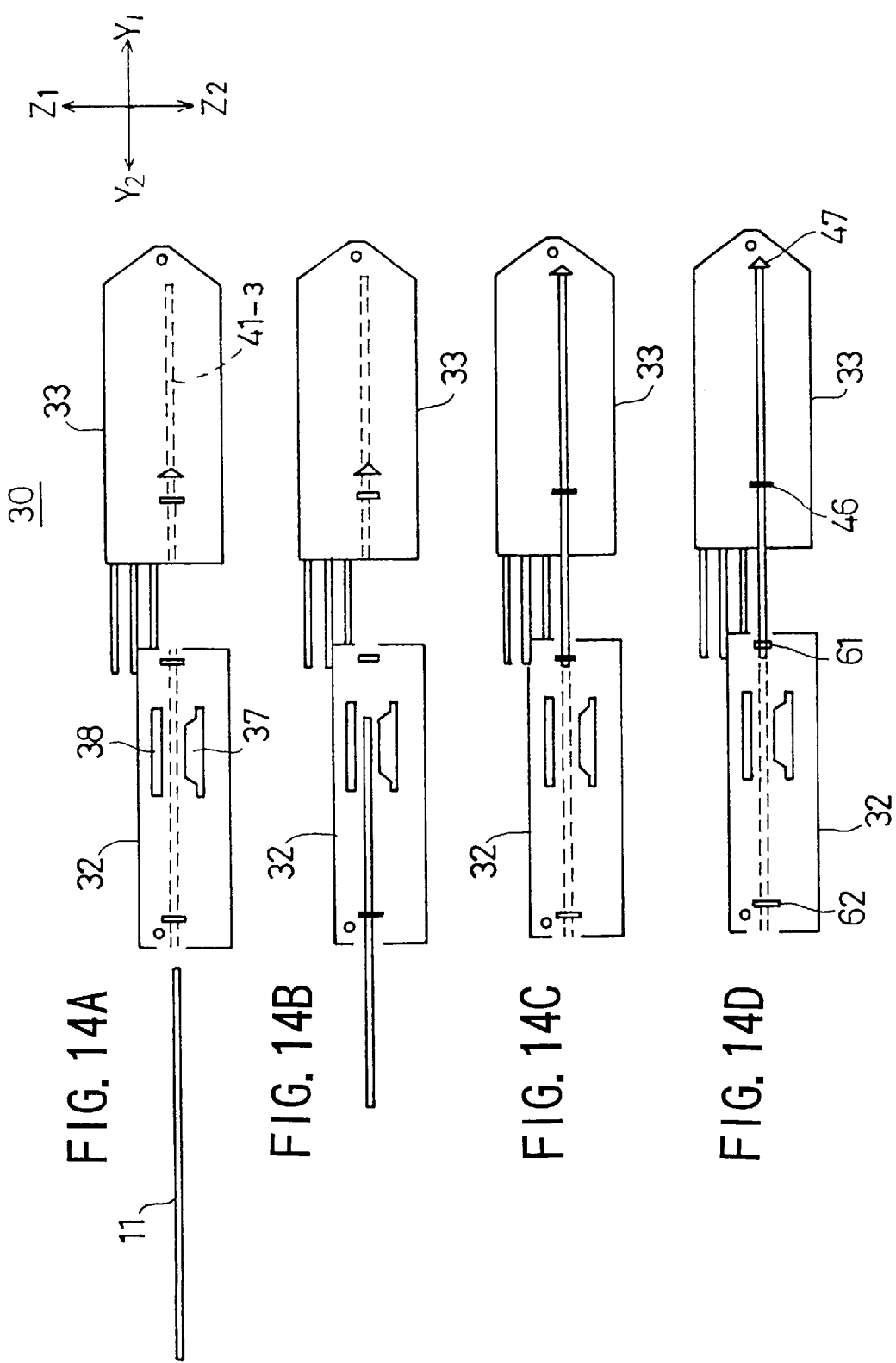

FIG. 15A
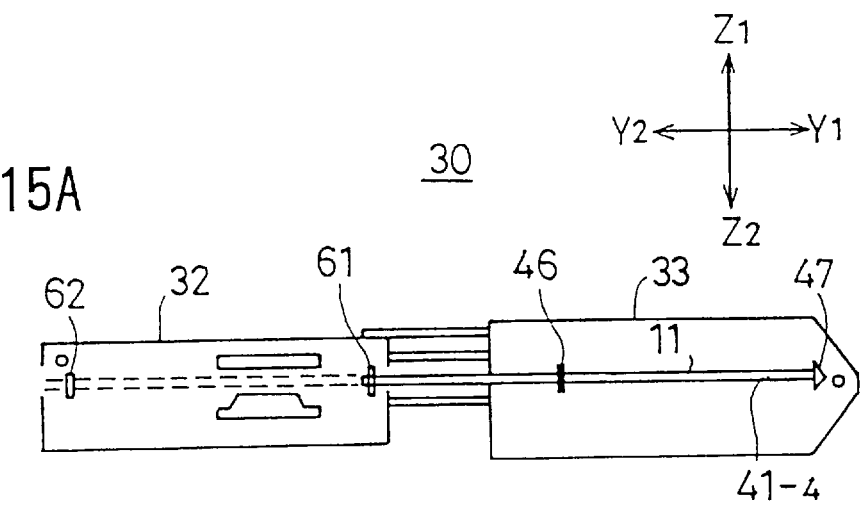
FIG. 15B
FIG. 15C
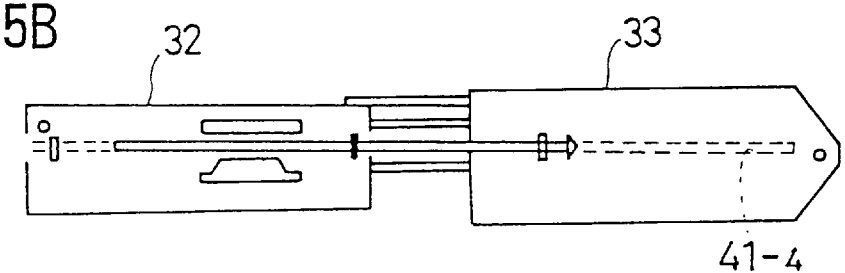
FIG. 16
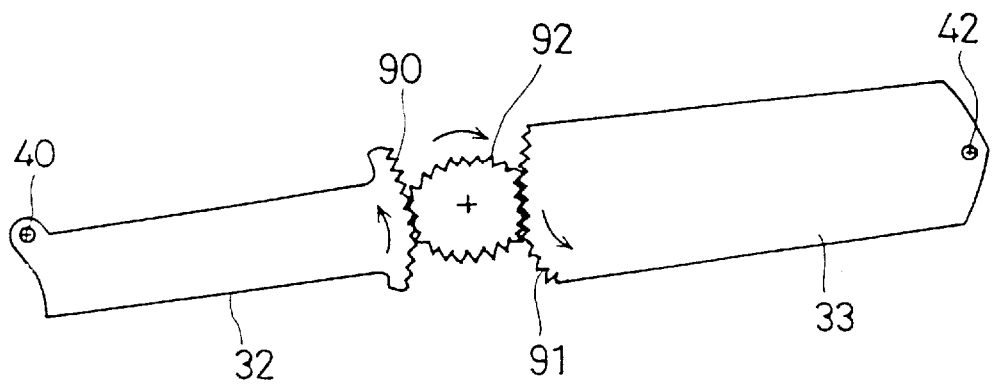

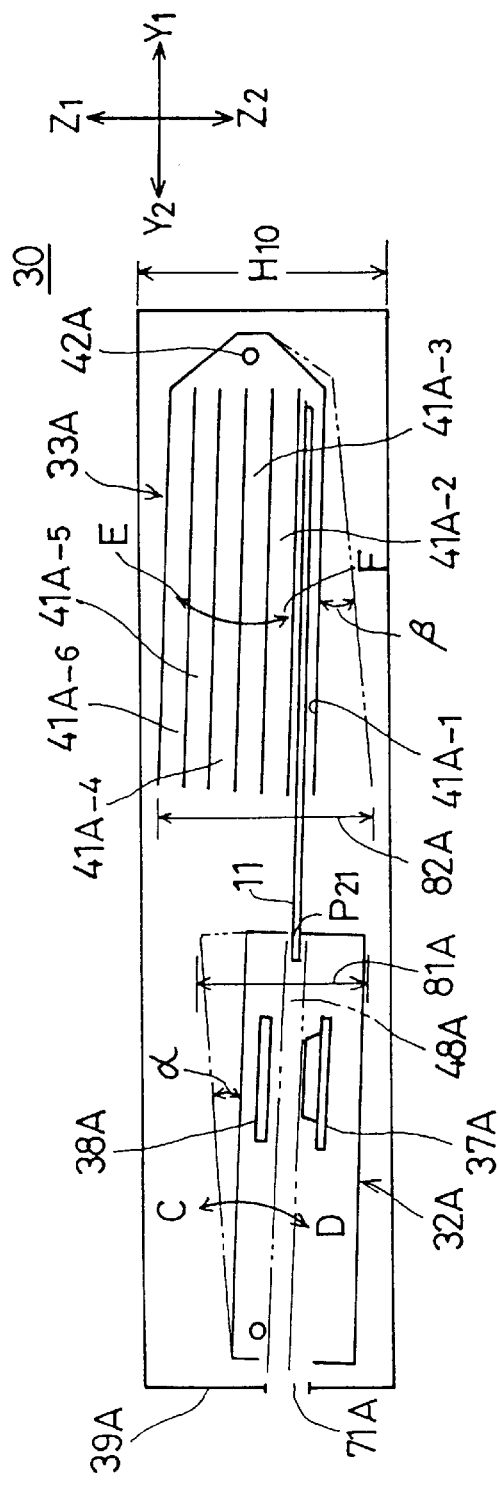
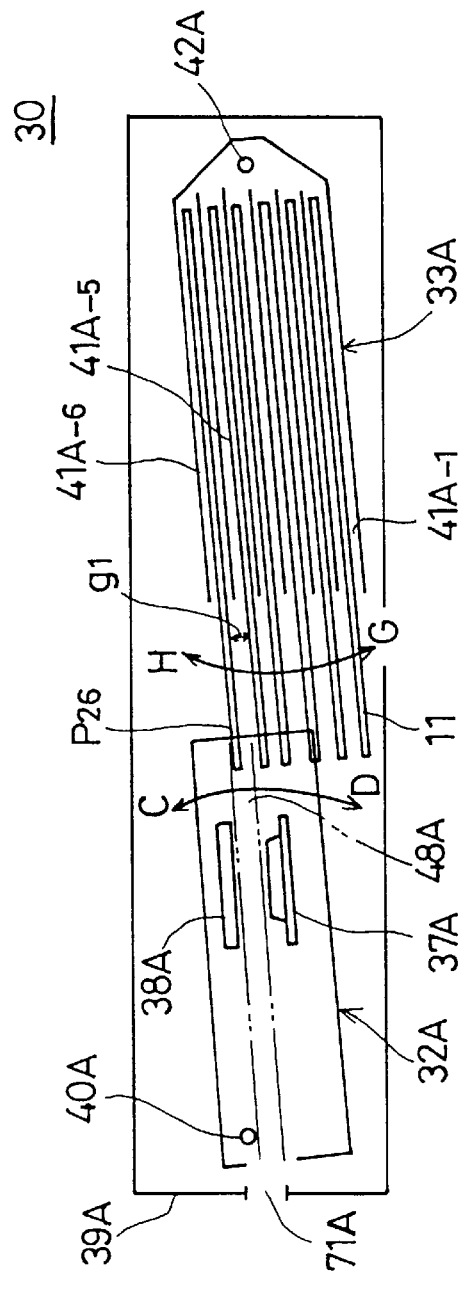
FIG. 18A
FIG. 18B

FIG. 19
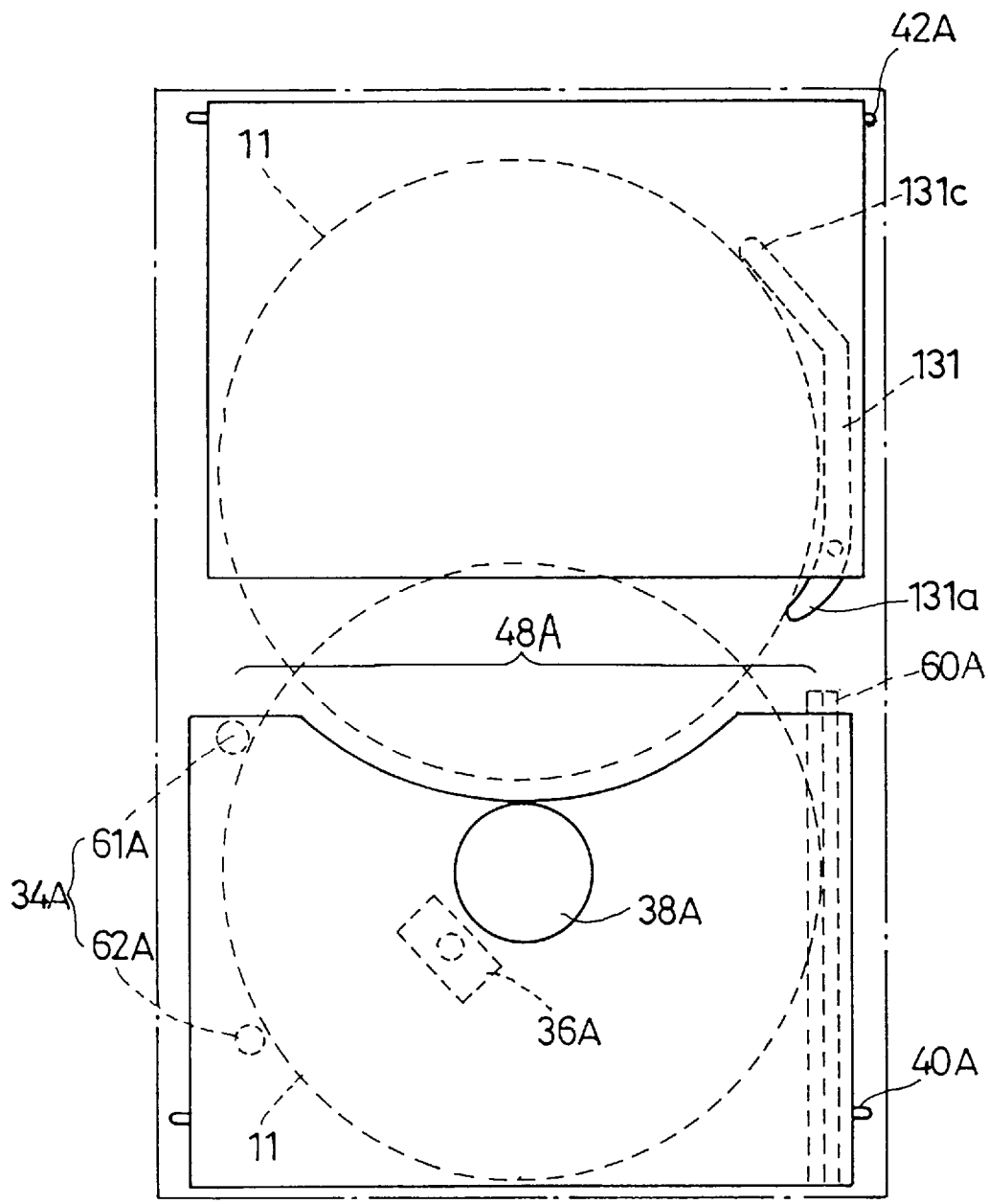
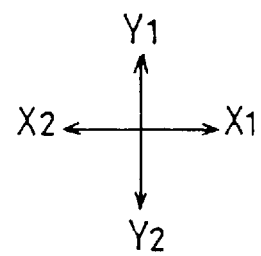

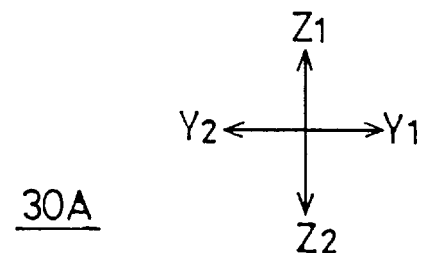
FIG. 21A
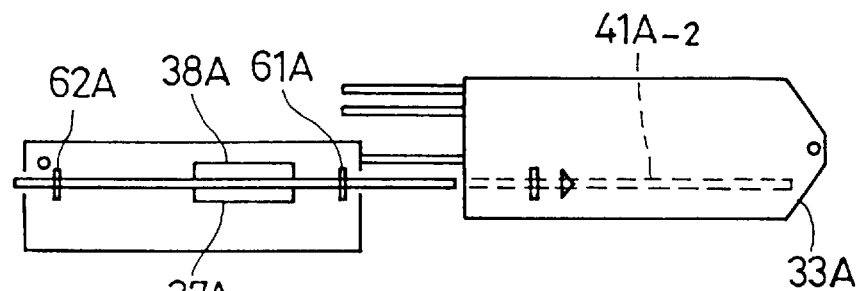
FIG. 21B
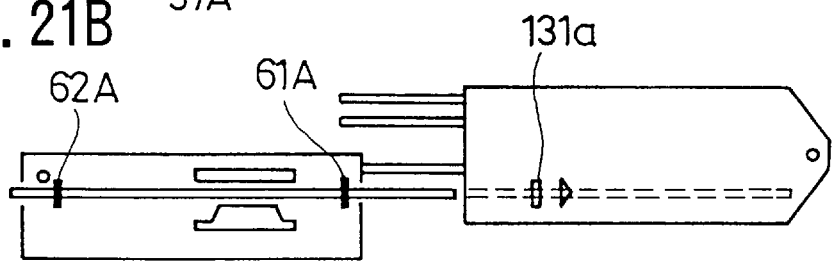
FIG. 21C
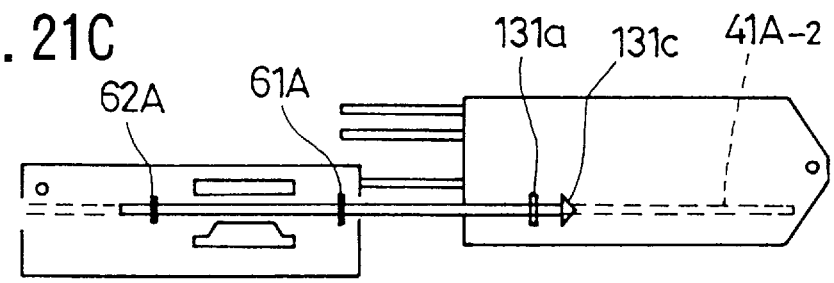
FIG. 21D
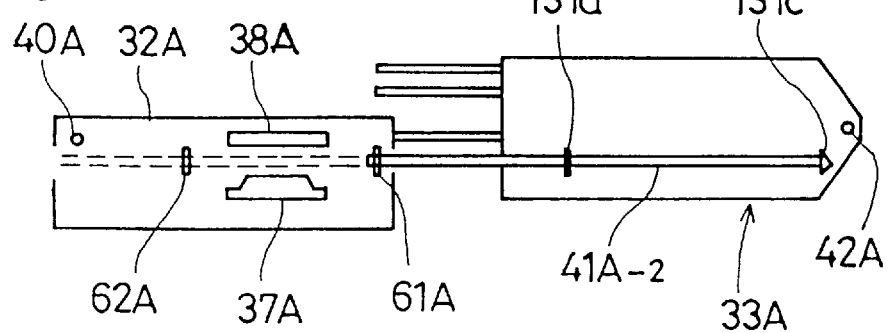

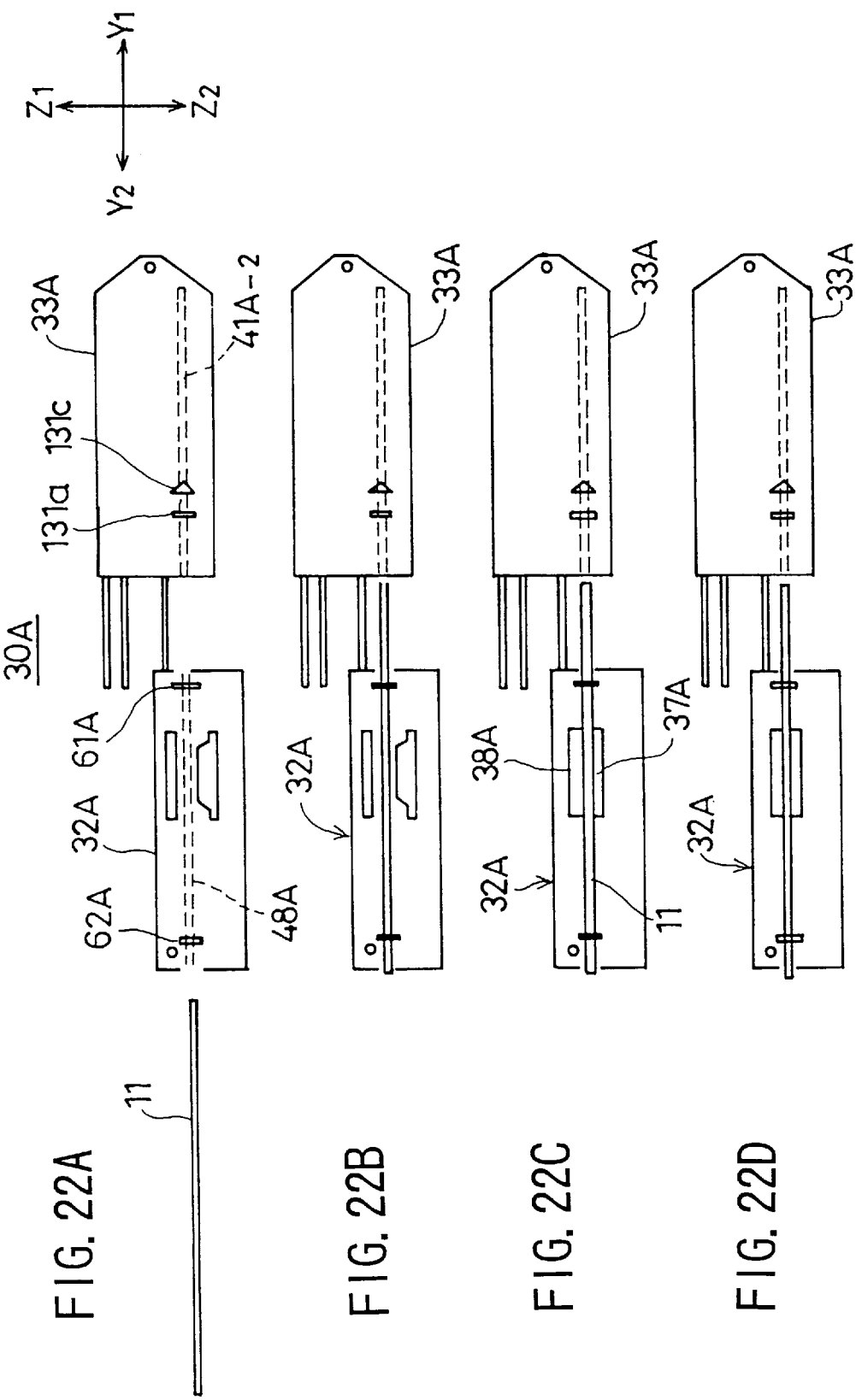

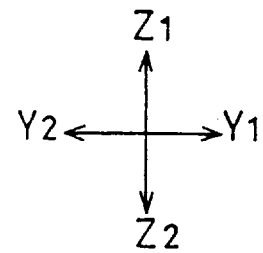

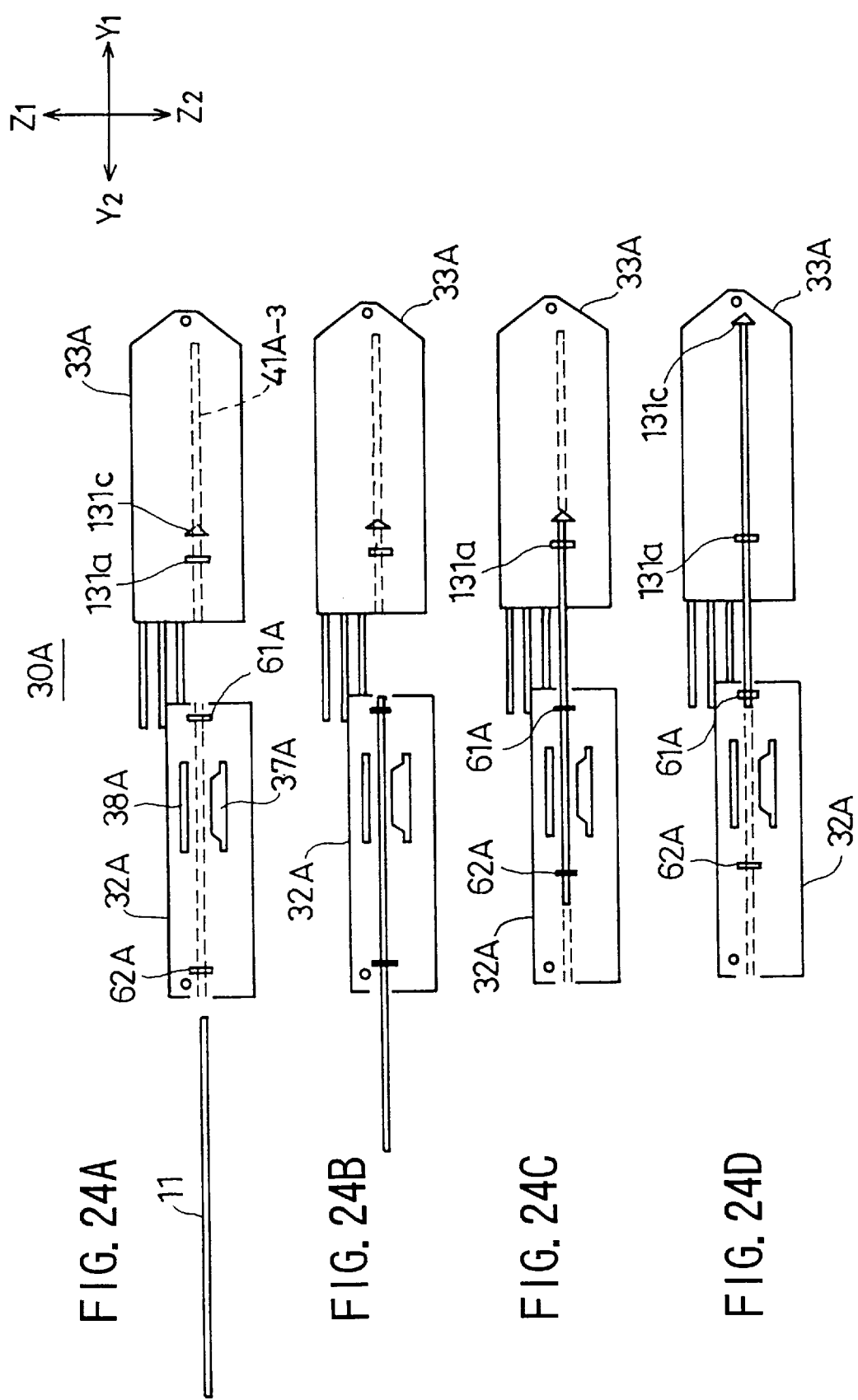

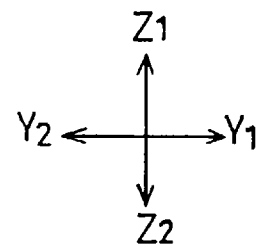
FIG. 25A
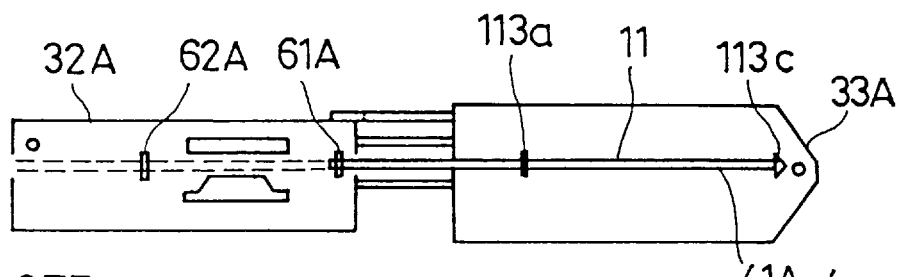
FIG. 25B
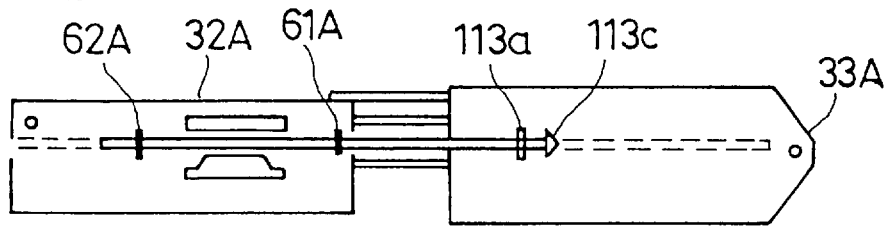
FIG. 25C
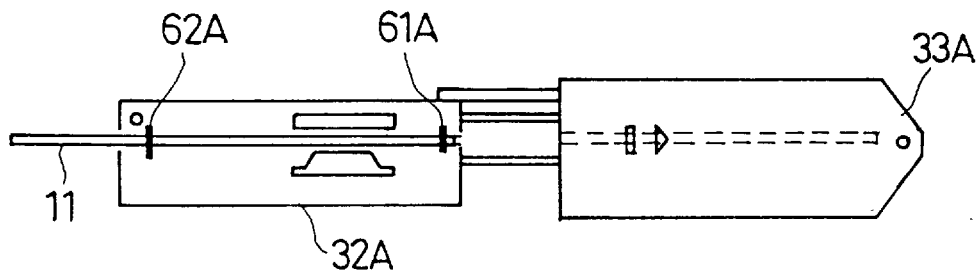

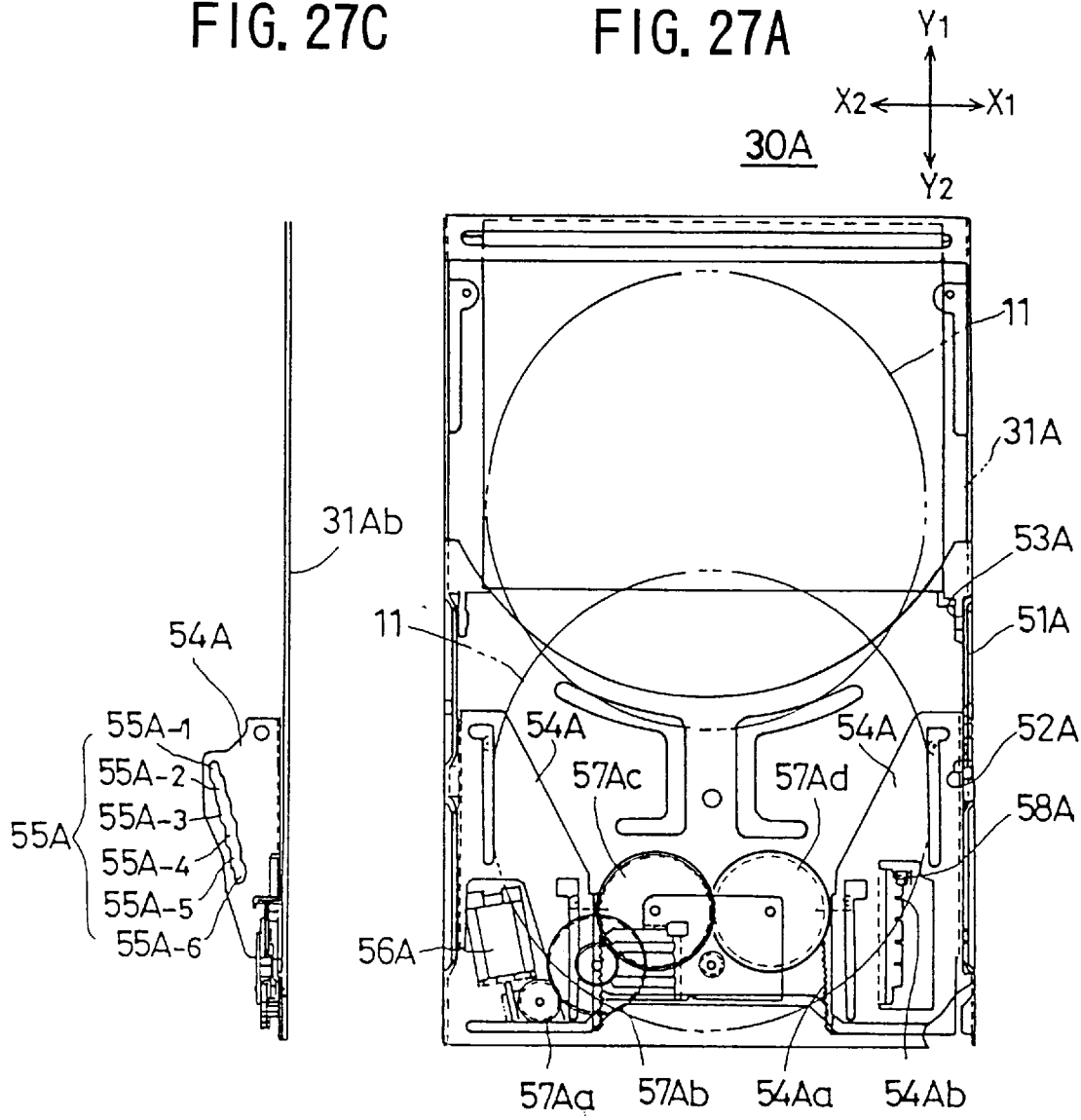
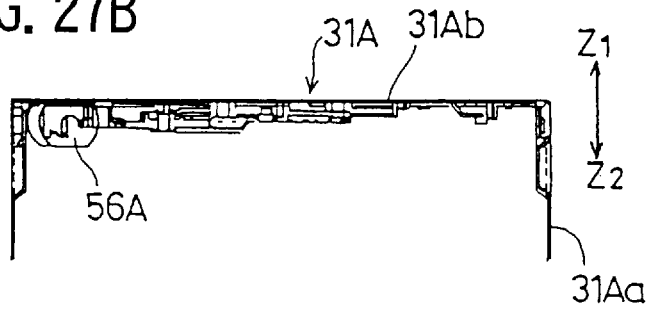

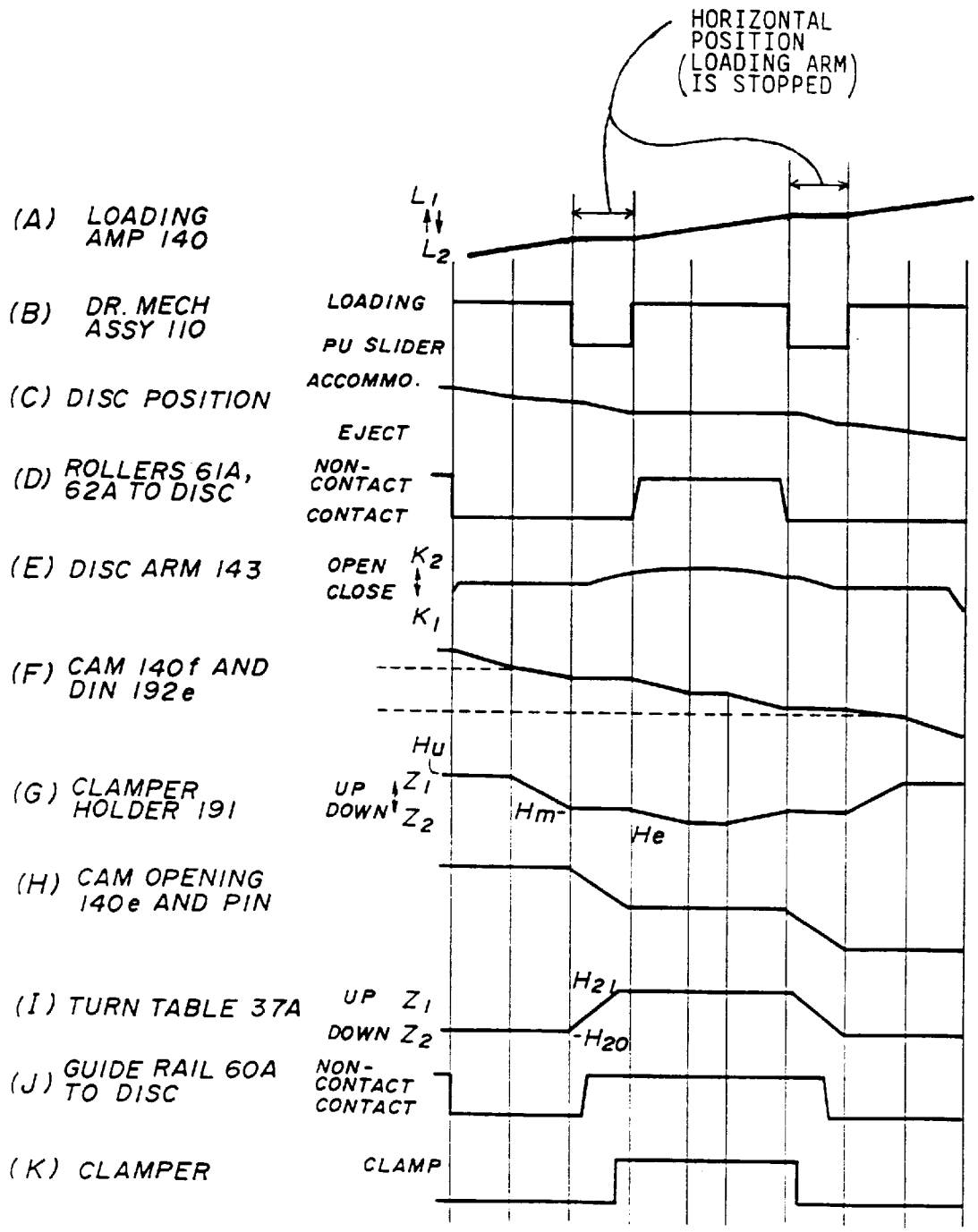

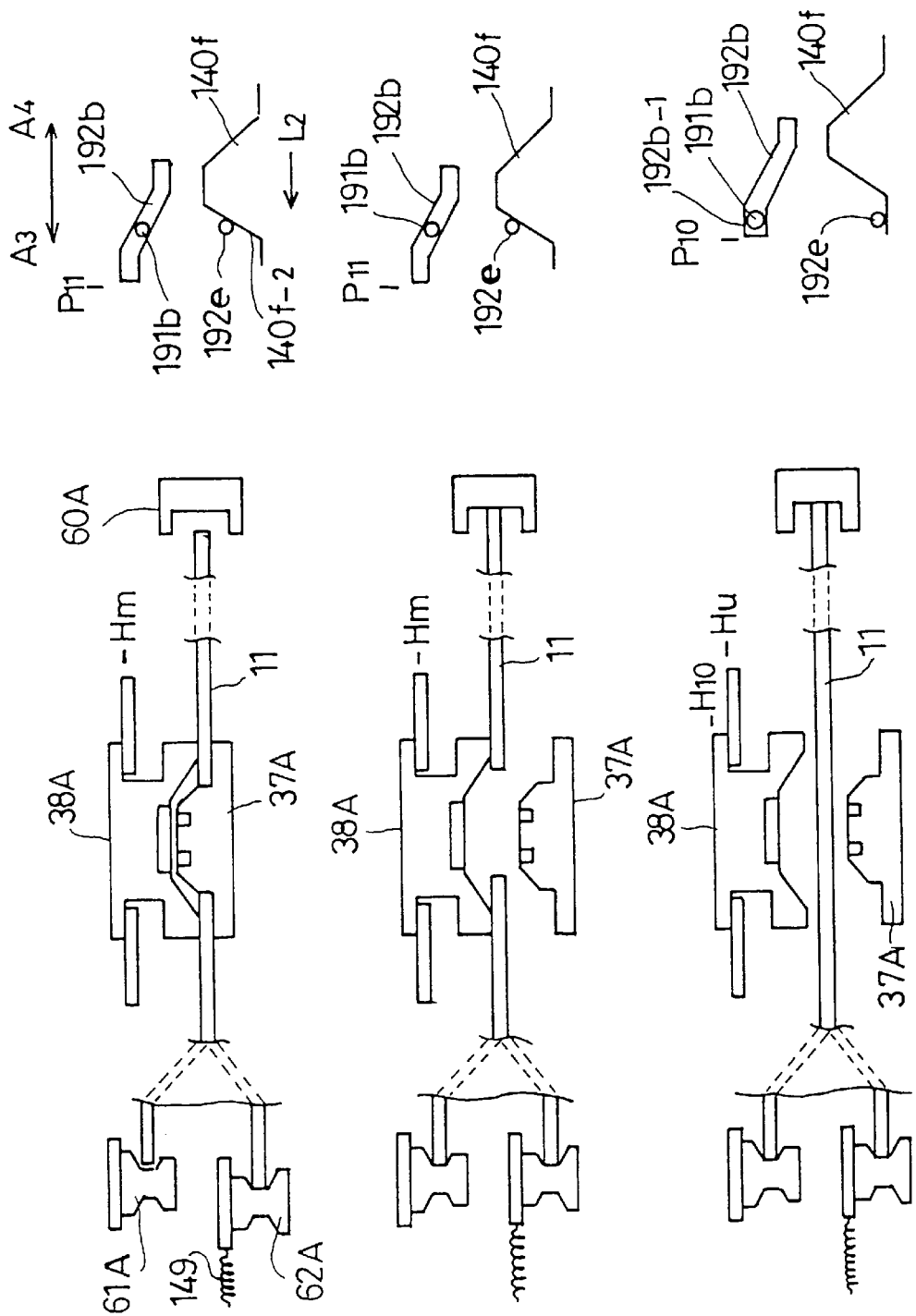

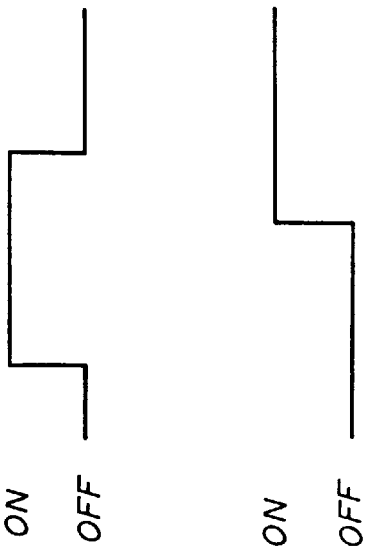

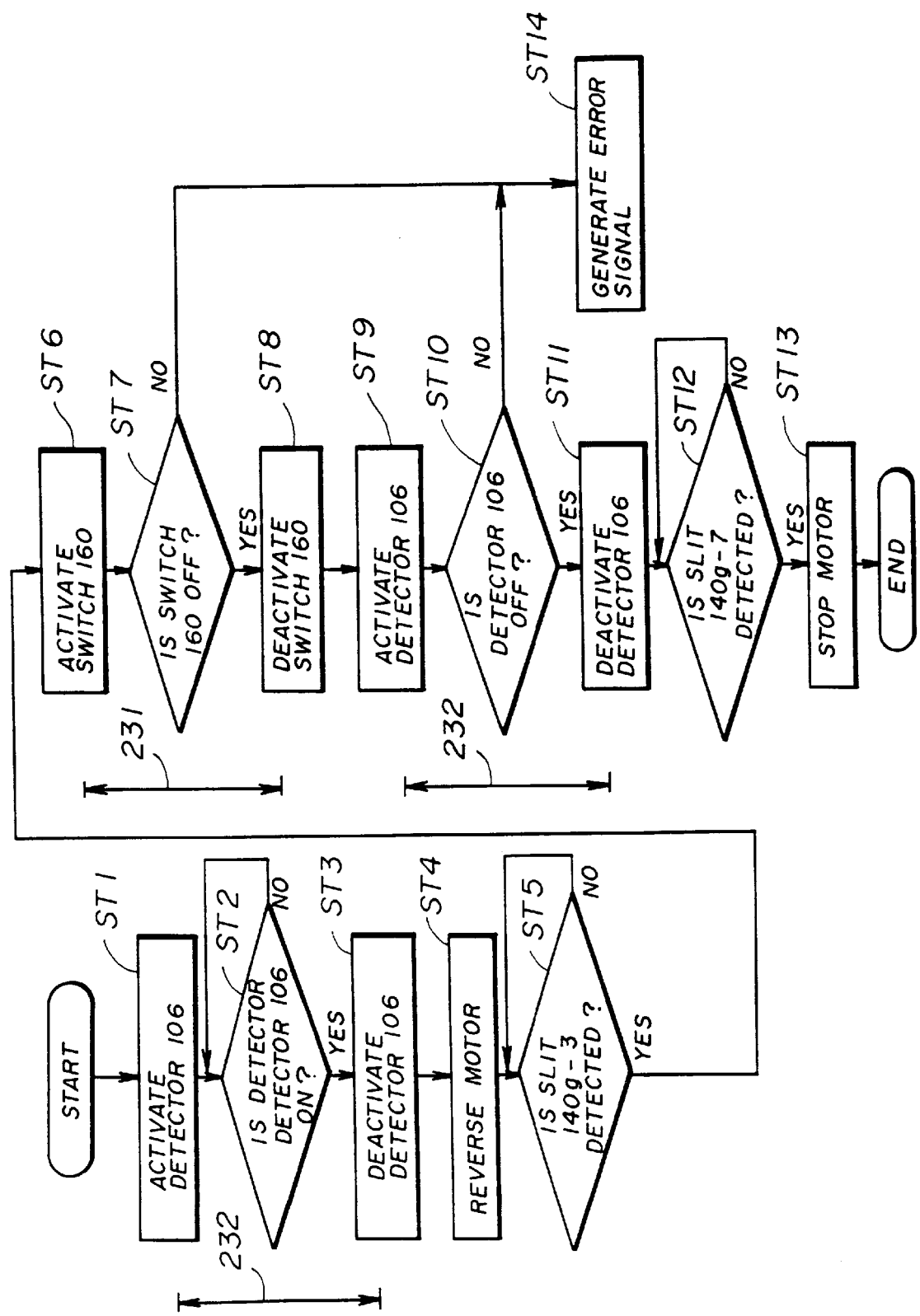

RECORDING MEDIUM REPRODUCING APPARATUS ACCOMMODATING A PLURALITY OF RECORDING MEDIA AND HAVING A REDUCED HEIGHT

BACKGROUND OF THE INVENTION

1. Field of the Invention

The present invention relates to a recording medium reproducing apparatus and, more particularly, to a recording medium reproducing apparatus which is adapted to be incorporated into a computer unit and has a CD-ROM changing function.

A height of the recording medium reproducing apparatus incorporated into a computer unit is required to be of a so-called half height, that is, the recording medium reproducing apparatus is required to be of a thin-type. If a CD-ROM changer function is provided in the reproducing apparatus, the height of the reproducing apparatus tends to be increased. Thus, measures for decreasing the height of the recording medium reproducing apparatus are required.

2. Description of the Related Art

FIG.1 shows an example of a conventional disc reproducing apparatus 10. The disc reproducing apparatus 10 comprises a disc reproducing unit 12 reproducing the contents of a disc 11 which is a recording medium, a disc accommodating unit 13 accommodating a plurality of discs 11 in a horizontally stacked state, and a conveying mechanism 14 conveying the discs in a horizontal direction between the disc accommodating unit 13 and the disc reproducing unit 12. The disc reproducing unit 12 has an optical pick-up and a turntable. The disc accommodating unit 13 has a plurality of disc accommodating sections each of which accommodates a single disc.

The disc accommodating unit 13 is stationary, and the disc reproducing unit 12 moves in upward and downward directions indicated by arrows Z1 and Z2 between positions P1 and P2. The disc reproducing unit 12 moves to a position corresponding to a height of the desired disc accommodating section 15 of the disc accommodating unit 13. Then, the disc conveying unit 14 takes out one of the discs 11 from the desired disc accommodating section 15, and conveys it to the disc reproducing unit 12. Then, the disc 11 is loaded to the disc reproducing unit 12 and the disc 11 is reproduced. After the reproducing operation is ended, the disc 11 is returned to the original disc accommodating section 15 by the disc conveying unit 14.

FIG.2 shows another example of a conventional disc reproducing apparatus 20. The disc reproducing apparatus 20 comprises a disc reproducing unit 22 reproducing the plurality of discs 11, a disc accommodating unit 23 accommodating the discs 11 in a radially arranged state, and a disc conveying mechanism 24 conveying the discs 11 in oblique directions between the disc accommodating unit 23 and the disc reproducing unit 22. The disc reproducing unit 22 is rotatably supported by a shaft 26, and has an optical pick-up and a turntable. The disc accommodating unit 23 is fixed in the disc reproducing apparatus 20, and has a radially arranged plurality of disc accommodating sections each of which accommodates a single disc.

The disc accommodating unit 23 is stationary, and the disc reproducing unit 22 rotates (swings) about the shaft 26 in directions indicated by arrows A and B between positions P10 and P11. The disc reproducing unit 22 rotates to a position corresponding to the desired disc accommodating section 25 of the disc accommodating unit 23. Then, the disc conveying unit 24 takes out one of the discs 11 from the desired disc accommodating section 25, and conveys it to the disc reproducing unit 22. Then, the disc 11 is loaded to the disc reproducing unit 22 and the disc 11 is reproduced. After the reproducing operation is ended, the disc 11 is returned to the original disc accommodating section 25 by the disc conveying unit 24.

In the disc reproducing apparatus 10 of FIG.1, as shown in the figure, since the disc reproducing unit 12 is located below the disc accommodating unit 13, the height H1 of the disc reproducing apparatus 10 becomes a sum of the height hi of the disc accommodating unit 13 and the height h2 of the disc reproducing unit 12. Thus, the height H1 of the disc reproducing apparatus 10 is large, and it is difficult to reduce the height.

In the disc reproducing apparatus 20 of FIG.2, since the disc reproducing unit 22 rotates (swings) within a range of the height of the disc accommodating unit 23, the height H2 of the disc reproducing apparatus 20 can be a height which is sufficient for the height h3 of the disc accommodating unit 23. Thus, the disc reproducing apparatus 20 has an advantage in reduction of the height over the disc reproducing apparatus shown in FIG. 1. However, the height h3 of the disc accommodating unit 23 is increased due to the reasons that: 1) discs 11 are radially arranged and some discs 11 are positioned in an oblique state; and 2) a distance g between adjacent discs 11 on the side of the disc reproducing unit 22 is set sufficiently so that one of the discs 11 does not contact with an adjacent one of the discs 11 when the disc 11 is taken out or returned. For these reasons, The height H2 of the disc reproducing apparatus 20 cannot be reduced, and it is difficult to reduce the height.

Additionally, in both the disc reproducing apparatuses 10 and 20, since only the disc reproducing units 12 or 22 move to the height of the desired disc accommodating section, it takes a long time to take out the desired disc after a command to reproduce the desired disc is received and until the withdrawing operation of the desired disc is started. This causes an operator of the computer unit to wait for a long time.

SUMMARY OF THE INVENTION

It is a general object of the present invention to provide an improved and useful recording medium reproducing apparatus in which the above-mentioned problems are eliminated.

A more specific object of the present invention is to provide a recording medium reproducing apparatus having a recording medium changing function which recording medium reproducing apparatus has a reduced height as compared to the conventional recording medium reproducing apparatus.

Another object of the present invention is to provide a recording medium reproducing apparatus which reduces the time taken for a loading operation of a desired recording medium.

In order to achieve the above-mentioned objects, there is provided according to the present invention a recording medium reproducing apparatus for reproducing a selected one of a plurality of recording media accommodated therein, the recording medium reproducing apparatus comprising:

- a recording medium reproducing unit reproducing one of the recording media;
- a recording medium accommodating unit having a plurality of recording medium accommodating sections each accommodating one of the recording media;

a recording medium conveying mechanism conveying the recording media between the recording medium reproducing unit and the recording medium accommodating unit;

a recording medium reproducing unit supporting mechanism rotatably supporting the recording medium reproducing unit;

a recording medium accommodating unit supporting mechanism rotatably supporting the recording medium accommodating unit; and a rotating mechanism rotating both the recording medium reproducing unit and the recording medium accommodating unit when the one of the recording medium is conveyed between the recording medium reproducing unit and the recording medium accommodating unit so that the recording medium reproducing unit is substantially aligned with one of the recording medium accommodating sections.

According to the above-mentioned invention, since both the recording medium reproducing unit and the recording medium accommodating unit are rotated to be substantially aligned with each other, the space needed for rotation is reduced as compared to a space needed for rotation in a case where only one of the recording medium reproducing unit and the recording medium accommodating unit is rotatable. Thus, the thickness of the recording medium reproducing apparatus according to the present invention is reduced.

Additionally, in the recording medium reproducing apparatus according to the present invention, the rotating mechanism is engaged with both the recording medium reproducing unit and the recording medium accommodating unit so that the recording medium reproducing unit and the recording medium accommodating unit are rotated substantially simultaneously in reverse directions to each other.

According to this invention, since both the recording medium reproducing unit and the recording medium accommodating unit are rotated substantially at the same time, the time period needed for aligning the recording medium reproducing unit with one of the recording medium reproducing sections of the recording medium accommodating unit is reduced. Thus, a time period for loading the recording media from the recording media accommodating unit to the recording media reproducing unit is reduced.

In one embodiment of the present invention, the recording medium reproducing unit supporting mechanism may rotatably support the recording medium reproducing unit at a first position on a side opposite to the recording medium accommodating unit, and the recording medium accommodating unit supporting mechanism may rotatably support the recording medium accommodating unit at a second position on a side opposite to the recording medium reproducing unit.

Additionally, the recording medium reproducing apparatus according to the present invention may further comprise an insertion opening for inserting a recording medium from outside the recording medium reproducing apparatus into the recording medium reproducing unit, the insertion opening being located adjacent to the first position at which the recording medium reproducing unit is rotatably supported.

In one embodiment of the present invention, the recording media may be disc-like recording media, and each of the recording medium accommodating sections may have a holding member holding the one of the recording media accommodated therein, the holding member having a first end and a second end opposite to the first end, the holding member being rotatable at a position between the first end and the second end so that the first end contacts an outer edge of each the disc-like recording medium so as to hold the disc-like recording medium within a corresponding one of the recording medium accommodating sections and the second end presses the disc-like recording medium when the one of the recording media is conveyed toward the recording medium reproducing unit.

Additionally, the recording medium conveying mechanism may comprise a supporting mechanism having a first contact member and a second contact member contacting the disc-like recording medium to be conveyed, the first and second contact members contacting an outer edge of the disk-like recording medium on a side substantially opposite to the holding member.

Other objects, features and advantages of the present invention will become more apparent from the following detailed description when read in conjunction with the accompanying drawings.

BRIEF DESCRIPTION OF THE DRAWINGS

FIGS. 3A, 3B and 3C are illustrations of a disc reproducing apparatus according to a first embodiment of the present invention;

FIGS. 8A and 8B are illustrations for explaining a positional relationship and a rotation range of a disc reproducing unit and a disc accommodating unit shown in FIG. 6;

FIGS. 11A, 11B, 11C and 11D are illustrations for explaining an operation for reproducing a disc inserted from outside of the disc reproducing apparatus;

FIGS. 14A, 14B, 14C and 14D are illustrations for explaining an operation for accommodating a disc to the disc accommodating unit;

FIGS. 15A, 15B and 15C are illustrations for explaining an operation for ejecting a disc accommodated in the disc accommodating unit to outside of the disc reproducing apparatus;

FIG. 16 is an illustration of a variation of a rotating mechanism;

FIGS. 18A and 18B are illustrations for explaining a positional relationship and a rotation range of a disc reproducing unit and a disc accommodating unit shown in FIG. 17;

FIG. 19 is a plan view of the disc reproducing apparatus shown in FIG. 17;

FIGS. 21A, 21B, 21C and 21D are illustrations for explaining an operation for returning a disc to the disc accommodating unit;

FIGS. 22A, 22B, 212 and 22D are illustrations for explaining an operation for reproducing a disc inserted from outside of the disc reproducing apparatus;

FIGS. 24A, 24B, 24C and 24D are illustrations for explaining an operation for accommodating a disc to the disc accommodating unit;

FIGS. 25A, 25B and 25C are illustrations for explaining an operation for ejecting a disc accommodated in the disc accommodating unit from the disc reproducing apparatus;

FIGS. 27A, 27B and 27C are illustrations for showing the rotating mechanism;

FIG. 33 is an operation chart of each part of the disc reproducing apparatus;

FIGS. 57A, 57B and 57C are illustrations for explaining an operation for unclamping the disc by the disc clamp mechanism;

FIG. 67 is a chart for showing states of a disc insertion detecting switch and detector where the disc is removed immediately after the disc is inserted; and FIG. 68 is a flowchart of an operation for detecting that a disc is removed immediately after the disc is inserted.

DETAILED DESCRIPTION OF THE PREFERRED EMBODIMENTS

Figure 1:
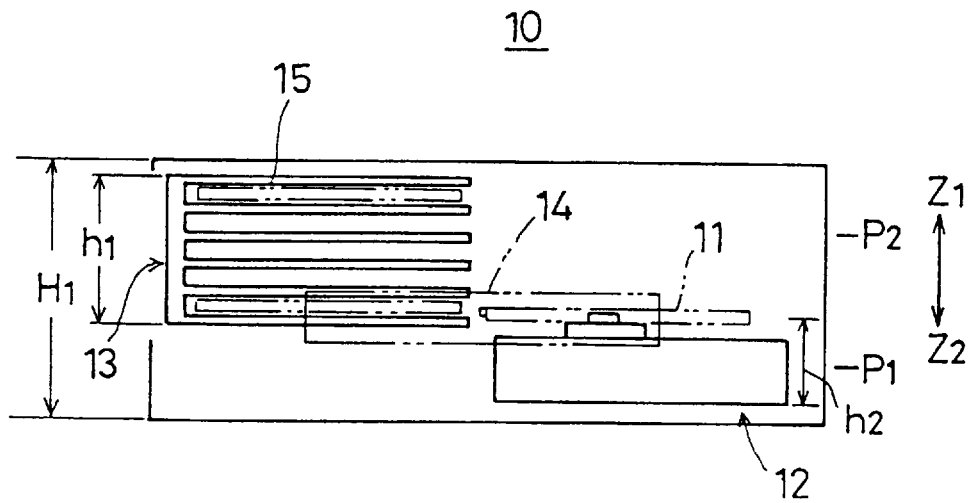
FIG. 1 is an illustration of an example of a conventional disc reproducing apparatus.

First Embodiment (FIG. 3 to FIG. 16)

FIGS. 3A is a plan view of a disc reproducing apparatus 30 according to a first embodiment of the present invention; FIG. 3B is a front view of the disc reproducing apparatus shown in FIG. 3A; FIG. 3C is a side view of the disc reproducing apparatus shown in FIG. 3A. FIGS. 4 to 8 are illustrations of the disc reproducing apparatus 30.

The disc reproducing apparatus 30 comprises a gate-type frame 31, a disc reproducing unit 32 reproducing the discs 11 which are recording media, a disc accommodating unit 33 which accommodates a plurality of discs 11 in a horizontally stacked state, a disc conveying mechanism 34 which conveys the discs between the disc accommodating unit 33 and the disc reproducing unit 32, and a rotating mechanism 35 which rotates both the disc reproducing unit 32 and the disc accommodating unit 33.

The disc reproducing unit 32 corresponds to the recording medium reproducing unit recited in the claims. The disc accommodating unit 33 corresponds to the recording medium accommodating unit recited in the claims. The disc conveying mechanism 34 corresponds to the recording medium conveying mechanism recited in the claims. The rotating mechanism 35 corresponds to the rotating mechanism recited in the claims.

Figure 4:
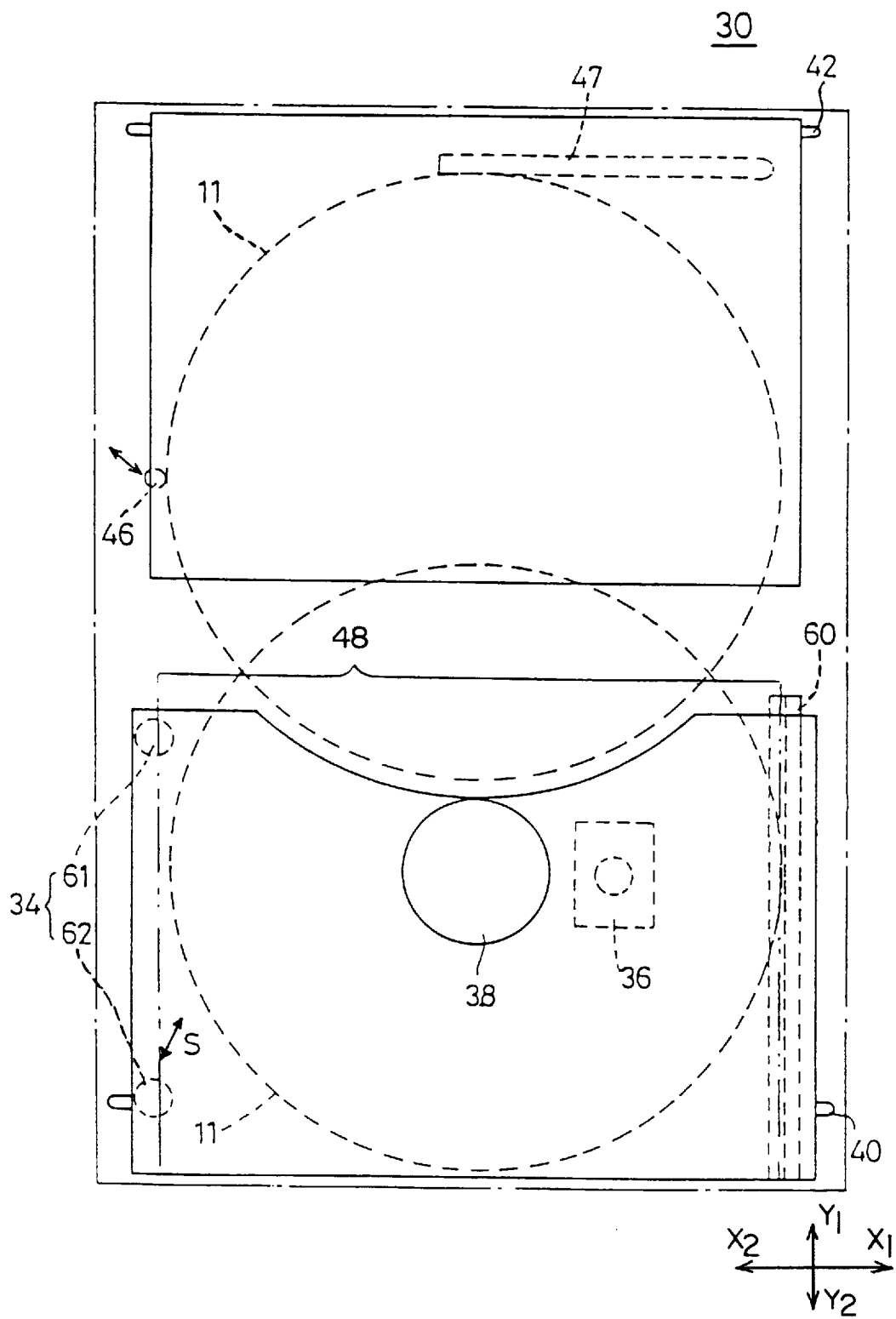
FIG. 4 is a plane view of the disc reproducing apparatus shown in FIGS. 3A, 3B and 3C.

As shown in FIG. 4, the disc reproducing unit 32 and the disc accommodating unit 33 are arranged so that a disc 11 located in the disc reproducing unit 32 partially overlaps a disc 11 located in the disc accommodating unit 33. Thus, the dimension of the disc reproducing unit 30 in the Y-direction is short. The reason that there is no problem due to the disc 11 located in the disc reproducing unit 32 partially overlapping the disc 11 located in the disc accommodating unit 33 in the plan view is that the disc reproducing unit 32 does not rotate when the disc 11 is loaded in the disc reproducing unit 32 as will be described later.

The disc reproducing unit 32 comprises an optical pick-up 36, a turntable 37, a clamper device 38 and a conveying path 48. The disc reproducing unit 32 is supported by the gate-type frame 31 via pins 40 at both the X1 and X2 side near a front bezel side (Y2 side), and is rotatable in directions C and D. The pins 40 correspond to the recording medium reproducing unit supporting mechanism.

Figure 5:
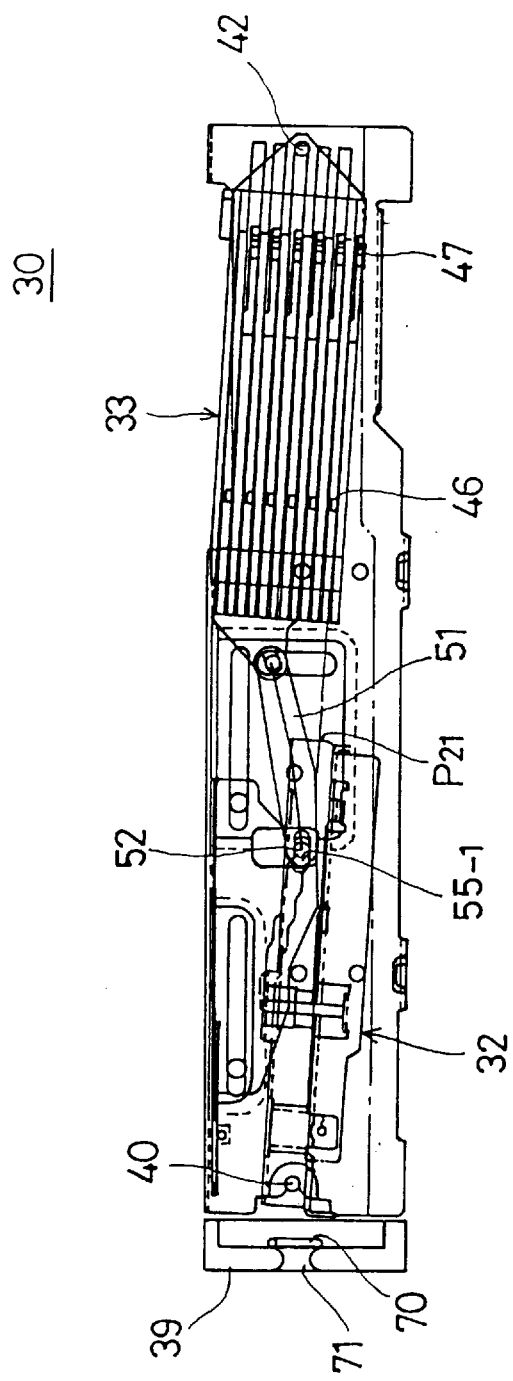
FIG. 5 is a side view of the disc reproducing apparatus shown in FIGS. 3A, 3B and 3C.

The disc accommodating unit 33 comprises a first to sixth disc accommodating sections 41-1 to 41-6 which are arranged in parallel as also shown in FIG. 5. The disc accommodating unit 33 is located on the inner side (Y1 side) of the disc reproducing unit 32. The disc reproducing unit 33 is rotatably supported in the E and F directions by the gate-type frame 31 by pins 42 at the X1 and X2 sides on the Y1 side. The pins 42 correspond to a recording medium accommodating unit supporting mechanism.

The discs 11 are accommodated in the respective disc accommodating sections 41-1 to 41-6 (may be referred to as a disc accommodating section 41) shown in FIG. 7. The discs 11 are arranged parallel to each other. A distance g1 between the adjacent discs 11 in the vertical direction is sufficiently large so that the discs 11 do not contact each other when the discs are conveyed.

The disc accommodating section 41 is defined by ribs 43, 44 and 45 protruding from inner surfaces of the disc accommodating unit 33 on the X1 side, X2 side and Y1 side, respectively. The ribs 43 on the X1 side are provided with a disc lock pin 46. The disc lock pin 46 engages with the disc 11 so as to retain the disc 11 in the disc accommodating section 41. When the disc is taken out, a lock release and disc pressing mechanism 47 (refer to FIG. 33) is operated so as to retract the disc lock pin 46 in the X2 direction and press the disc 11 in the Y2 direction. The disc lock pin 46 and the lock release and disc pressing mechanism 47 are provided to each of the disc accommodating sections 41-1 to 41-6, and are independently operated.

The rotating mechanism 35 is provided on the X1 side and the X2 side. The rotating mechanism 35 on the X1 side comprises an arm 51 which is rotatably supported by a pin 50 fixed to a side plate 31a of the frame 31. A pin 52 on an end of the arm 51 is fit in an elongated opening 65 formed on the Y1 side of the disc reproducing unit 32. A pin 53 on the opposite end of the arm 51 is fit in an elongated opening 66 on the Y2 side of the disc reproducing unit 32. A slider 54 is movable in the Y1 and Y2 directions, and the pin 52 is fit in a stepwise opening 55 formed on the slider 54. The rotating mechanism 35 comprises a mechanism which comprises a motor 56 and gears 57a to 57d provided on an inner surface of a top plate 31b of the frame 31 and a rack gear 54a (shown in FIG. 3A) which is a part of the slider 54 so as to move the slider 54 in the Y1 and Y2 directions. The rotating mechanism further comprises a position detecting mechanism comprising a slit 54b which is a part of the slider 54 and an optical sensor 58. The stepwise opening 55 includes first to sixth steps 55-1 to 55-6 as shown in FIG. 3C.

In the rotating mechanism 35, the pin 52 is shifted as shown in FIGS. 7A to 7E as the slider 54 is moved by the motor 56 in the Y1 direction. Additionally, the rotating mechanism moves the disc accommodating unit 33 in the F direction (shown in FIG. 6). When the slider 54 moves in the Y1 direction, the pin 52 is shifted by the stepwise opening 55 and the disc reproducing unit 32 is rotated in the C direction via the arm 51. At the same time, the disc accommodating unit 33 is rotated in the F direction by the arm 51. On the other hand, when the slider 54 is moved in the Y2 direction, the pin 52 is reversely shifted by the stepwise opening 55 and the disc reproducing unit is rotated in the D direction. At the same time, the disc accommodating unit 33 is rotated in the E direction by the arm 51.

When the first step 55-1 engages with the pin 52, the disc reproducing unit 32 is rotated to a maximum extent in the D direction and the disc conveying path 48 is located in a position P21 as shown in FIGS. 5 and 8A, and the disc reproducing unit 32 is rotated to a maximum extent in the E direction. In this state, the disc conveying path 48 of the disc reproducing unit 32 is aligned with the first disc accommodating section 41-1.

Figure 7A:
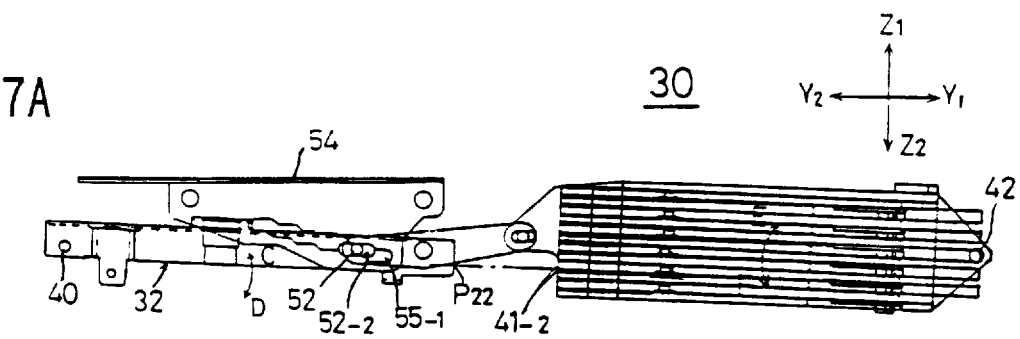
FIGS. 7A, 7B, 7C, 7D and 7E are illustrations for explaining an operation of the disc reproducing apparatus shown in FIGS. 3A to 3B.

When the second step 55-2 engages with the pin 52, the disc reproducing unit 32 is slightly rotated in the C direction and the disc conveying path 48 is located in a position P22 as shown in FIG. 7A, and the disc accommodating unit 33 is slightly rotated in the F direction. In this state, the disc conveying path 48 of the disc reproducing unit 32 is aligned with the second disc accommodating section 41-2.

Figure 7B:
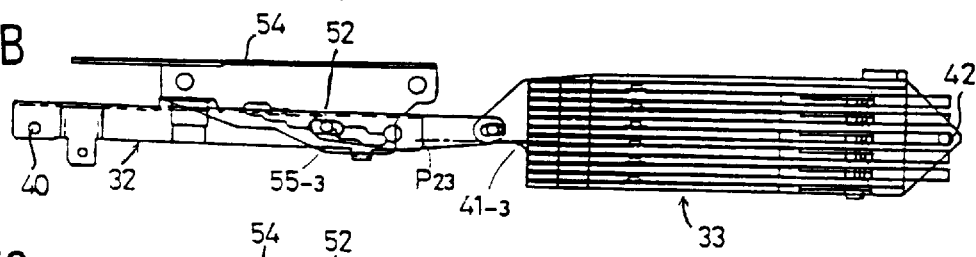

When the third step 55-3 engages with the pin 52, the disc reproducing unit 32 is slightly rotated in the C direction and the disc conveying path 48 is located in a position P23 as shown in FIG. 7B, and the disc accommodating unit 33 is slightly rotated in the F direction. In this state, the disc conveying path 48 of the disc reproducing unit 32 is aligned with the third disc accommodating section 41-3.

Figure 7C:
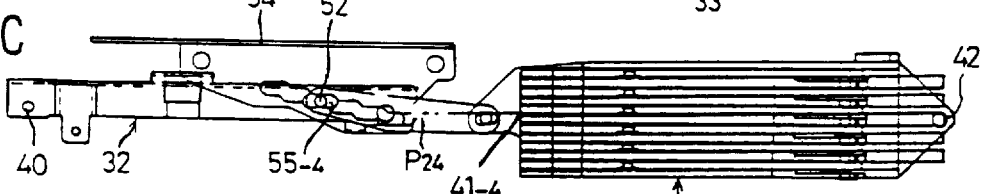

When the fourth step 55-4 engages with the pin 52, the disc reproducing unit 32 is slightly rotated in the C direction and the disc conveying path 48 is located in a position P24 as shown in FIG. 7C, and the disc accommodating unit 33 is slightly rotated in the F direction. In this state, the disc conveying path 48 of the disc reproducing unit 32 is aligned with the fourth disc accommodating section 41-4.

Figure 7D:
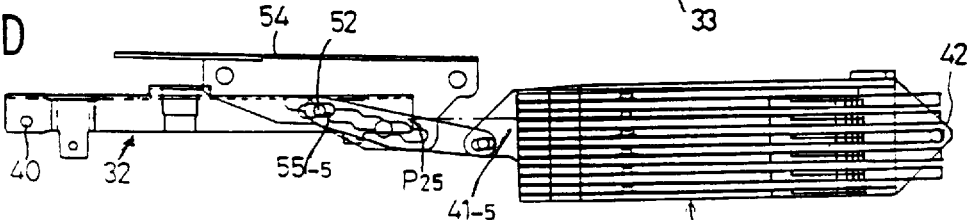
Figure 7E:
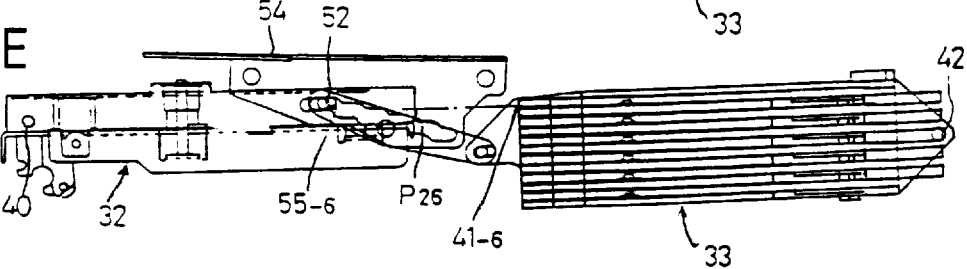

When the fifth step 55-5 engages with the pin 52, the disc reproducing unit 32 is further rotated in the C direction and the disc conveying path 48 is located in a position P25 as shown in FIG. 7D, and the disc accommodating unit 33 is also slightly rotated in the F direction. In this state, the disc conveying path 48 of the disc reproducing unit 32 is aligned with the fifth disc accommodating section 41-5.

When the sixth step 55-6 engages with the pin 52, the disc reproducing unit 32 is rotated to a maximum extent in the C direction and the disc conveying path 48 is located in a position P26 as shown in FIGS. 7D and 8B, and the disc accommodating unit 33 is also rotated to a maximum extent in the F direction. In this state, the disc conveying path 48 of the disc reproducing unit 32 is aligned with the sixth disc accommodating section 41-6.

The disc conveying mechanism 34 is provided to the disc reproducing unit 32, and comprises a guide rail member 60 having a groove and I-shaped rollers 61 and 62 which are movable in the S direction in FIG. 4.

In the disc conveying mechanism 34, the disc 11 is interposed between the guide rail member 60 and the I-shaped rollers 61 and 62 in the X1 and X2 directions so as to convey the disc 11 in the Y1 and Y2 directions between the disc accommodating unit 33 and the disc reproducing unit 32.

Figure 2:
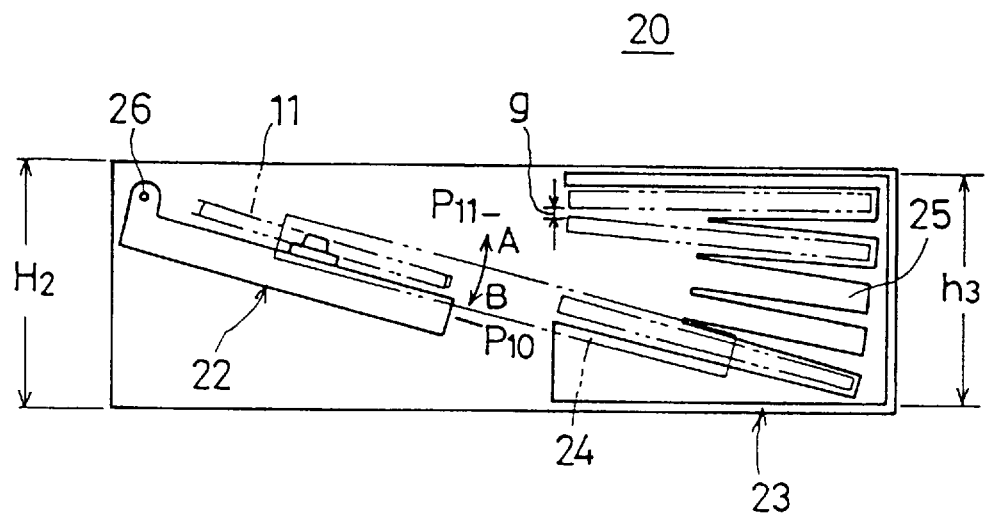
FIG. 2 is an illustration of another example of the conventional disc reproducing apparatus.
Figure 6:
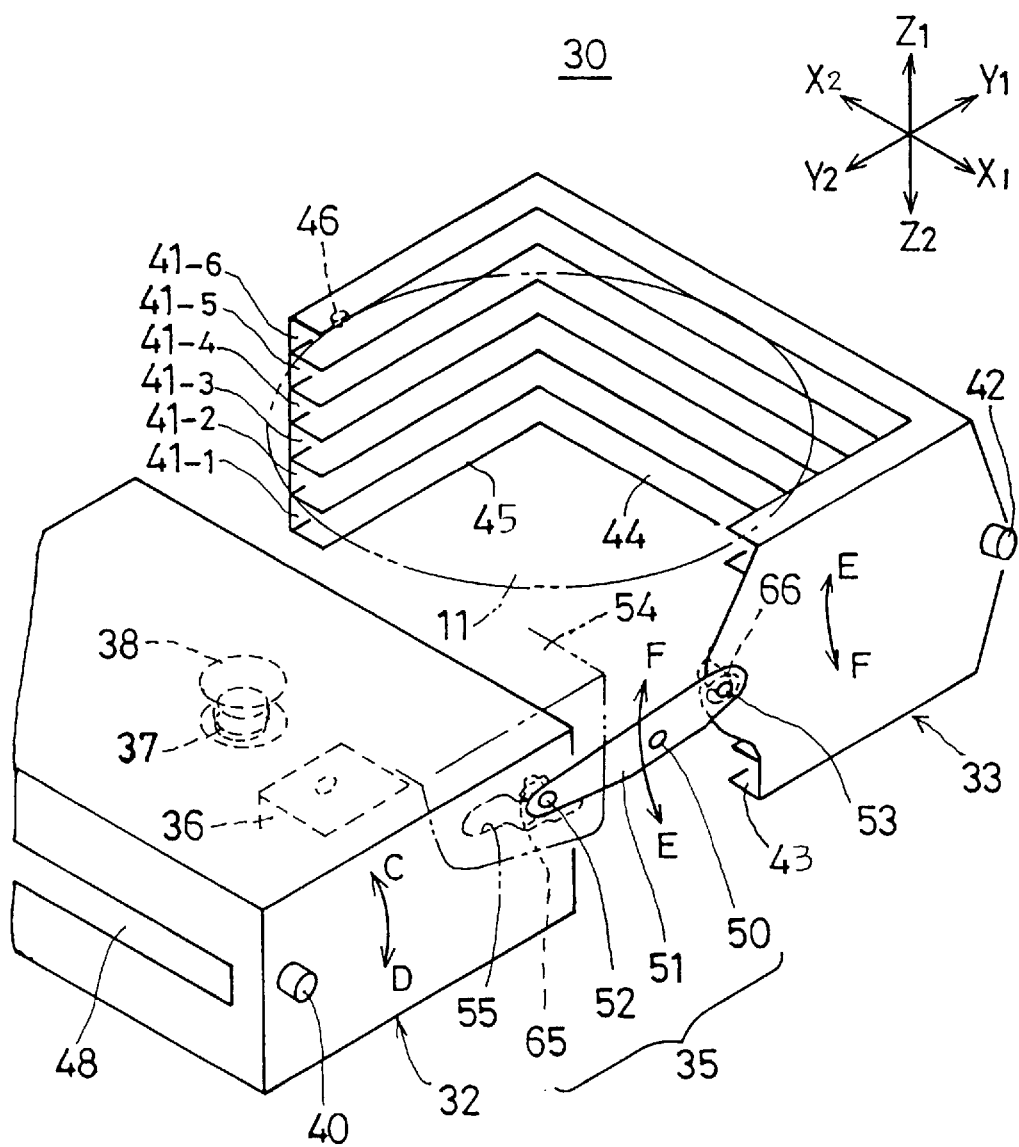
FIG. 6 is a perspective view of the disc reproducing apparatus according to the first embodiment of the present invention.

As shown in FIGS. 6, 8A and 8B, the disc reproducing unit 32 and the disc accommodating unit 33 are opposite to each other, and both are rotated (swung) to be inclined. Thus, an angle a for which the disc reproducing unit 32 must be rotated is smaller than an angle for which the disc reproducing unit 32 must be rotated when it is stationary. An angle of within ±3 degrees with respect to the horizontal position is sufficient for the angle α. Thus, a space 81 necessary for rotation of the disc reproducing unit 32 can be decreased. Similarly, an angle β for which the disc accommodating unit 33 must be rotated is smaller than an angle for which the disc accommodating unit 33 must be rotated when the disc reproducing unit 32 is stationary. An angle of within ±3 degrees with respect to the horizontal position is sufficient for the angle β. Thus, a space 82 necessary for rotation of the disc accommodating unit 33 can be decreased. Additionally, the space 81 and the space 82 are overlapped with each other with respect to the Z direction. Thus, the height H10 of the disc reproducing apparatus 30 is reduced as compared to the conventional disc reproducing apparatuses 10 and 20 shown in FIGS. 1 and 2.

Additionally, since both the disc reproducing unit 32 and the disc accommodating unit 33 are rotated, a time period necessary for the disc conveying path 48 of the disc reproducing unit 32 to be aligned with the desired disc accommodating section of the disc accommodating unit 33 is reduced as compared to the disc reproducing apparatuses 10 and 20 in which only the disc reproducing unit is moved. Accordingly, a time period from the time when an instruction is issued and until an operation responding to the instruction is completed is shorter than the time period necessary for the conventional disc reproducing apparatuses 10 and 20 shown in FIGS. 1 and 2.

A description will now be given of an operation of the disc reproducing apparatus 30.

The disc reproducing apparatus 30 is incorporated in a computer unit. The disc reproducing apparatus 30 takes out the disc 11 from a predetermined disc accommodating section in accordance with the instructions from the computer unit so as to reproduce the disc, and return the reproduced disc to the original disc accommodating section of the disc accommodating unit 33.

Additionally, the disc reproducing apparatus 30 ejects the disc 11 accommodated in a predetermined disc accommodating section of the disc accommodating unit 33 by an action of an operator.

Figure 9A:
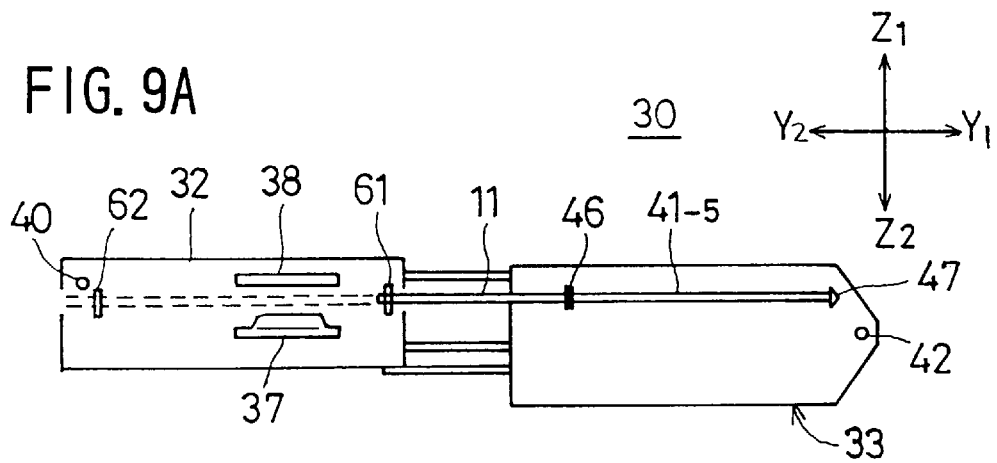
FIGS. 9A, 9B, 9C and 9D are illustrations for explaining an operation for loading and reproducing a disc accommodated in the disc accommodating unit.
Figure 9B:
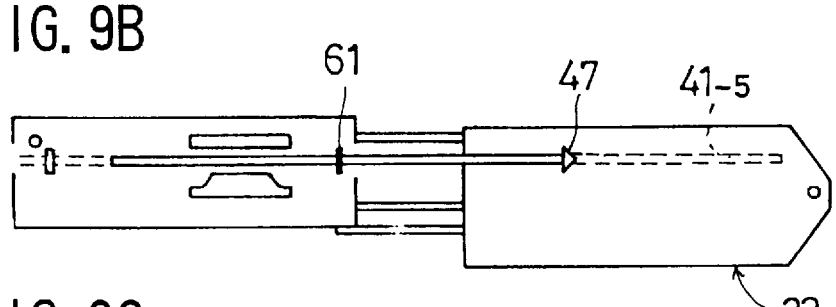
Figure 9C:
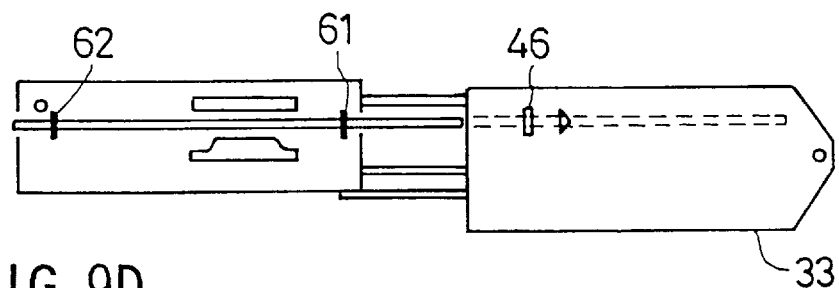
Figure 9D:
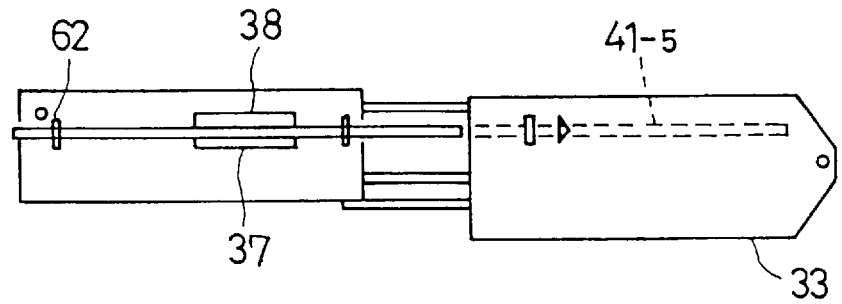

1) An operation for drawing or removing and reproducing, for example, the disc 1 accommodated in the fifth disc accommodating section 41-5 is as follows:

The disc 11 is accommodated in the disc accommodating unit 33. When an instruction for designating the disc 11 in the fifth disc accommodating unit 33 is issued, an operation shown in FIGS. 9A to 9D is performed. In those figures, the disc lock pin 46 and the rollers 61 and 62, shown in black, indicate that these parts are in contact with the disc 11, and when shown in blank indicate that these parts are separated from the disc. Other figures are illustrated in the same manner.

a) The rotating mechanism 35 is operated to rotate both the disc reproducing unit 32 and the disc accommodating unit 33 so that the disc conveying path 48 of the disc reproducing unit 32 is aligned with the fifth disc accommodating section 41-5 as shown in FIG. 7D and FIG. 9A.

b) Next, as shown in FIG. 9B, the lock release and disc pressing mechanism 47 of the fifth disc accommodating section 41-5 is operated so that the engagement of the disc lock pin 46 with the disc 11 is released, and the disc 11 is pushed out from the fifth disc accommodating unit 41-5 in the Y2 direction.

c) Then, the disc conveying mechanism 34 is operated so as to move the rollers 61 and 62 so that the disc 11 which is pushed out of the fifth disc accommodating section 41-5 is supported and conveyed in the Y2 direction to the position in the disc reproducing unit 32 as shown in FIG. 9C.

d) Then, the turntable 37 is moved upwardly and the clamper 38 is moved downwardly to clamp the disc 11 to the turntable 37 as shown in FIG. 9D. The rollers 61 and 62 are retracted and disengaged from the disc 11. Thereafter, the disc 11 is reproduced.

It should be noted that when the disc 11 is present in the disc reproducing unit 32 when the computer unit designates the fifth disc accommodating section 41-5, one of the discs 11 in the disc accommodating unit 33 is conveyed to the disc reproducing unit 32 to start the reproducing operation after an accommodating operation of the disc 11 in the disc reproducing unit 32 is performed or after an ejecting operation (will be described later) of the disc 11 in the disc reproducing unit 32 is performed.

2) An operation for returning the reproduced disc 11 to, for example, the second disc accommodating section 41-2 is as follows:

The disc 11 which was being reproduced is the disc which was taken out from the second disc accommodating section 41-2. Thus, the disc reproducing unit 32 and the disc accommodating unit 33 are in the positions shown in FIG. 7A and FIG. 10A so that the disc conveying path 48 of the disc reproducing unit 32 is aligned with the second disc accommodating unit 41-2.

Figure 10A:
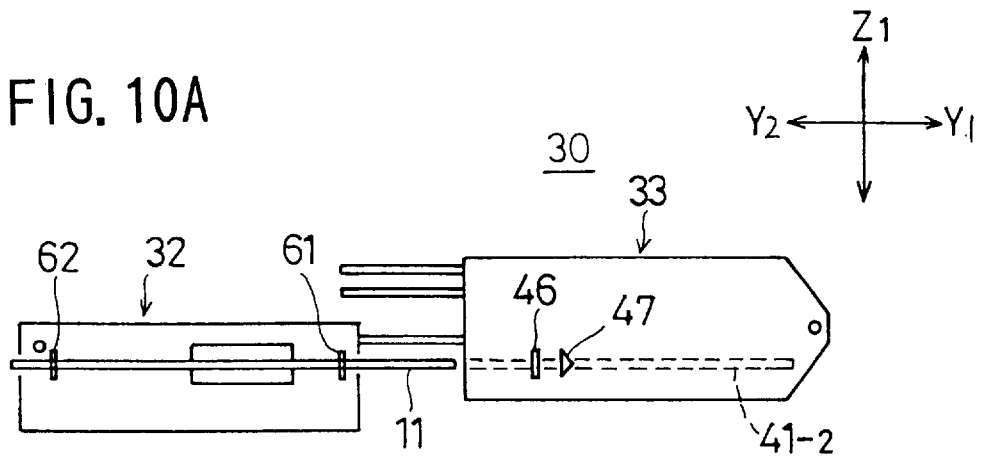
FIGS. 10A, 10B, 10C and 10D are illustrations for explaining an operation for returning a disc to the disc accommodating unit.
Figure 10B:
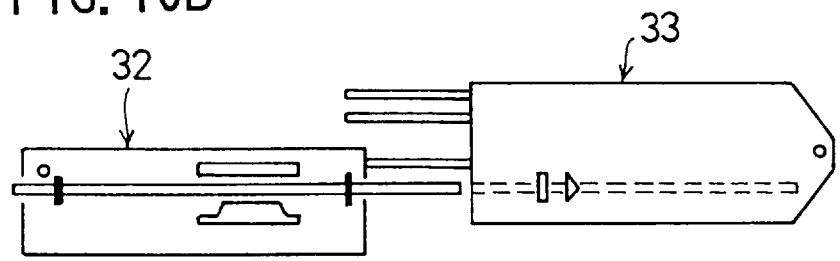
Figure 10C:
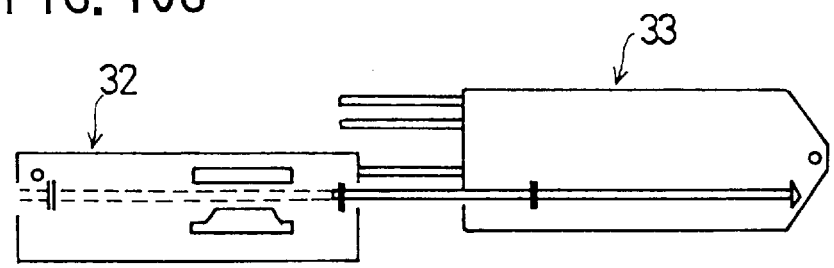
Figure 10D:
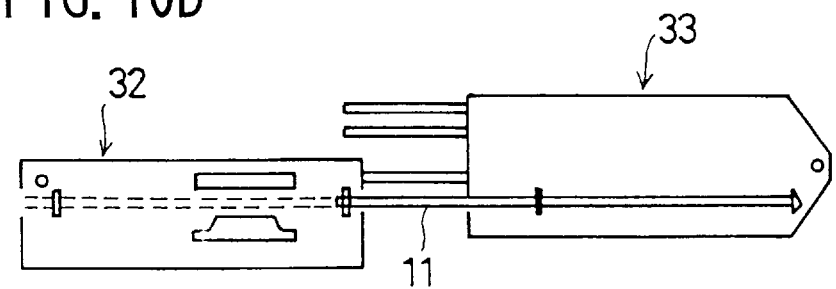
Figure 12:
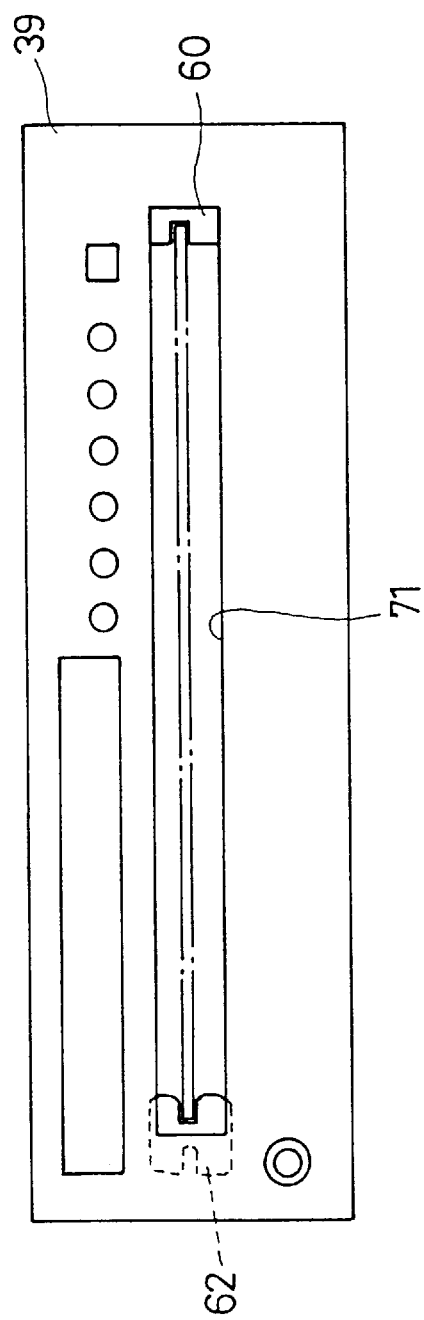
FIG. 12 is a front view of the disc reproducing apparatus shown in FIGS. 3A–3C.

When the computer unit provides an instruction to reproduce a different disc 11, an operation shown in FIGS. 10A to 10D is performed.

a) As shown in FIG. 10B, the disc conveying mechanism 34 is operated to hold the disc 11. Then, the turntable 37 is moved downwardly, and the clamper 38 is moved upwardly so as to release the clamp from the disc 11.

b) Then, as shown in FIG. 10C, the disc conveying mechanism 34 conveys the disc 11 in the Y1 direction to accommodate the disc in the second disc accommodating section 41-2.

c) Finally, as shown in FIG. 10D, the roller 61 is disengaged from the disc 11.

The disc reproducing apparatus 30 repeatedly performs the above-mentioned operation as a regular operation.

The disc reproducing apparatus 30 performs the following operation other than the above-mentioned operation in accordance with instructions of the operator.

3) An operation for reproducing a disc which is inserted from outside the disc reproducing apparatus 30:

If the operator instructs a reproduction of a disc to be inserted from outside the apparatus 30, an operation shown in FIGS. 11A to 11D is performed.

a) The rotating mechanism 35 is operated to rotate both the disc reproducing unit 32 and the disc accommodating unit 33 so that, as shown in FIG. 7A and FIG. 11A, the disc conveying path 48 of the disc reproducing unit 32 is aligned with, for example, the second disc accommodating unit 41-2 which is empty. Then, a motor (not shown in the figures) is operated to open a flap 70 shown in FIG. 5, and thus a disc insertion opening 71 (shown in FIG. 5 and FIG. 12) is opened.

b) Next, the operator inserts the disc 11 through the disc insertion opening 71. When the disc 11 is inserted from the disc insertion opening 71, the disc conveying mechanism 34 conveys the inserted disc 11 in the Y1 direction to a position in the disc reproducing unit 32 as shown in FIG. 11B.

c) Then, as shown in FIG. 11C, the turntable 37 and the clamper are operated to clamp the disc 11 therebetween. Additionally, the disc insertion opening 71 is closed by the flap 70 being returned to the original position.

d) Finally, as shown in FIG. 11D, the rollers 61 and 62 are retracted and disengaged from the disc 11. Thereafter, the disc 11 is reproduced.

Figure 13A:
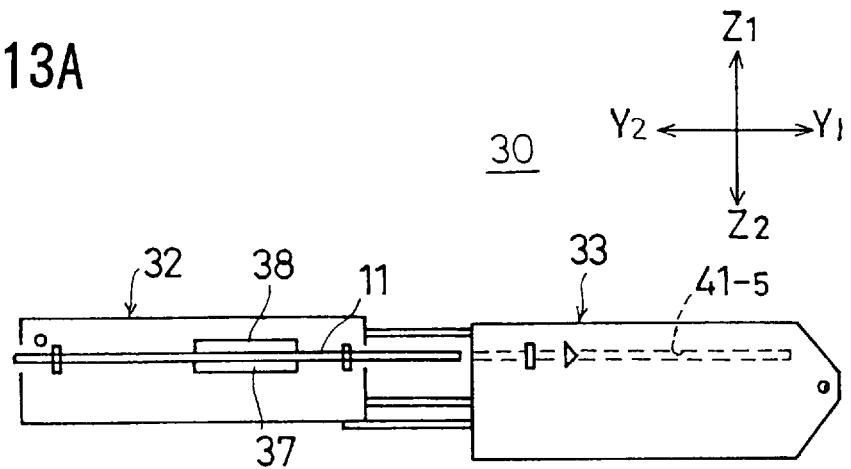
FIGS. 13A, 13B, 13C and 13D are illustrations for explaining an operation for ejecting a disc outside of the disc reproducing apparatus.
Figure 13B:
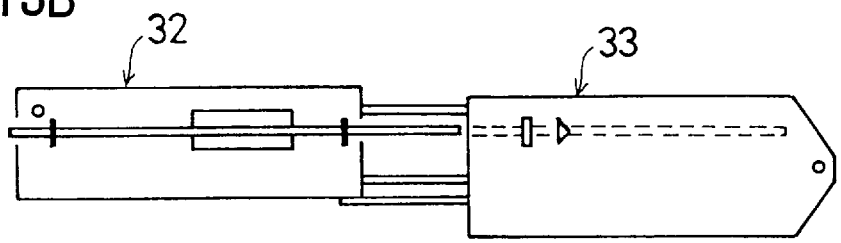
Figure 13C:
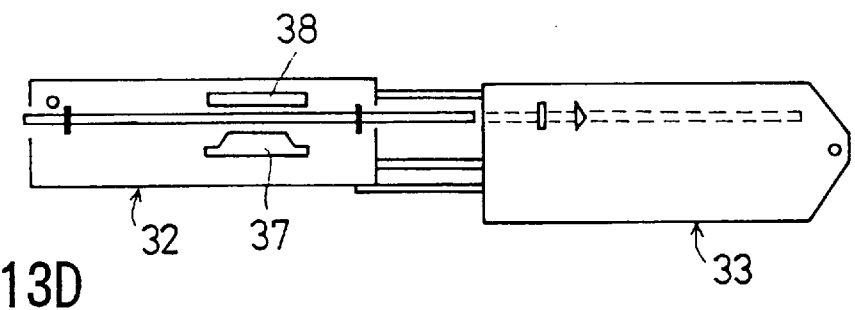
Figure 13D:
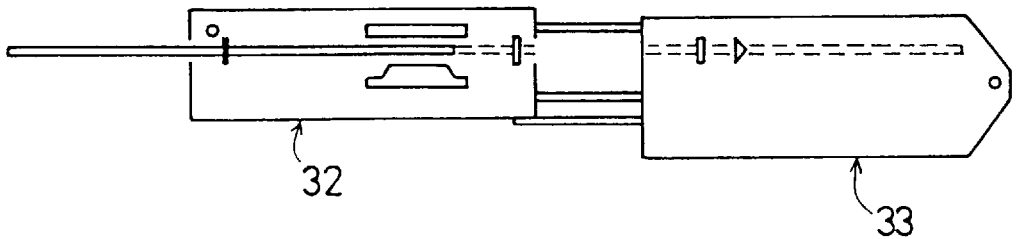

4) An operation of the disc reproducing unit 32 for ejecting a disc to outside of the disc reproducing apparatus 30 is as follows:

When the operator instructs an ejection of the disc shown in FIG. 13A which is being reproduced, an operation shown in FIGS. 13B to 13D is performed.

a) As shown in FIG. 13B, the disc conveying mechanism is operated to hold the disc 11.

b) Then, as shown in FIG. 13C, the clamping force of the disc 11 is released. Additionally, a motor (not shown in the figures) is operated to rotate the flap 70 shown in FIG. 5 so as to open the disc insertion opening 71.

c) Then, as shown in FIG. 13D, the disc conveying mechanism 34 conveys the disc 11 in the Y2 direction so that a portion of the disc 11 protrudes outside the disc reproducing apparatus 30.

Thereafter, the operator holds and removes the disc 11 from the disc reproducing apparatus 33.

After the disc 11 is removed, the flap 70 returns to the original position, and the disc insertion opening 71 is closed.

5) An operation for receiving a disc from outside the disc reproducing apparatus 30 to the disc accommodating unit 33 is as follows:

When the operator provides instructions to perform the accommodating operation and designates one of the disc accommodating sections, for example, the third disc accommodating section 41-3 to which the disc should be accommodated or received, an operation shown in FIGS. 14A to 14D is performed.

a) The rotating mechanism 35 is operated to rotate both the disc reproducing unit 32 and the disc accommodating unit 33 so that the disc conveying path 48 of the disc reproducing unit 32 is aligned with the third disc accommodating section 41-3 as shown in FIG. 7B and FIG. 14A. Then, the motor (not shown in the figures) is rotated to rotate the flap 70 shown in FIG. 5 so as to open the disc insertion opening 71.

b) Then, as shown in FIG. 14B, the operator inserts the disc 11 through the disc insertion opening 71. When the disc 11 is inserted from the disc insertion opening 71, the disc conveying mechanism 34 conveys the inserted disc 11 in the Y1 direction. The disc conveying mechanism 34 conveys the disc 11 to the third disc accommodating section 41-3 of the disc accommodating unit 33 by passing the disc 11 through the disc conveying path 48 of the disc reproducing unit 32. Additionally, the flap 70 is returned to the original position, and the disc insertion opening 71 is closed.

c) Then, as shown in FIG. 14C, the disc lock pin 46 is engaged with a periphery of the disc 11 so as to hold the disc 11.

d) Finally, as shown in FIG. 14D, the roller 61 is disengaged from the disc 11.

6) An operation for ejecting a disc in the disc accommodating unit 33 to outside of the disc reproducing apparatus 30:

When the operator provides instructions to perform an ejecting operation and designates, for example, the fourth disc accommodating section 41-4, an operation shown in FIGS. 15A to 15C is performed.

a) The rotating mechanism 35 is operated to rotate both the disc reproducing unit 32 and the disc accommodating unit 33 so that the disc conveying path 48 of the disc reproducing unit 32 is aligned with the fourth disc accommodating section 41-4 as shown in FIG. 7C and FIG. 15A.

b) Then, as shown in FIG. 15B, the engagement of the disc lock pin 46 with the disc 11 is released, and the disc 11 is pressed out from the fourth disc accommodating section 41-4 in the Y2 direction. Then, the disc conveying mechanism is operated. Additionally, the flap 70 is rotated to open the disc insertion opening 71.

c) The disc conveying mechanism 34 conveys the disc in the Y2 direction so that a part of the disc 11 protrudes from the disc reproducing apparatus 30 as shown in FIG. 15C.

Thereafter, the operator holds and removes the disc 11 from the disc reproducing apparatus 30.

After the disc 11 is taken out, the flap 70 returns to the original position, and the disc insertion opening 71 is closed.

As mentioned above, the disc reproducing apparatus 30 has the following advantages.

1) The height H10 of the disc reproducing apparatus 30 is reduced.

This is achieved by the following.

a) The disc reproducing unit 32 and the disc accommodating unit 33 are opposite to each other, and both are rotated (swung) to be inclined as shown in FIGS. 8A and 8B. Thus, the angle α for which the disc reproducing unit 32 must be rotated is smaller than an angle for which the disc reproducing unit 32 must be rotated when the disc accommodating unit 33 is stationary. Thus, the space 81 necessary for rotation of the disc reproducing unit 32 can be decreased. The angle α is approximately 6 degrees.

b) The angle β for which the disc accommodating unit 33 must be rotated is smaller than an angle for which the disc accommodating unit 33 must be rotated when the disc reproducing unit 32 is stationary and only the disc accommodating unit 33 is to be rotated. Thus, the space 82 necessary for rotation of the disc accommodating unit 33 can be decreased. The angle β is approximately 6 degrees.

c) The space 81 necessary for rotation of the disc reproducing unit 32 and the space 82 necessary of rotation of the disc accommodating unit 33 are overlapped with each other in the Z direction.

2) The distance g1 between adjacent discs 11 accommodated in the disc accommodating sections 41-1 to 41-6 is not reduced.

This is for the reason that the disc accommodating units are arranged in parallel relationship to each other.

3) A time period from the time when an instruction is issued and until an operation responding to the instruction is completed is reduced.

This is for the reason that since both the disc reproducing unit 32 and the disc accommodating unit 33 are rotated, a time period necessary for the disc conveying path 48 of the disc reproducing unit 32 to be aligned with the desired disc accommodating section of the disc accommodating unit 33 is reduced.

FIG. 16 shows a variation of the rotating mechanism. A rotating mechanism 35A shown in FIG. 16 comprises a gear portion 90 which is provided to the disc reproducing unit 32 and which is rotatable about the pin 40 as a center of rotation, a gear portion 91 which is provided to the disc accommodating unit 33 and is rotatable about the pin 42 as a center of rotation, and a gear 92 which is located between the gear portions 90 and 91 so as to engage with both the gear portions 90 and 91.

When the gear 92 is rotated, the disc reproducing unit 32 and the disc accommodating unit 33 are rotated in the opposite directions to each other, that is, inclined in the reverse directions.

It should be noted that there is no limitation to the positional relationship between the center of rotation of the disc reproducing unit 32 and the center of rotation of the disc accommodating unit 33, and the positions can be freely determined. For example, the center of rotation of the disc reproducing unit 32 may be determined to be near the center of gravity of the disc reproducing unit 32. Similarly, the center of rotation of the disc accommodating unit 33 may be determined to be near the center of gravity of the disc accommodating unit 33.

It should be noted that when the disc is inserted into the disc reproducing apparatus 30, the direction of insertion of the disc must be aligned with the position of the disc reproducing apparatus 32. However, there is no problem caused by a deflection between the insertion angle and the angle of the disc reproducing unit 32 since a range of inclination of the disc reproducing unit 32 is only ±3 degrees with respect to the horizontal position.

The present invention may be applied to any recording medium reproducing apparatus using a recording medium other than a disc.

Figure 17:
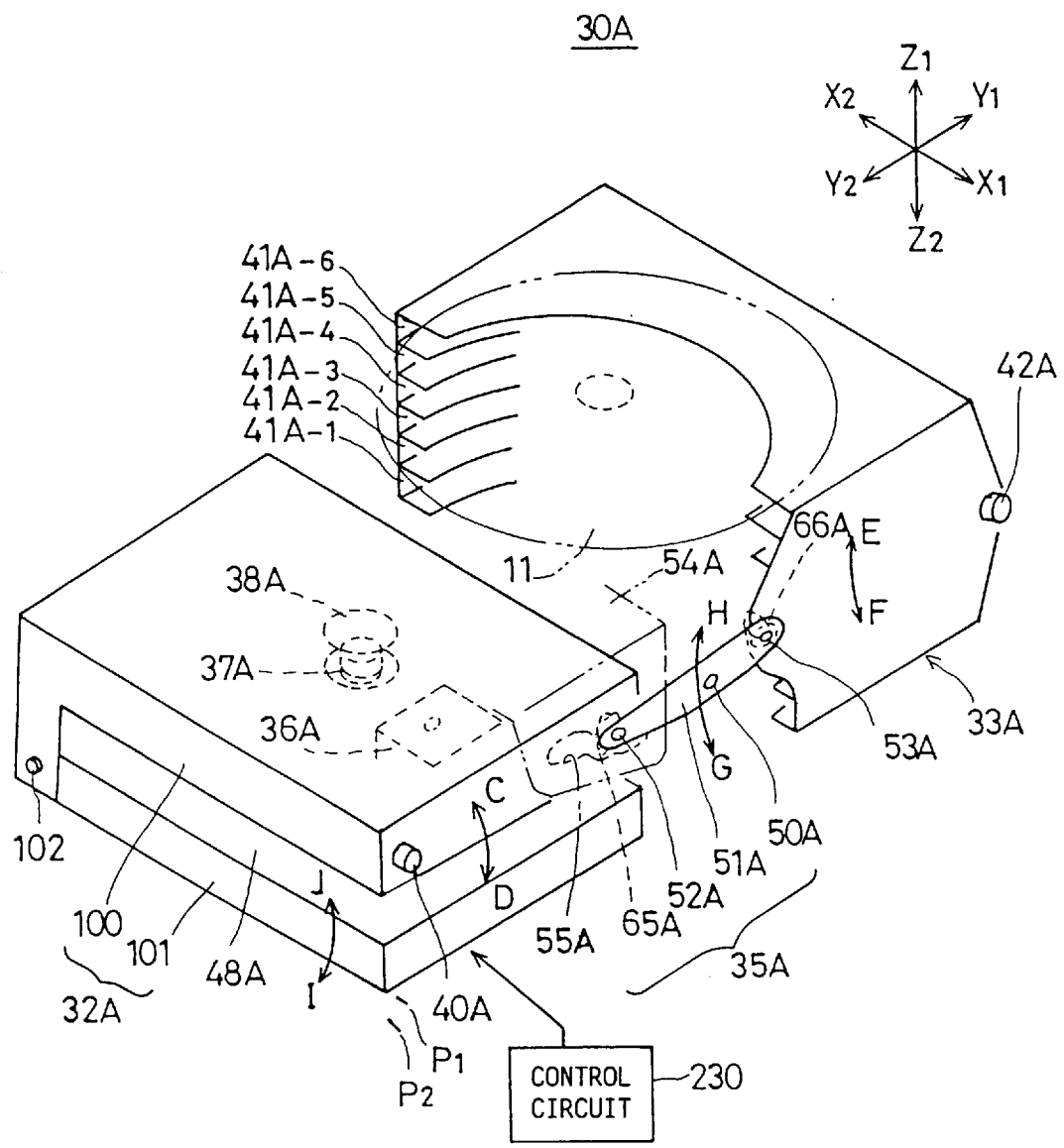
FIG. 17 is a perspective view of a disc reproducing apparatus according to a second embodiment of the present invention.

Second Embodiment (FIG. 17 to FIG. 68)

In FIGS. 17 to 68, parts that are the same as the parts shown in FIGS. 3 to 18 are given the same reference numerals with suffix A.

FIGS. 17 to 19 show an outline of a disc reproducing apparatus 30A according to a second embodiment of the present invention.

The disc reproducing apparatus 30A comprises a gate-type frame 31A, a disc reproducing unit 32A reproducing the discs 11 which are recording media, a disc accommodating unit 33A which accommodates a plurality of discs 11 in a horizontally stacked state, a disc conveying mechanism 34A which conveys the discs between the disc accommodating unit 33 and the disc reproducing unit 32, and a rotating mechanism 35A which rotates both the disc reproducing unit 32 and the disc accommodating unit 33.

The disc reproducing unit 32A corresponds to the recording medium reproducing unit. The disc accommodating unit 33A corresponds to the recording medium accommodating unit. The disc conveying mechanism 34A corresponds to the recording medium conveying mechanism. The rotating mechanism 35A corresponds to the rotating mechanism.

As shown in FIG. 19, the disc reproducing unit 32A and the disc accommodating unit 33A are arranged so that the disc 11 located in the disc reproducing unit 32A partially overlaps the disc 11 located in the disc accommodating unit 33A. Thus, a dimension of the disc reproducing unit 30A in the Y-direction is short. The reason that there is no problem due to the disc 11 partially overlapping the disc 11 is that the disc reproducing unit 32A does not rotate when the disc 11 is loaded in the disc reproducing unit 32A as will be described later.

Figure 29:
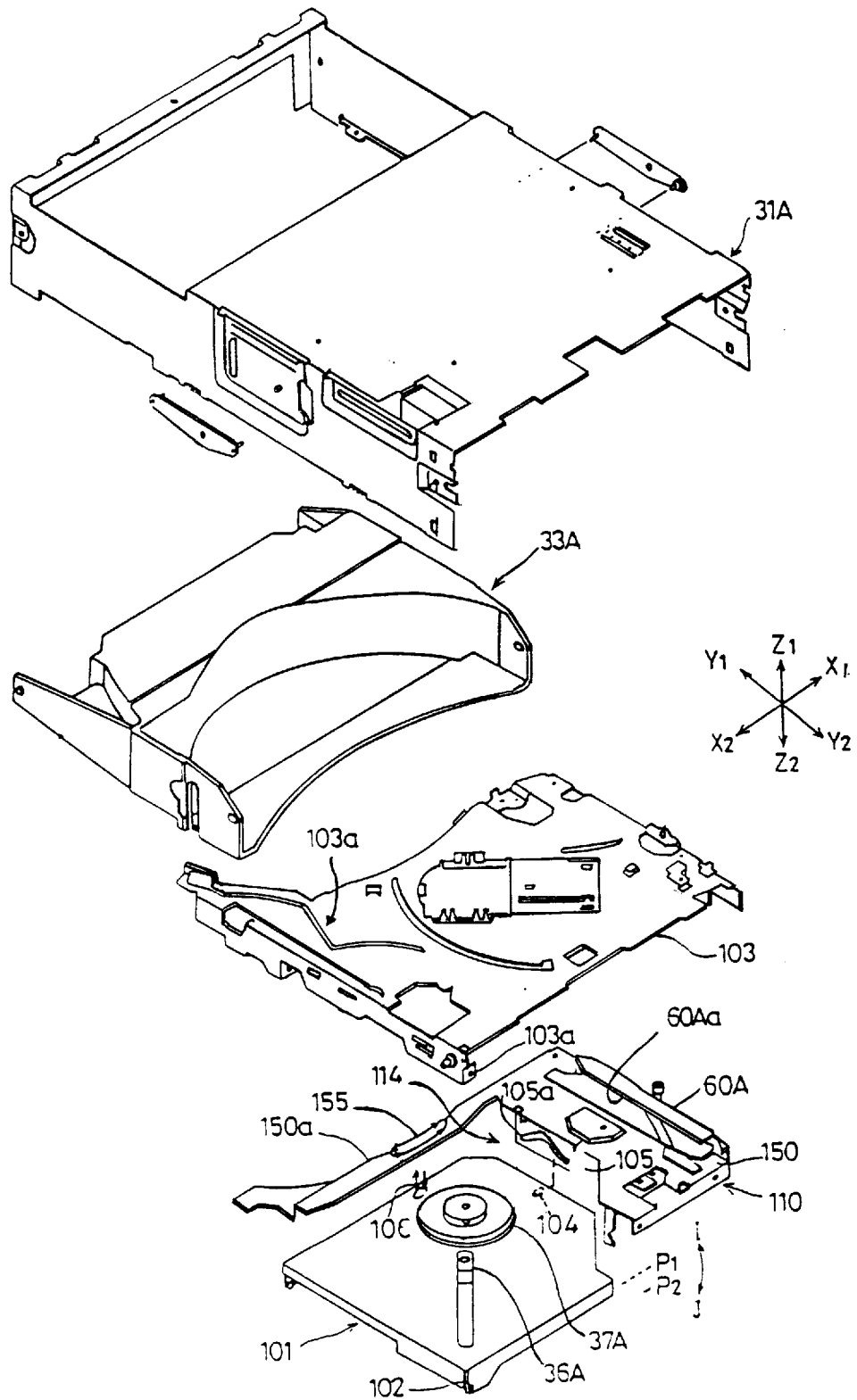
FIG. 29 is an exploded perspective view of mainly the disc reproducing unit and a drive mechanism assembly in the disc reproducing apparatus.

As shown in FIGS. 17 and 29, in the disc reproducing unit 32A, a loading assembly 100 is located above a disc reproducing unit body 101 so that the disc reproducing unit 101 is supported by the loading assembly 100. A disc conveying path 48A is formed between the loading assembly 100 which is located in an upper position and the disc reproducing unit body 101 which is located in a lower position. A pin 40A corresponds to the recording medium reproducing unit supporting unit.

The disc reproducing unit 32A is supported by the gate-type frame 31A via the pin 40A on both the X1 side and the X2 side of the side (Y2 side) of the loading assembly 100 adjacent to a front bezel 39A, and is rotatable in the C and D directions.

The disc reproducing unit body 101 is supported by a pin 102 protruding in the Y1 and Y2 directions and a pin 104 located on the X1 side and protruding in the X1 direction. The pin 102 engages with an opening 103a of a chassis 103. The pin 104 engages with a guiding groove 105a of a slide member 105. The disc reproducing unit body 101 is rotatable about the pin 102 in the I and J directions due to the slide member 105 moving in the Y1 and Y2 directions. That is, the disc reproducing unit body 101 can be swung between a horizontal position P1 and a diagonally lower position P2 when viewed from the front bezel 39A side. Thus, the disc reproducing unit body 101 swings in the C and D directions together with the loading assembly 100, and also swings independently in the I and J directions.

The disc reproducing unit body 101 comprises an optical pick-up 36A, a turntable 37A and a disc detector 106 which optically detects the disc 11.

The loading assembly 100 comprises the chassis and parts mounted thereon. The parts mounted on the chassis 103 include a clamper 38A, a clamper holder moving mechanism 107, the disc conveying mechanism 34A, an insertion lever 108, an eject lever 109, a drive mechanism assembly 110, a disc insertion opening member 111, a flap 112, a flap opening mechanism 113, a turntable moving mechanism 114 and a disc clamp mechanism 190.

The clamper holder moving mechanism 107, the disc conveying mechanism 34A, the insertion lever 108, the eject lever 109, the drive mechanism assembly 110, the disc insertion opening member 111, the flap 112, the flap opening mechanism 113 and the turntable moving mechanism 114 will be described in detail later.

Figure 48:
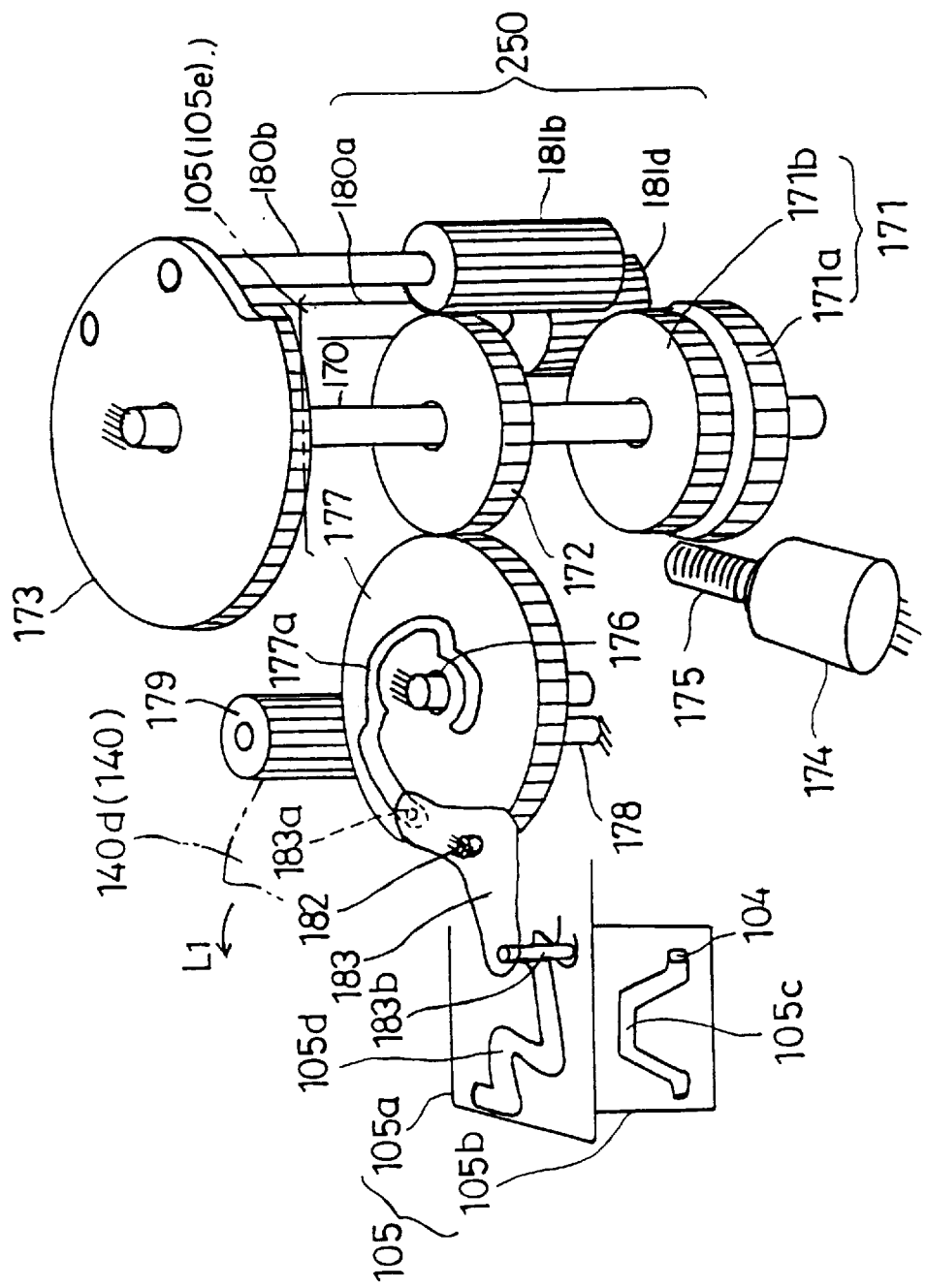
FIG. 48 is a perspective view of a drive mechanism assembly.

The drive mechanism assembly 110 comprises, as shown in FIG. 48, a loading motor 174, the slide member 105 and bears, and is mounted on a lower surface of the chassis 103.

Figure 31:
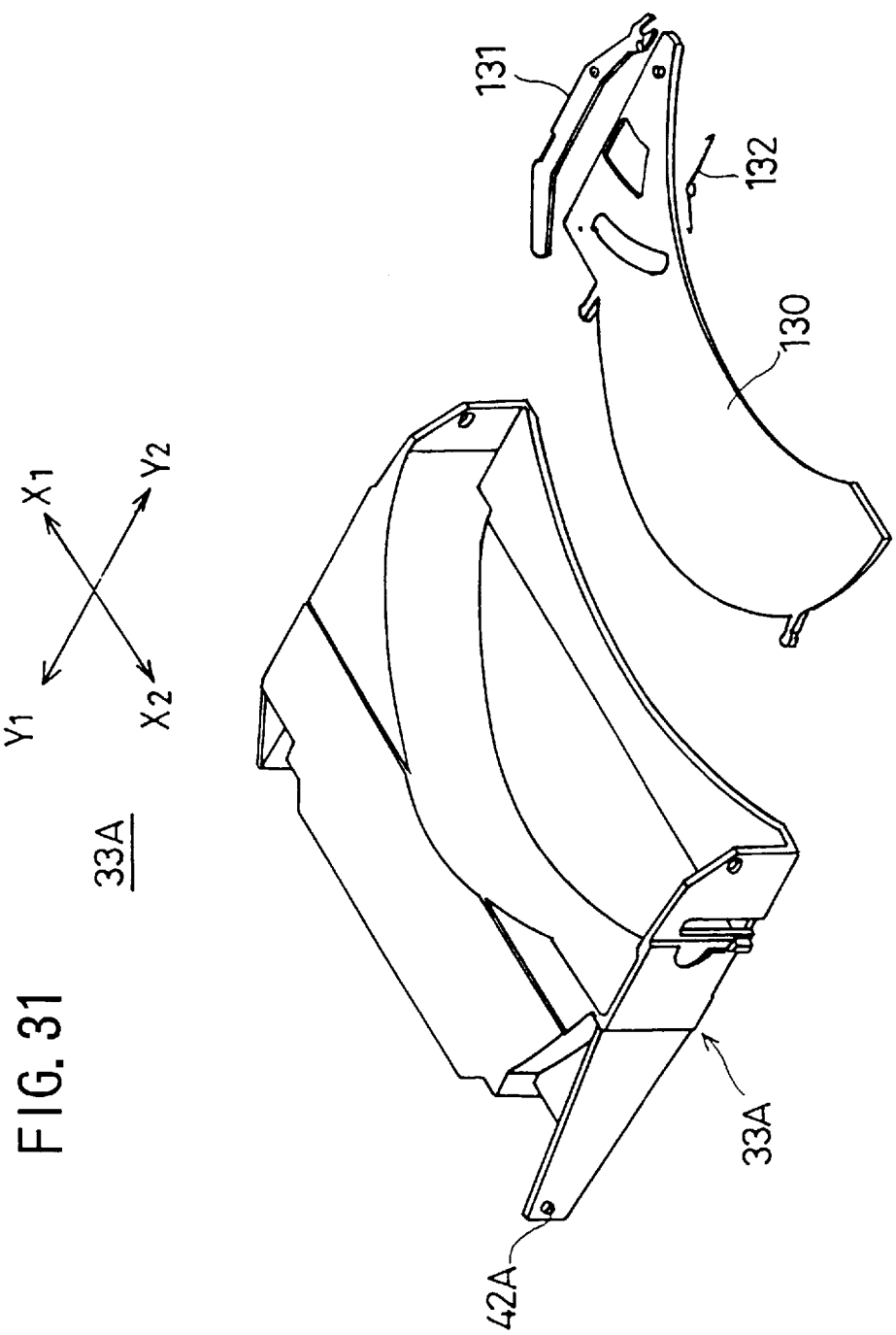
FIG. 31 is an exploded perspective view of the disc accommodating unit.

The disc accommodating unit 33A comprises first to sixth disc accommodating sections 41A-1 to 41A-6 which are arranged in parallel as also shown in FIG. 31. The disc accommodating unit 33A is located on the inner side (Y1 side) of the disc reproducing unit 32A. The disc reproducing unit 33A is rotatably supported in the E and F directions by the gate-type frame 31A by pins 42A at X1 and X2 sides on the Y1 side. The pins 42A correspond to a recording medium accommodating unit supporting mechanism.

The discs 11 are accommodated in the respective disc accommodating sections 41A-1 to 41A-6 (may be referred to as a disc accommodating section 41A). The discs 11 are arranged parallel to each other. A distance g1 between the adjacent discs 11 in the vertical direction is sufficiently large so that the discs 11 do not contact each other when the discs are conveyed.

The disc accommodating section 41 is defined by separating plates 130. In each of the disc accommodating sections 41A-1 to 41A-6, a stock arm 131 is provided. The stock arm 131 holds the disc 11 in the disc accommodating section 41A by pressing a periphery of the disc 11. The stock arm also functions to push out the disc 11 from the disc accommodating section 41A. The stock arm 131 is provided to each of the disc accommodating sections 41A-1 to 41A-6, and each is independently operable with respect to each other. The stock arm 131 has a generally reversed C-shape, and is supported at a portion slightly shifted from the center in the Y2 direction. The stock arm 131 comprises, as shown in FIG. 19, a pressing finger 131a on the end of the Y1 direction and a pushing finger 131c on the end of the Y1 direction. A more detailed description will be provided later.

Figure 26:
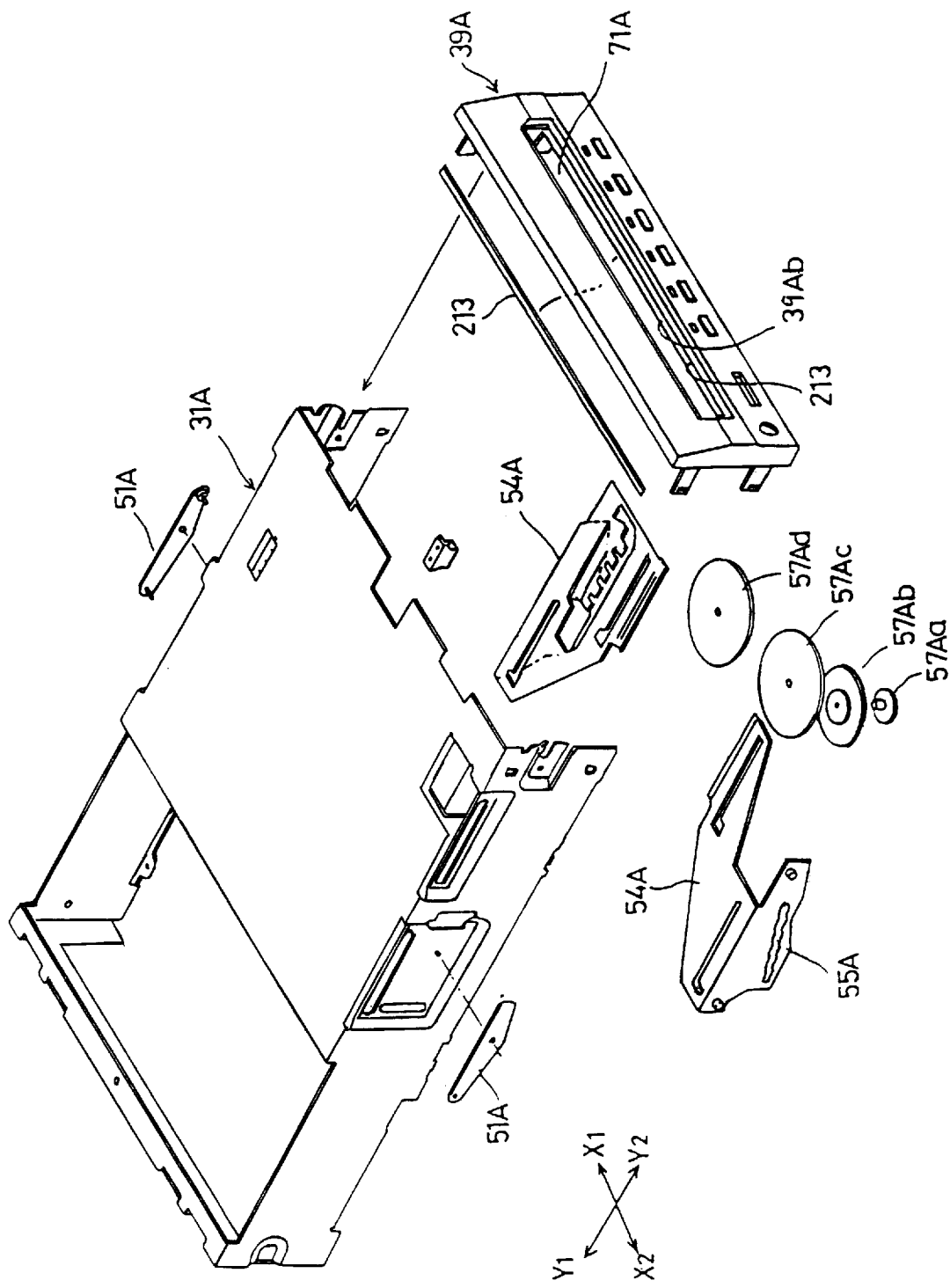
FIG. 26 is an exploded perspective view of mainly a rotating mechanism and a front bezel in the disc reproducing apparatus.
Figure 28:
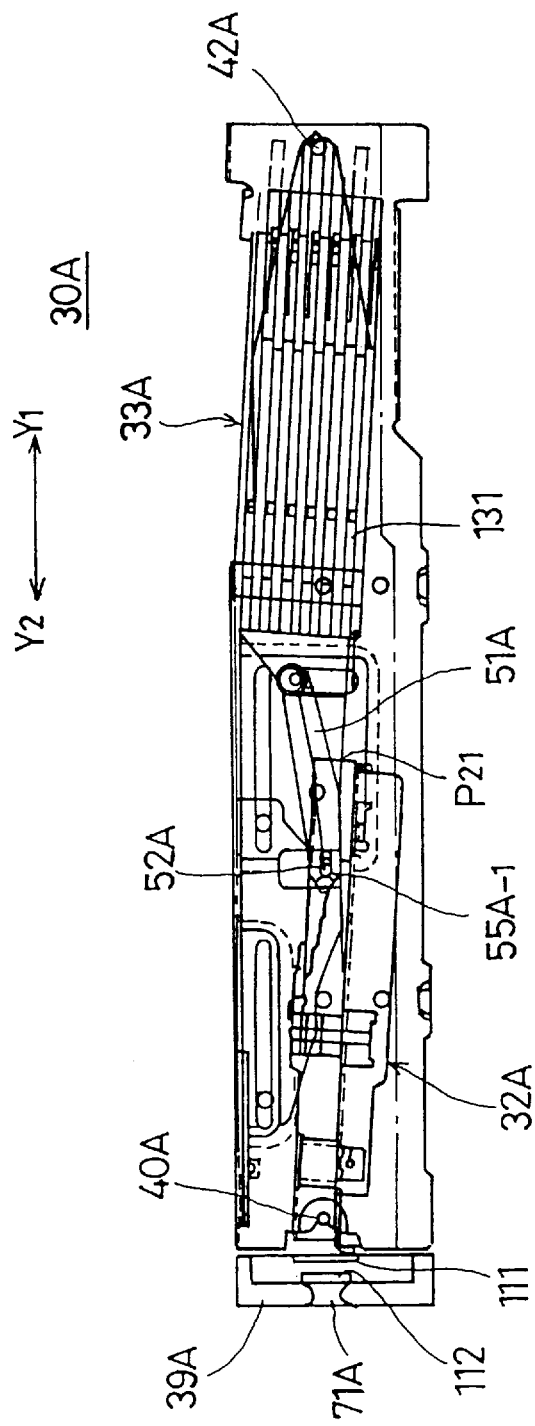
FIG. 28 is a side view of the disc reproducing apparatus.

The rotating mechanism 35A is provided on the X1 side and the X2 side as shown in FIGS. 26, 27 and 28. The rotating mechanism 35A on the X1 side comprises an arm 51A which is rotatably supported by a pin 50A fixed to a side plate 31Aa of the frame 31A. A pin 52A on an end of the arm 51A is fit in an elongated opening 65A formed on the Y1 side of the disc reproducing unit 32A. A pin 53A on the opposite end of the arm 51A is fit in an elongated opening 66A on the Y2 side of the disc reproducing unit 32A. A slider 54A is movable in the Y1 and Y2 directions, and the pin 52A is fit in a stepwise opening 55A formed on the slider 54A. The rotating mechanism 35 comprises a mechanism which includes a motor 56A and gears 57Aa to 57Ad provided on an inner surface of a top plate 31Ab of the frame 31A and a rack gear 54Aa which is a part of the slider 54A so as to move the slider 54A in the Y1 and Y2 directions. The rotating mechanism 35A further comprises a position detecting mechanism which includes a slit 54Ab which is a part of the slider 54A and an optical sensor 58A. The stepwise opening 55A includes the first to sixth steps 55A-1 to 55A-6 as shown in FIG. 27C.

In the rotating mechanism 35A, the pin 52A is shifted as shown in FIGS. 32A to 32E as the slider 54A is moved by the motor 56A in the Y1 direction. Additionally, the rotating mechanism 35A moves the disc accommodating unit 33A in the F direction (shown in FIG. 6). When the slider 54A moves in the Y1 direction, the pin 52A is shifted by the stepwise opening 55A and the disc reproducing unit 32A is rotated in the C direction via the arm 51A. At the same time, the disc accommodating unit 33 is rotated in the F direction by the arm 51. On the other hand, when the slider 54A is moved in the Y2 direction, the pin 52A is reversely shifted by the stepwise opening 55A and the disc reproducing unit is rotated in the D direction. At the same time, the disc accommodating unit 33A is rotated in the E direction by the arm 51A.

When the first step 55A-1 engages with the pin 52A, the disc reproducing unit 32A is rotated to a maximum extent in the D direction and the disc conveying path 48A is located in a position P21 as shown in FIGS. 18A and 28, and the disc reproducing unit 32A is rotated to a maximum extent in the E direction. In this state, the disc conveying path 48A of the disc reproducing unit 32A is aligned with the first disc accommodating section 41A-1.

Figure 32A:
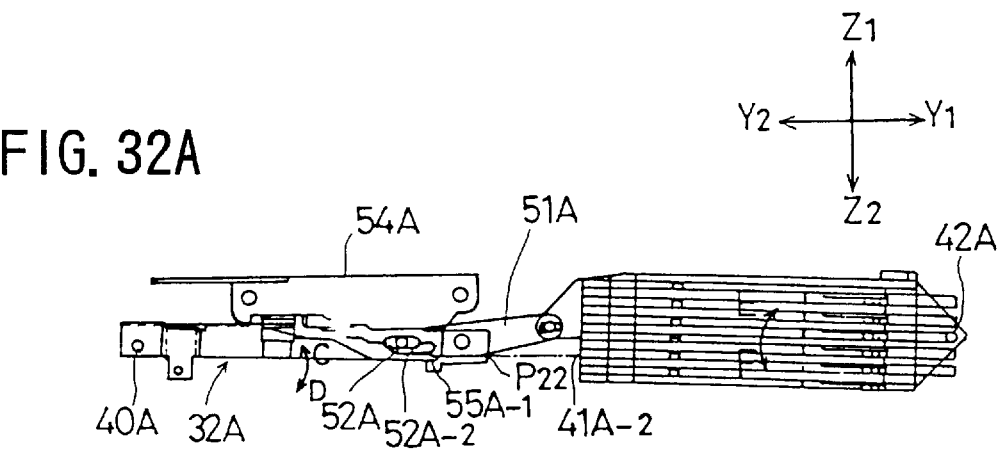
FIGS. 32A, 32B, 32C, 32D and 32E are illustrations for explaining an operation of the rotating mechanism.

When the second step 55A-2 engages with the pin 52A, the disc reproducing unit 32A is slightly rotated in the C direction and the disc conveying path 48A is located in a position P22 as shown in FIG. 32A, and the disc accommodating unit 33A is slightly rotated in the F direction. In this state, the disc conveying path 48A of the disc reproducing unit 32A is aligned with the second disc accommodating section 41A-2.

Figure 32B:
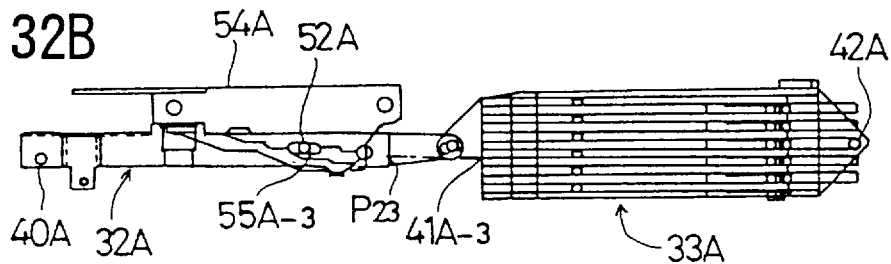

When the third step 55A-3 engages with the pin 52A, the disc reproducing unit 32A is slightly rotated in the C direction and the disc conveying path 48A is located in a position P23 as shown in FIG. 32B, and the disc accommodating unit 33A is slightly rotated in the F direction. In this state, the disc conveying path 48A of the disc reproducing unit 32A is aligned with the third disc accommodating section 41A-3.

Figure 32C:
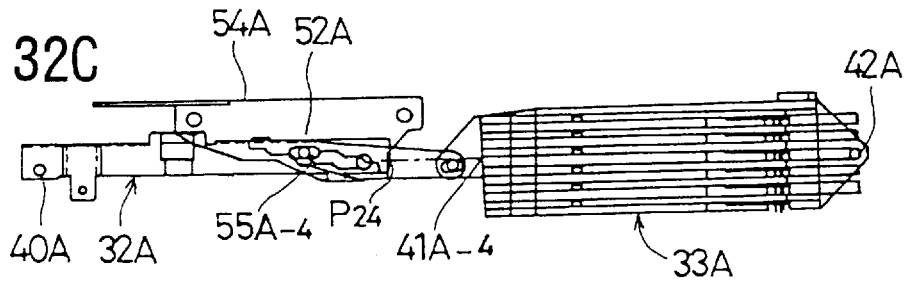

When the fourth step 55A-4 engages with the pin 52A, the disc reproducing unit 32A is slightly rotated in the C direction and the disc conveying path 48A is located in a position P24 as shown in FIG. 32C, and the disc accommodating unit 33A is slightly rotated in the F direction. In this state, the disc conveying path 48A of the disc reproducing unit 32A is aligned with the fourth disc accommodating section 41A-4.

Figure 32D:
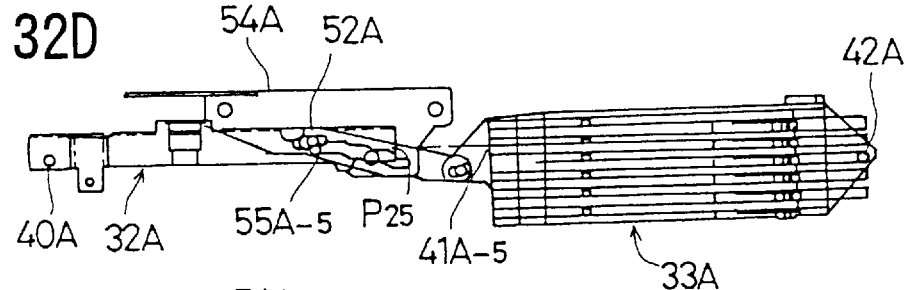

When the fifth step 55A-5 engages with the pin 52A, the disc reproducing unit 32A is further rotated in the C direction and the disc conveying path 48A is located in a position P25 as shown in FIG. 32D, and the disc accommodating unit 33A is also slightly rotated in the F direction. In this state, the disc conveying path 48A of the disc reproducing unit 32A is aligned with the fifth disc accommodating section 41A-5.

Figure 32E:
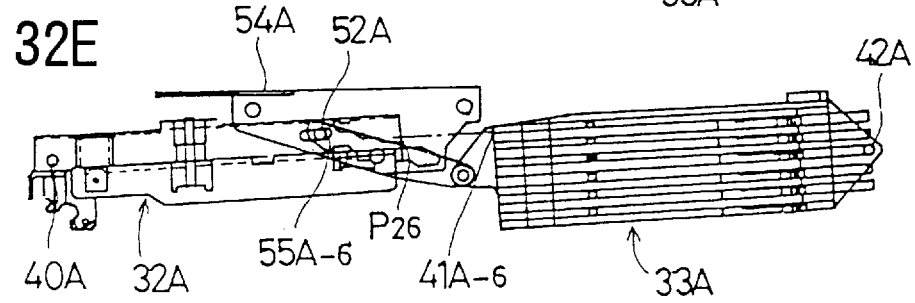

When the sixth step 55A-6 engages with the pin 52A, the disc reproducing unit 32A is rotated to a maximum extent in the C direction and the disc conveying path 48A is located in a position P26 as shown in FIGS. 18B and 32E, and the disc accommodating unit 33A is also rotated to a maximum extent in the F direction. In this state, the disc conveying path 48A of the disc reproducing unit 32A is aligned with the sixth disc accommodating section 41A-6.

The disc conveying mechanism 34A and other mechanisms will be described later for the sake of convenience.

As shown in FIGS. 19 and 20A to 20D, the disc reproducing unit 32A and the disc accommodating unit 33A are opposite to each other, and both are rotated (swung) to be inclined. Thus, an angle $\alpha$ for which the disc reproducing unit 32A must be rotated is smaller than an angle for which the disc reproducing unit 32A must be rotated when it is stationary. An angle of within ±3 degrees with respect to the horizontal position is sufficient for the angle $\alpha$. Thus, a space 81A necessary for rotation of the disc reproducing unit 32A can be decreased. Similarly, an angle $\beta$ for which the disc accommodating unit 33A must be rotated is smaller than an angle for which the disc accommodating unit 33A must be rotated when the disc reproducing unit 32A is stationary. An angle of within ±3 degrees with respect to the horizontal position is sufficient for the angle $\beta$. Thus, a space 82A necessary for rotation of the disc accommodating unit 33A can be decreased. Additionally, the space 81A and the space 82A are overlapped with each other in the Z direction. Thus, the height H10 of the disc reproducing apparatus 30A is reduced as compared to the conventional disc reproducing apparatuses 10 and 20 shown in FIGS. 1 and 2.

Additionally, since both the disc reproducing unit 32A and the disc accommodating unit 33A are rotated, a time period necessary for the disc conveying path 48A of the disc reproducing unit 32A to be aligned with the desired disc accommodating section of the disc accommodating unit 33A is reduced as compared to the disc reproducing apparatuses 10 and 20 in which only the disc reproducing unit is moved. Accordingly, a time period from the time when an instruction is issued and until an operation responding to the instruction is completed is shorter than the time period necessary for the conventional disc reproducing apparatuses 10 and 20 shown in FIGS. 1 and 2.

A description will now be given of an operation of the disc reproducing apparatus 30A.

The disc reproducing apparatus 30A is incorporated in a computer unit. The disc reproducing apparatus 30A takes out or removes the disc 11 from a predetermined disc accommodating section in accordance with the instructions from the computer unit so as to reproduce the disc, and returns the reproduced disc to the original disc accommodating unit 33A.

Additionally, the disc reproducing apparatus 30 ejects the disc 11 accommodated in a predetermined disc accommodating section of the disc accommodating unit 33 by an action of an operator.

Figure 20A:
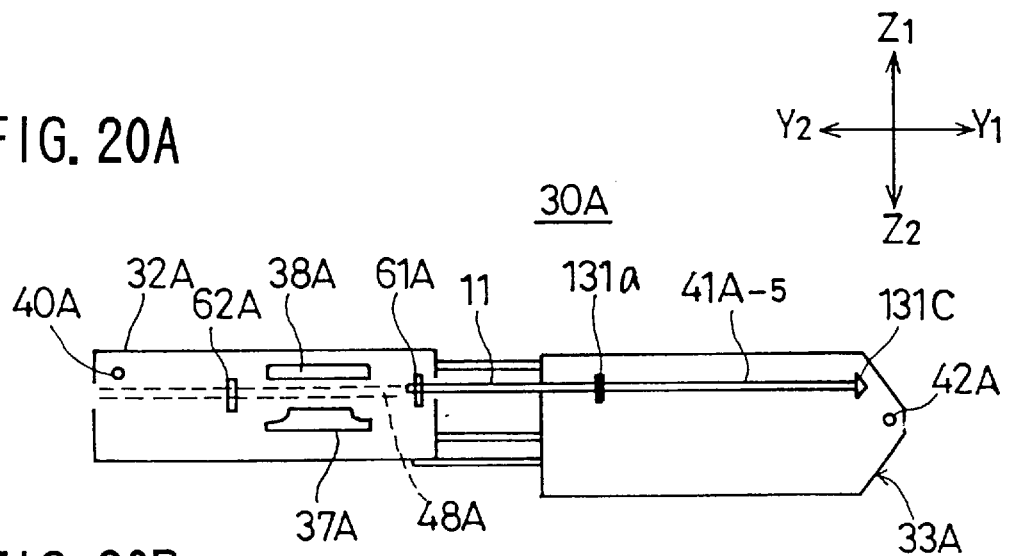
FIGS. 20A, 20B, 20C and 20D are illustrations for explaining an operation for loading and reproducing a disc accommodated in the disc accommodating unit.
Figure 20B:
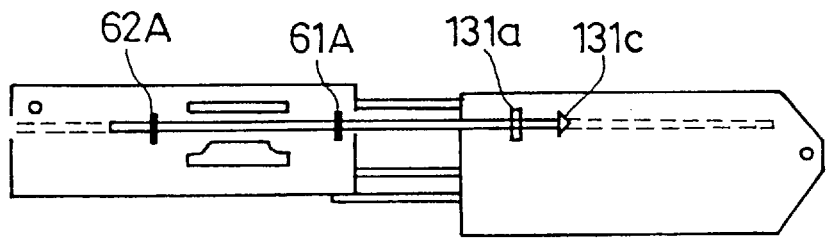
Figure 20C:
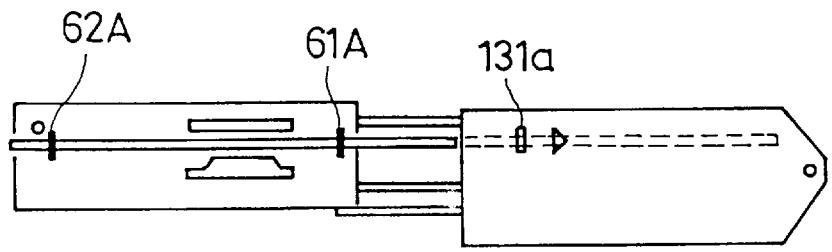
Figure 20D:
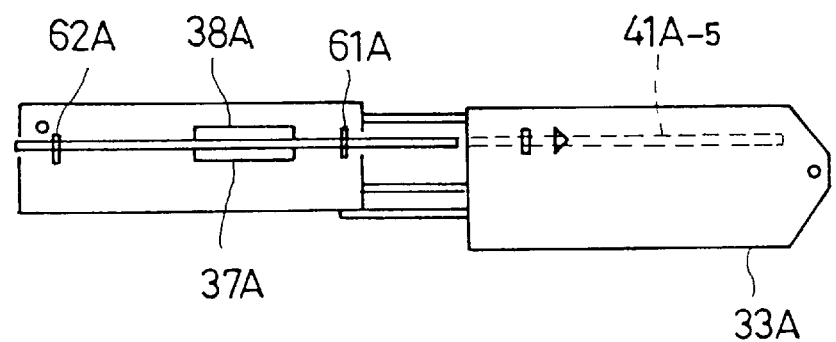

1) An operation for removing and reproducing, for example, the disc 11 accommodated in the fifth disc accommodating section 41-5 is as follows:

The disc 11 is accommodated in the disc accommodating unit 33A. When an instruction for designating the disc 11 in the fifth disc accommodating unit 33A is issued, an operation shown in FIGS. 20A to 20D is performed. In those figures, the disc lock pin 46A and the rollers 61A*a* and 62A*a* which are in black to indicate that these parts are in contact with the disc, and the parts are blank to indicate that these parts are separated from the disc. Other figures are illustrated in the same manner.

a) The rotating mechanism 35A is operated to rotate both the disc reproducing unit 32A and the disc accommodating unit 33A so that the disc conveying path 48A of the disc reproducing unit 32A is aligned with the fifth disc accommodating section 41A-5 as shown in FIGS. 32D and 20A.

b) Next, as shown in FIG. 20B, the stock arm 131 of the fifth disc accommodating section 41A-5 is rotated, and the disc 11 is released from the pressing finger 131*a*. Thus, the pushing finger 131*c* pushes out the disc 11 from the fifth disc accommodating section 41A-5 in the Y2 direction.

c) Then, the disc conveying mechanism 34A is operated so as to move the rollers 61A and 62A so that the disc 11 which is pushed out of the fifth disc accommodating section 41A-5 is supported and conveyed in the Y2 direction to a position in the disc reproducing unit 32A as shown in FIG. 20C.

d) Then, the turntable 37A is moved upwardly and the clamper 38A is moved downwardly to clamp the disc 11 to the turntable 37A as shown in FIG. 20D. The rollers 61A and 62A are retracted and disengaged from the disc 11. Thereafter, the disc 11 is reproduced.

It should be noted that when the disc 11 is present in the disc reproducing unit 32A when the computer unit designates the fifth disc accommodating section 41A-5, one of the discs 11 in the disc accommodating unit 33A is conveyed to the disc reproducing unit 32A to start the reproducing operation after an accommodating operation of the disc 11 in the disc reproducing unit 32A is performed or after an ejecting operation (will be described later) of the disc 11 in the disc reproducing unit 32A is performed.

2) An operation for returning the reproduced disc 11 to, for example, the second disc accommodating section 41A-2 is as follows:

The disc 11 which was being reproduced is the disc which was taken out from, for example, the second disc accommodating section 41A-2. Thus, the disc reproducing unit 32A and the disc accommodating unit 33A are in the positions shown in FIGS. 32A and 21A so that the disc conveying path 48A of the disc reproducing unit 32A is aligned with the second disc accommodating unit 41A-2.

When the computer unit instructs a reproduction of a different disc 11, an operation shown in FIGS. 21B to 21D is performed.

a) As shown in FIG. 21B, the disc conveying mechanism 34A is operated to hold the disc 11. Then, the turntable 37A is moved downwardly, and the clamper 38 is moved upwardly so as to release the clamping force of the disc 11.

b) Then, as shown in FIG. 21C, the disc conveying mechanism 34A conveys the disc 11 in the Y1 direction to accommodate the disc in the second disc accommodating section 41A-2.

c) Finally, as shown in FIG. 21D, the pressing finger 131*a* contacts the periphery of the disc 11 to hold the disc 11.

The disc reproducing apparatus 30A repeatedly perform the above-mentioned operation as a regular operation.

The disc reproducing apparatus 30A performs the following operation other than the above-mentioned operation in accordance with an instruction of the operator.

Figure 30:
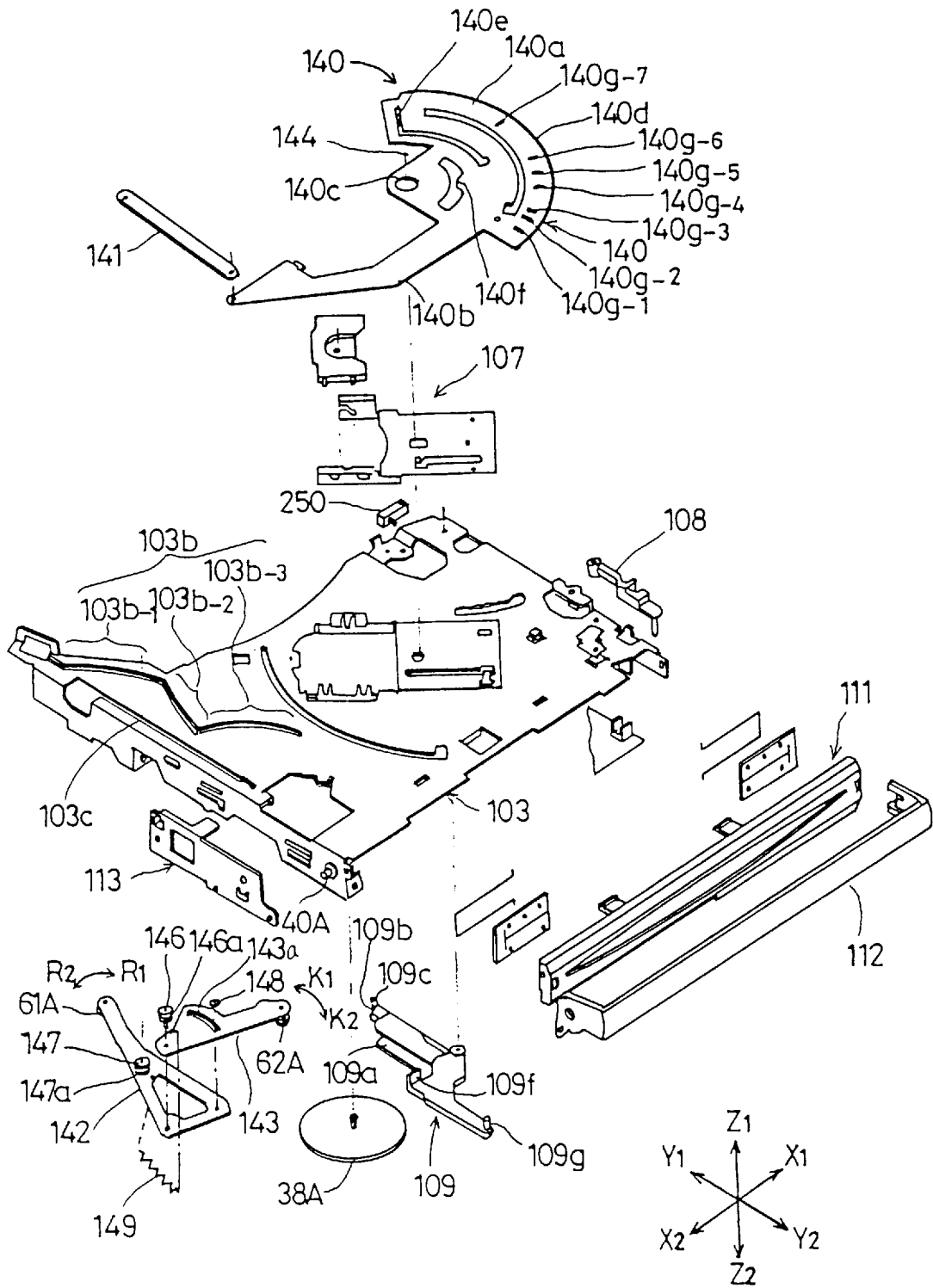
FIG. 30 is an exploded perspective view of mainly a disc conveying mechanism in the disc reproducing apparatus.

3) An operation for reproducing a disc which is inserted from outside the disc reproducing apparatus 30A:

If the operator requests a reproduction of a disc to be inserted, an operation shown in FIGS. 22A to 22D is performed.

a) The rotating mechanism 35 is operated to rotate both the disc reproducing unit 32 and the disc accommodating unit 33 so that, as shown in FIGS. 32A and 22A, the disc conveying path 48A of the disc reproducing unit 32 is aligned with, for example, the second disc accommodating unit 41-2 which is empty. Then, a motor (not shown in the figures) is operated to open a flap 112 shown in FIG. 30, and thus a disc insertion opening 71A (shown in FIG. 26 and FIG. 28) is opened.

b) Next, the operator inserts the disc 11 through the disc insertion opening 71A. When the disc 11 is inserted from the disc insertion opening 71A, the disc conveying mechanism 34A conveys the inserted disc 11 in the Y1 direction to a position in the disc reproducing unit 32A as shown in FIG. 22B.

c) Then, as shown in FIG. 22C, the turntable 37A and the clamper 38A are operated to clamp the disc 11 therebetween. Additionally, the disc insertion opening 71A is closed by the flap 112 being returned to the original position.

d) Finally, as shown in FIG. 22D, the rollers 61A and 62A are retracted and disengaged from the disc 11. Thereafter, the disc 11 is reproduced.

Figure 23A:
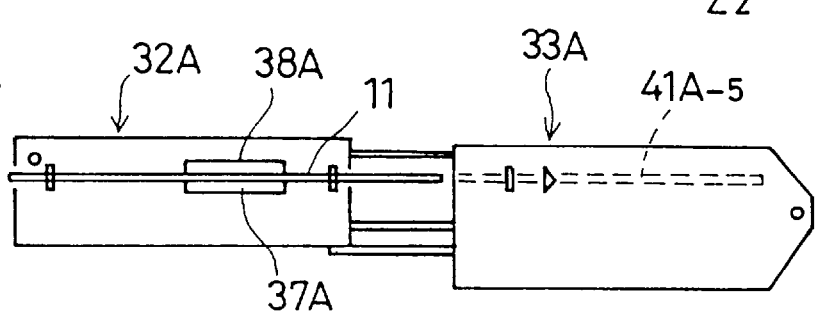
FIGS. 23A, 23B, 23C and 23D are illustrations for explaining an operation for ejecting a disc from the disc reproducing apparatus.
Figure 23B:
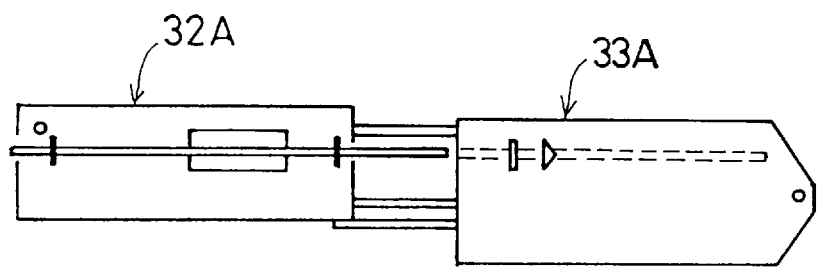
Figure 23C:
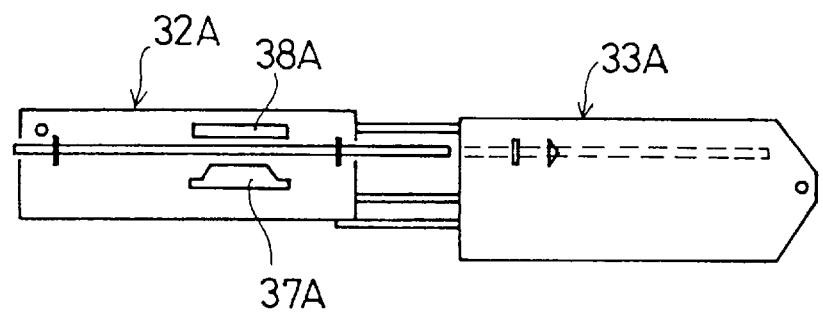
Figure 23D:
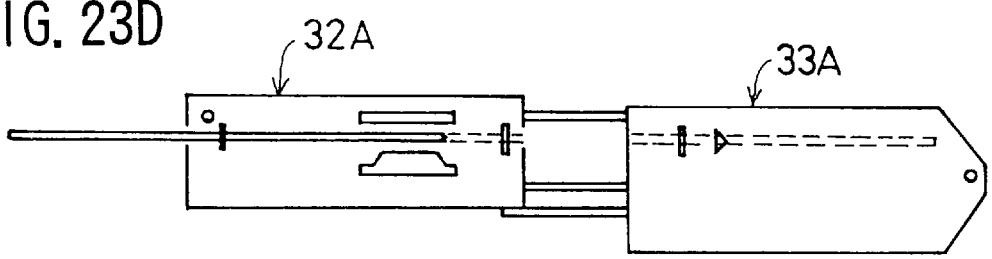

4) An operation of the disc reproducing unit 32D for ejecting a disc after being reproduced is as follows:

When the operator requests an ejection of the disc shown in FIG. 23A which is being reproduced, an operation shown in FIGS. 23B to 23D is performed.

a) As shown in FIG. 23B, the disc conveying mechanism 34A is operated to hold the disc 11.
b) Then, as shown in FIG. 23C, the clamping force of the disc 11 is released. Additionally, a motor (not shown in the figures) is operated to rotate the flap 112 shown in FIG. 30 so as to open the disc insertion opening 71A.
c) Then, as shown in FIG. 23D, the disc conveying mechanism 34A conveys the disc 11 in the Y2 direction so that a portion of the disc 11 protrudes outside the disc reproducing apparatus 30.

Thereafter, the operator holds and removes the disc 11 from the disc reproducing apparatus 32A.

After the disc 11 is taken out, the flap 112 returns to the original position, and the disc insertion opening 71A is closed.

If the operator does not take out the disc 11, the flap 112 is not closed. That is, when the instruction for closing the flap 112 is issued, a disc insertion detecting switch 160 (shown in FIG. 44) is turned on for a predetermined time period so that the instruction for closing the flap 112 is not executed when the disc insertion detecting switch 160 continuously detects the disc 11 for the predetermined time period. Thus, there is no problem that the flap 112 hits the disc 11.

5) An operation for accommodating or receiving a disc from outside the disc reproducing apparatus 30A to the disc accommodating unit 33A is as follows:

When the operator requests to perform the accommodating operation and designates one of the disc accommodating sections, for example, the third disc accommodating section 41-3 as the section to which the disc should be accommodated, an operation shown in FIGS. 24A to 24D is performed.
  a) The rotating mechanism 35A is operated to rotate both the disc reproducing unit 32A and the disc accommodating unit 33A so that the disc conveying path 48A of the disc reproducing unit 32A is aligned with the third disc accommodating section 41A-3 as shown in FIGS. 32B and 24A. Then, the motor (not shown in the figures) is rotated to rotate the flap 112 shown in FIG. 30 so as to open the disc insertion opening 71A.
  b) Then, as shown in FIG. 24B, the operator inserts the disc 11 through the disc insertion opening 71A. When the disc 11 is inserted from the disc insertion opening 71A, the disc conveying mechanism 34A holds the inserted disc 11.
  c) Then, as shown in FIG. 24C, the disc conveying mechanism 34A conveys the inserted disc 11 in the Y1 direction. The disc conveying mechanism 34A conveys the disc 11 to the third disc accommodating section 41A-3 of the disc accommodating unit 33A by passing the disc 11 through the disc conveying path 48A of the disc reproducing unit 32A. Additionally, the flap 112 is returned to the original position, and the disc insertion opening 71A is closed.
  d) Finally, as shown in FIG. 24D, the pressing finger 131a presses the periphery of the disc 11 to hold the disc 11 in the third disc accommodating section 41A-3. At this time, the disc conveying mechanism 34A disengages from the disc 11.

6) An operation for ejecting a disc in the disc accommodating unit 33A to outside the disc reproducing apparatus 30A is as follows:

When the operator requests to perform an ejecting operation and designates, for example, the fourth disc accommodating section 41A-4, an operation shown in FIGS. 25A to 25C is performed.

a) The rotating mechanism 35A is operated to rotate both the disc reproducing unit 32A and the disc accommodating unit 33A so that the disc conveying path 48A of the disc reproducing unit 32A is aligned with the fourth disc accommodating section 41A-4 as shown in FIGS. 32C and 25A.
  b) Then, as shown in FIG. 25B, a pressing force of the pressing finger 131a is released, and the disc 11 is pushed out in the Y2 direction from the fourth disc accommodating section 41A-4. The disc conveying mechanism 34A holds the pushed disc 11. Additionally, the flap 112 is rotated to open the disc insertion opening 71A.
  c) The disc conveying mechanism 34A conveys the disc in the Y2 direction so that a part of the disc 11 protrudes from the disc reproducing apparatus 30A as shown in FIG. 25D.

Thereafter, the operator holds and removes the disc 11 to outside of the disc reproducing apparatus 30A.

After the disc 11 is taken out, the flap 112 returns to the original position, and the disc insertion opening 71A is closed.

As mentioned above, the disc reproducing apparatus 30A has the following advantages.

1) The height H10 of the disc reproducing apparatus 30A is reduced.

This is achieved due to the following reasons.
  a) The disc reproducing unit 32A and the disc accommodating unit 33A are opposite to each other, and both are rotated (swung) to be inclined as shown in FIGS. 18A and 18B. Thus, the angle α for which the disc reproducing unit 32A must be rotated is smaller than an angle for which the disc reproducing unit 32 must be rotated when the disc accommodating unit 33 is stationary. Thus, the space 81A necessary for rotation of the disc reproducing unit 32A can be decreased. The angle α is approximately 6 degrees.
  b) The angle β to which the disc accommodating unit 33A must be rotated is smaller than an angle for which the disc accommodating unit 33A must be rotated when the disc reproducing unit 32 is stationary and only the disc accommodating unit 33A must be rotated. Thus, the space 82A necessary for rotation of the disc accommodating unit 33A can be decreased. The angle β is approximately 6 degrees.
  c) The space 81A necessary for rotation of the disc reproducing unit 32A and the space 82A necessary for rotation of the disc accommodating unit 33A are overlapped with each other in the Z direction.

2) The distance g1 between adjacent discs 11 accommodated in the disc accommodating sections 41A-1 to 41A-6 is not reduced.

This is because the disc accommodating units are arranged in parallel relationship to each other.

3) A time period from the time when an instruction is issued and until an operation responding to the instruction is completed is reduced.

This is because both the disc reproducing unit 32A and the disc accommodating unit 33A are rotated, a time period necessary for the disc conveying path 48A of the disc reproducing unit 32A being aligned with the desired disc accommodating section of the disc accommodating unit 33A is reduced.

A description will now be given, with reference to FIGS. 30 and 34 to 45, of a structure and an operation of the disc conveying mechanism 34A.

Most of the parts of the disc conveying mechanism 34A are provided to the chassis 103 of the loading assembly 100. The disc conveying mechanism 34A comprises a loading arm 140, a link arm 141, a first disc arm 142, a second disc arm 143 and the guide rail member 60A.

The loading arm 140 comprises a quarter circle portion 140a and an arm portion 140b, and is mounted on the chassis 103. The quarter circle portion 140a is rotatably supported by a shaft 144 at an opening 140c located on an end portion of the quarter circle portion 140a.

An arc-like rack 140d, an elongated cam opening 140e which moves an eject lever 109, a cam 140f which operates a clamper holder moving mechanism 107, and seven slits 140g-1 to 140g-7 are formed in the quarter circle portion 140a. The slits 140g-1 to 140g-7 and an optical sensor 145 on the chassis 103 cooperate together to detect operational states of the disc conveying mechanism 34A. The arc-like rack 140d engages with a gear 179 described later.

Figure 42:
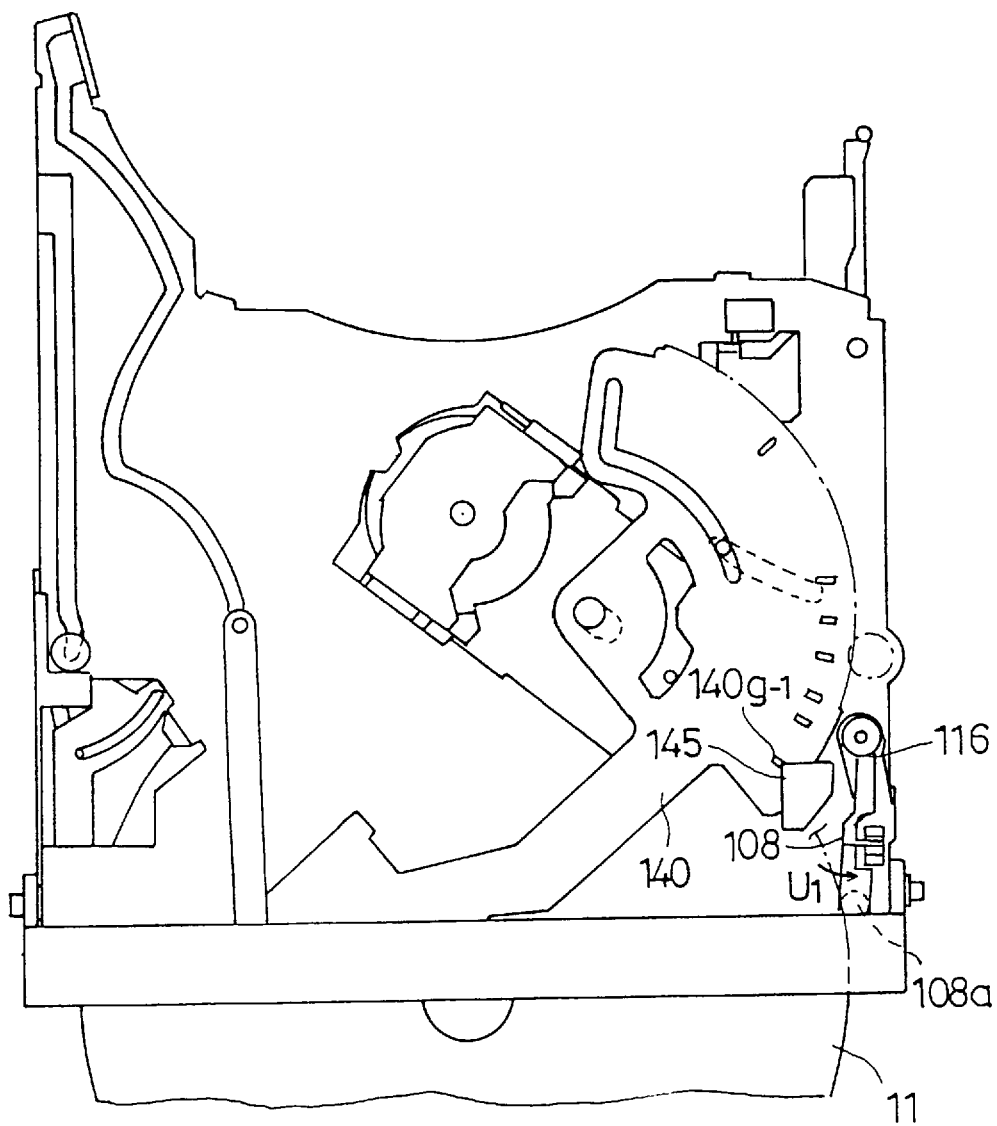
FIG. 42 is a plan view of the disc conveying mechanism in a state where the disc is ejected.
Figure 43:
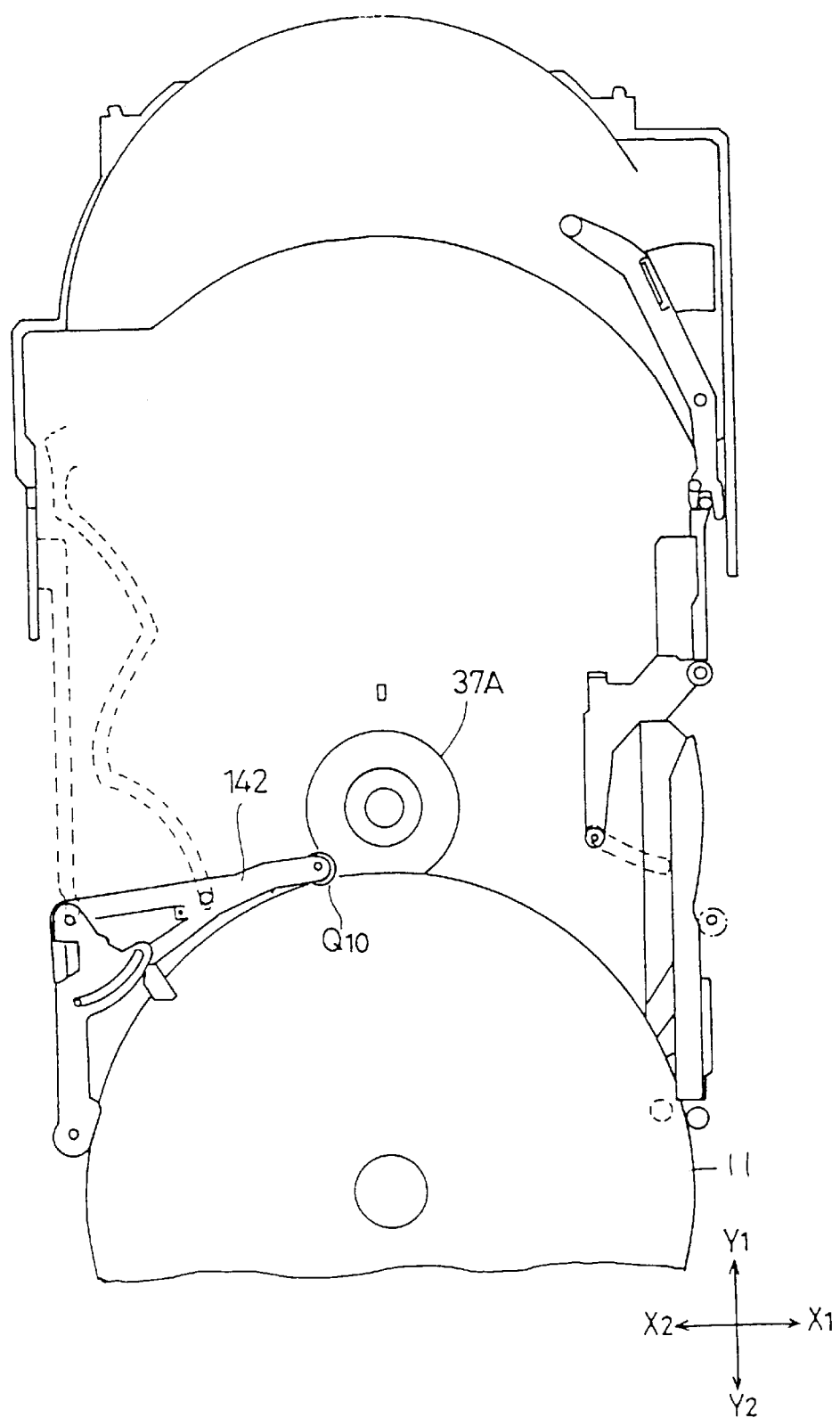
FIG. 43 is a plan view of the disc conveying mechanism in a state where the disc is ejected, the chassis being removed.
Figure 45:
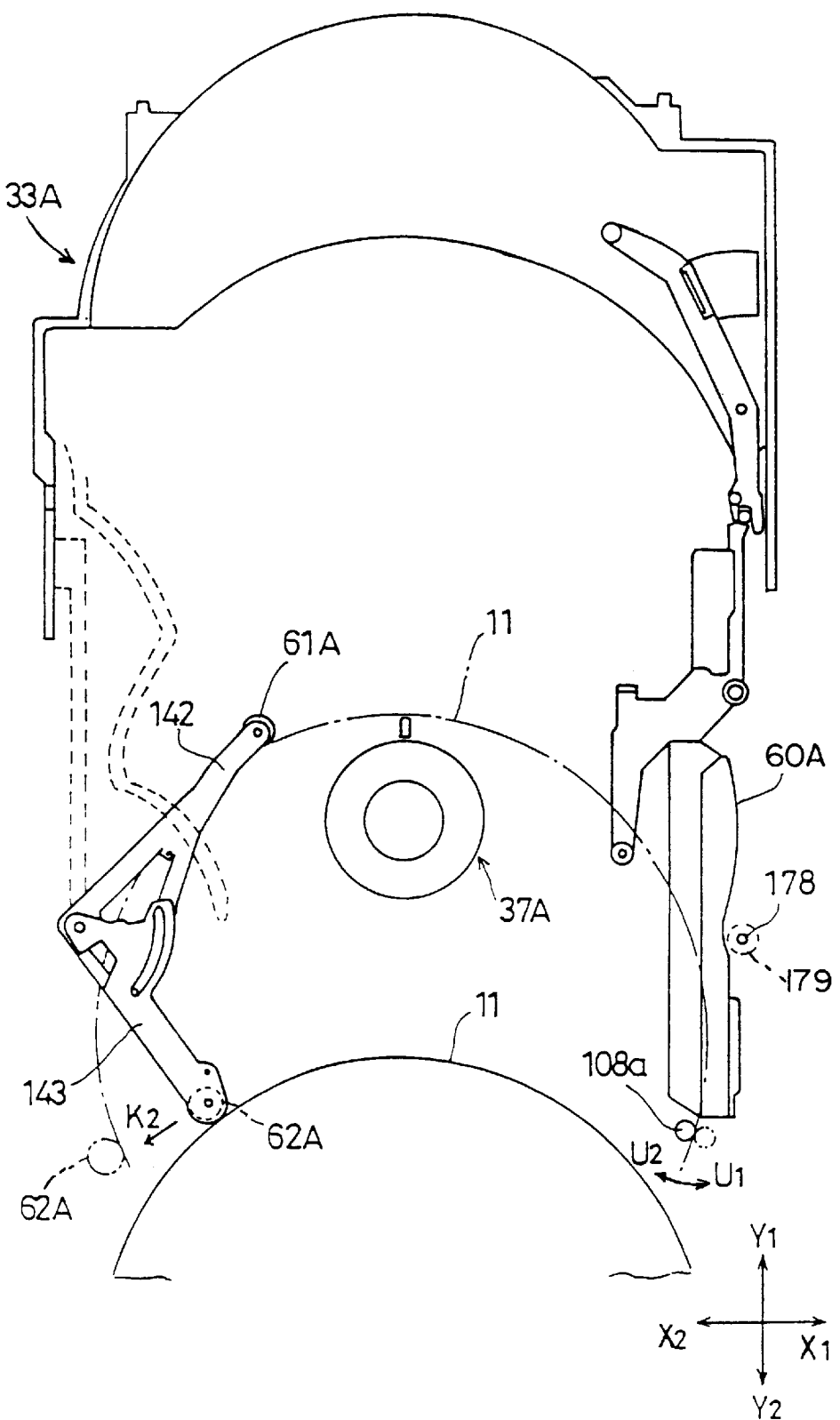
FIG. 45 is a plan view of the disc conveying mechanism when the disc is removed, the chassis being removed.
Figures 55A, 55B, 55C, 55D:
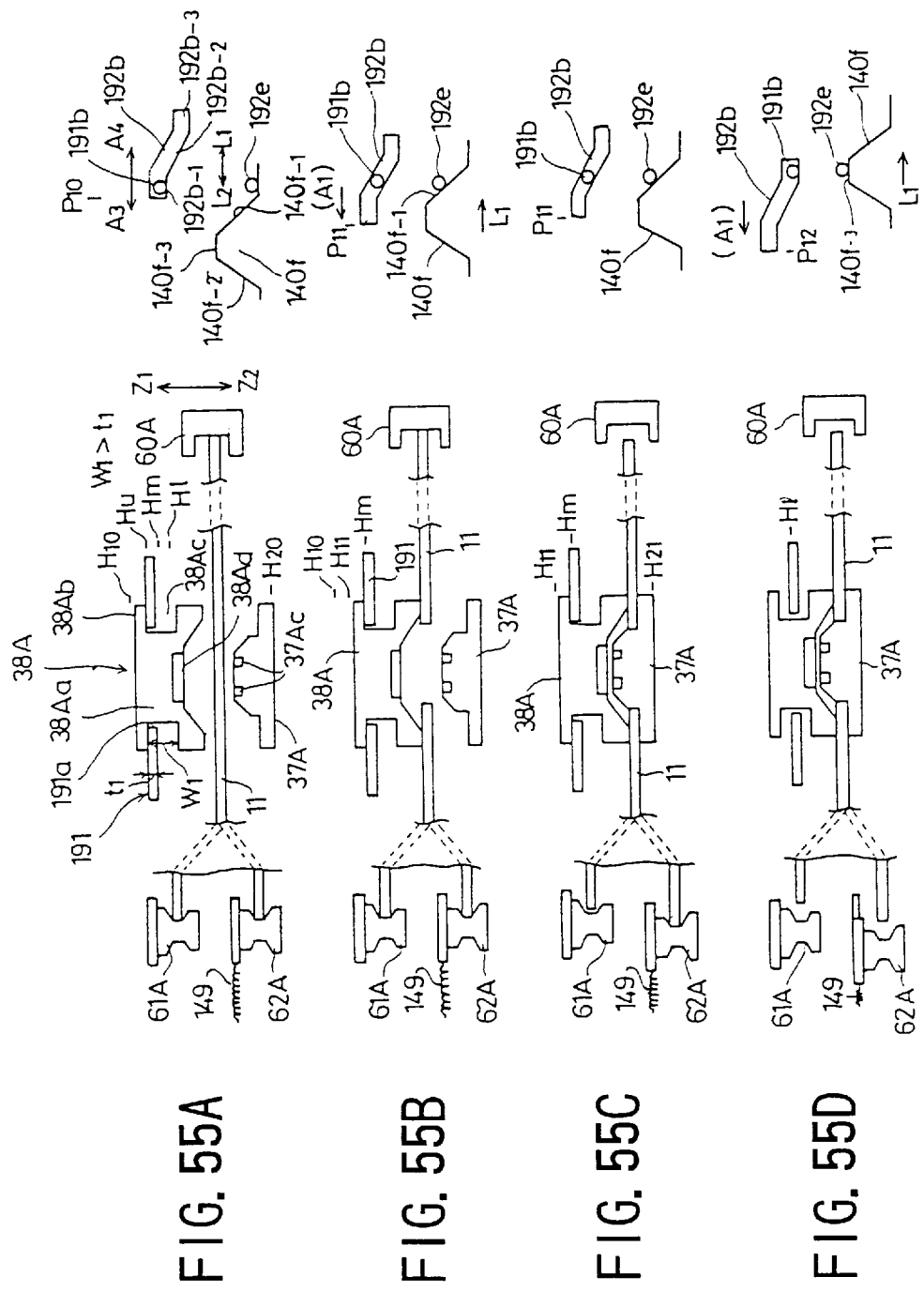
FIGS. 55A, 55B, 55C and 55D are illustrations for explaining an operation for clamping a disc by the disc clamp mechanism.

The slit 140g-1 is provided for detecting an initial state of the disc conveying mechanism 34A. The slit 140g-6 is provided for detecting a state where a slanting surface 140f-1 of the trapezoidal cam 140f presses a pin portion 192e as shown in FIG. 55B. The slit 140g-5 is provided for detecting a state where a top surface 140f-3 is pressing the pin portion 192e as shown in FIG. 55D. The slit 140g-4 is provided for detecting a state where a slanting surface 140f-2 of the trapezoidal cam 140f presses the pin portion 192e as shown in FIG. 55A. The slit 140g-3 is provided for detecting a state where the trapezoid cam 140f passes the pin portion 192e as shown in FIG. 55C. The slit 140g-2 is provided for detecting a disc waiting state as shown in FIG. 45. The slit 140g-1 is provided for detecting a state where the disc conveying mechanism 43A is operated to an end position as shown in FIGS. 42 and 43.

An elongated and curved guide opening 103b and an elongated straight guide opening 103c are formed on a X2 side end of the chassis 103. The elongated and curved guide opening 103b extends generally in the Y1–Y2 direction. The elongated straight guide opening 103c extends in the Y1–Y2 direction. The elongated and curved guide opening 103b includes a first elongated guide opening 103b-1, a second elongated guide opening 130b-2 and a third elongated guide opening 103b-3, in that order form the Y1 side end to the Y2 side end. When viewed from the Y1 side end, the first elongated guide opening 103b-1 extends in a direction between the X1 direction and the Y2 direction. The second elongated guide opening 103b-2 extends in a direction between the X2 direction and the Y2 direction. The third elongated guide opening 103b-3 extends in a direction between the X1 direction and the Y2 direction. Each of the first to third elongated guide openings 103b-1, 103b-2 and 103b-3 are provided for rotating the first disc arm 142.

A pin 146 is caulked on a base side (Y2 side) of the first disc arm 142. The second disc arm 143 is rotatable with respect to the first disc arm 142 due to the pin 146. The pin 146 has an annular groove 146a on a periphery of an upper portion. The first disc arm 142 is provided with a rotatable I-shaped roller 61A on a back surface thereof. A pin 147 having an annular groove 147a is caulked on a top surface of the first disc arm 142 at the center thereof. The second disc arm 143 is provided with a rotatable I-shaped roller 62A on a back surface of an end thereof. The second disc arm 143 fits to a pin 148 which is caulked to the first disc arm 142. The second disc arm 143 is rotatable within the arc-like opening 143a in the K1 and K2 directions. The second disc arm 143 is rotationally urged in the K1 direction by the spring 149 bridging the second disc arm 143 and the first disc arm 142. The first disc arm 142 and the second disc arm 143 are mounted on the back surface of the chassis 103 in a state where the annular groove 146a of the pin 146 slidably fits to the elongated straight guide opening 103c and the annular groove 147a of the pin 147 slidably fits to the elongated and curved guide opening 103b.

The link arm 141 connects an end of the arm potion 140b of the loading arm 140 to the above-mentioned pin 147. When the loading arm 140 is rotated, the first disc arm 142 is rotationally moved in the Y1 and Y2 directions while the pin 146 is guided by the elongated straight guide opening 103c and the pin 147 is guided by the elongated and curved guide opening 103b. The second disc arm 143 moves together with the first disc arm 142. Additionally, the I-shaped rollers 61A and 62A move substantially along the X2 side of the disc conveying path 48A.

The guide rail member 60A is fixed on a top surface of a chassis 150 of the drive mechanism assembly 110 (refer to FIG. 29). The drive mechanism assembly 110 is mounted on a back surface of the chassis 103 of the loading assembly 100. The guide rail member 60A is provided on the X1 side end, which is opposite to the disc conveying path 48A, of the back surface of the chassis 103 of the loading assembly 100. The guide rail member 6A extends in the Y1–Y2 direction and has a guide groove 6OAa on an inner side.

The above-mentioned eject lever 109 also has a guide groove 109a on an inner side.

An initial state detecting switch 250 is provided on the chassis 103. The initial state detecting switch 250 is turned on by a raising wall portion 109f of the eject lever 109 when the eject lever 109 is rotated in the N1 direction.

A description will now be given of an operation of the disc conveying mechanism 34A.

FIGS. 33 is an operation chart for explaining an operation of each of the parts constituting the disc conveying mechanism 34A.

Figure 34:
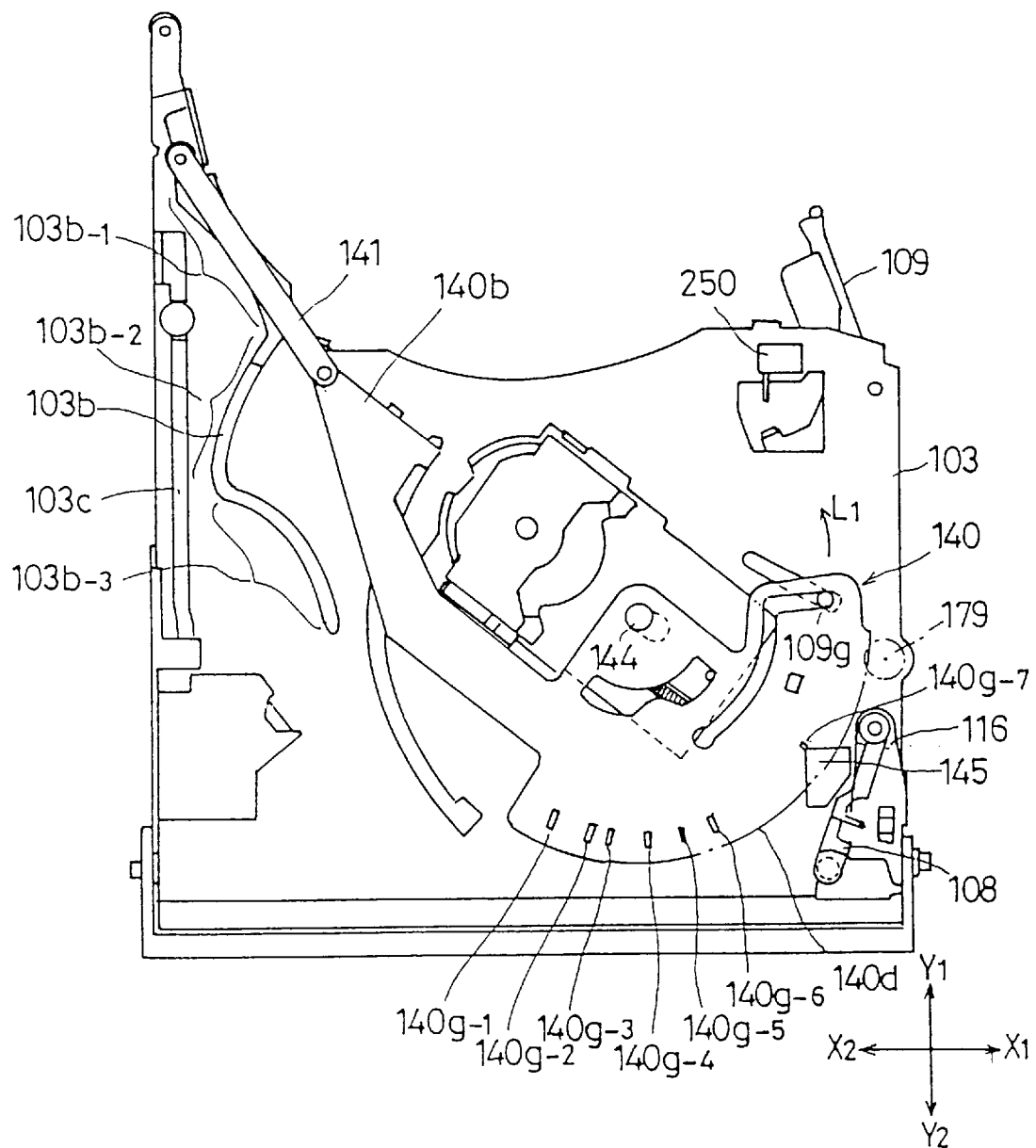
FIG. 34 is a plan view of the disc conveying mechanism in an initial state.
Figure 35:
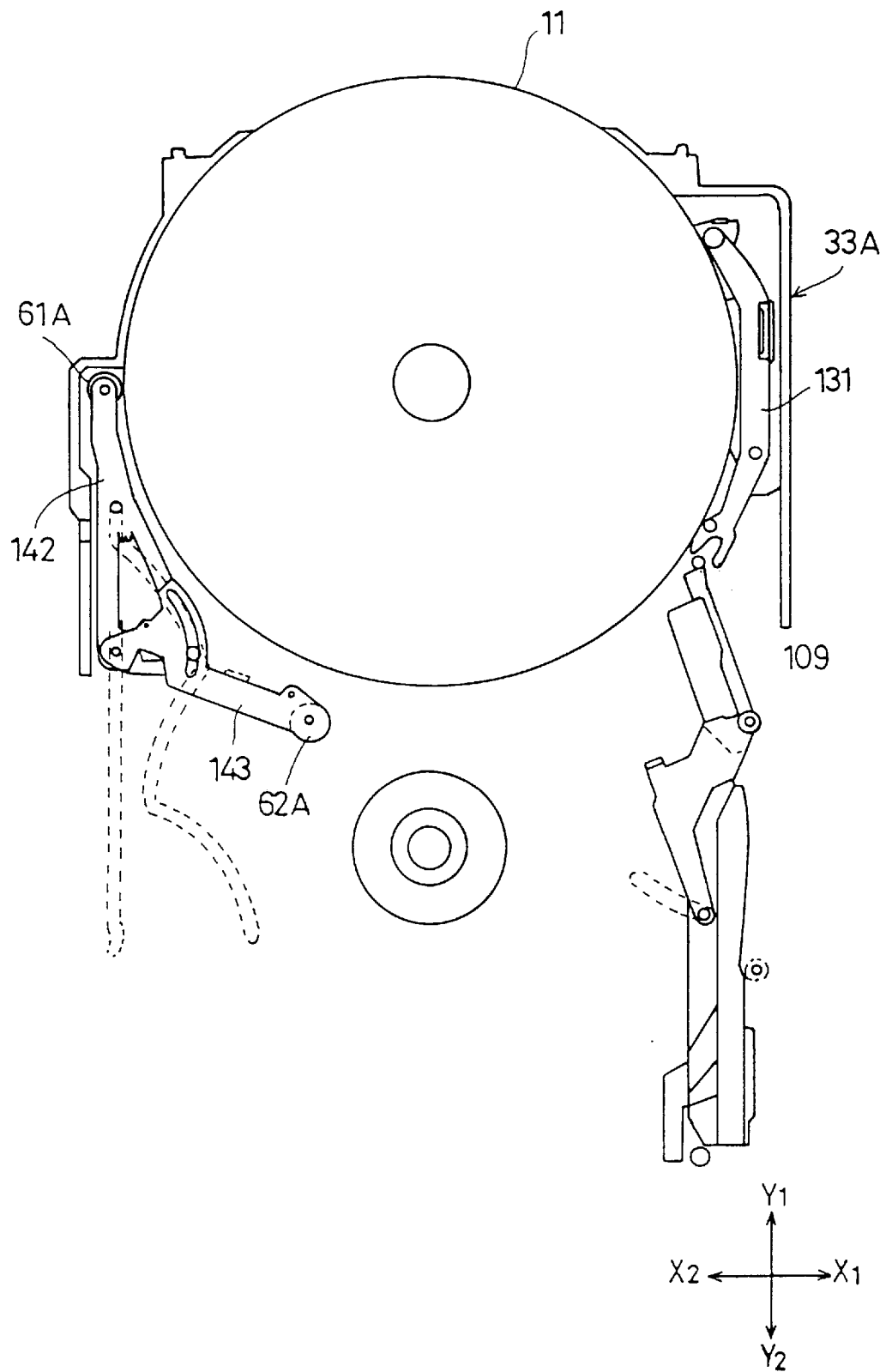
FIG. 35 is a plan view of the disc conveying mechanism in the initial state in which a chassis is removed.

The disc conveying mechanism 34A is operated between an initial state shown in FIGS. 34 and 35 and an eject state shown in FIG. 42 and 43.

The disc conveying mechanism 34A being in the initial state as shown in FIGS. 34 and 35 is identified by the initial state detecting switch 250 being turned off and the optical sensor 145 detecting the slit 140g-7.

First, a description will be given of an operation for conveying the disc 11 accommodated, for example, in the first disc accommodating section 41A-1 of the disc accommodating unit 33A in the Y2 direction.

A loading motor 174 (refer to FIG. 48) is rotated in a normal direction, and the loading arm 140 is rotated in the L1 direction from the initial state shown in FIGS. 34 and 35 to a position in which the slit 140g-6 is detected by the sensor 145 (FIG. 33-(A)).

Figure 36A:
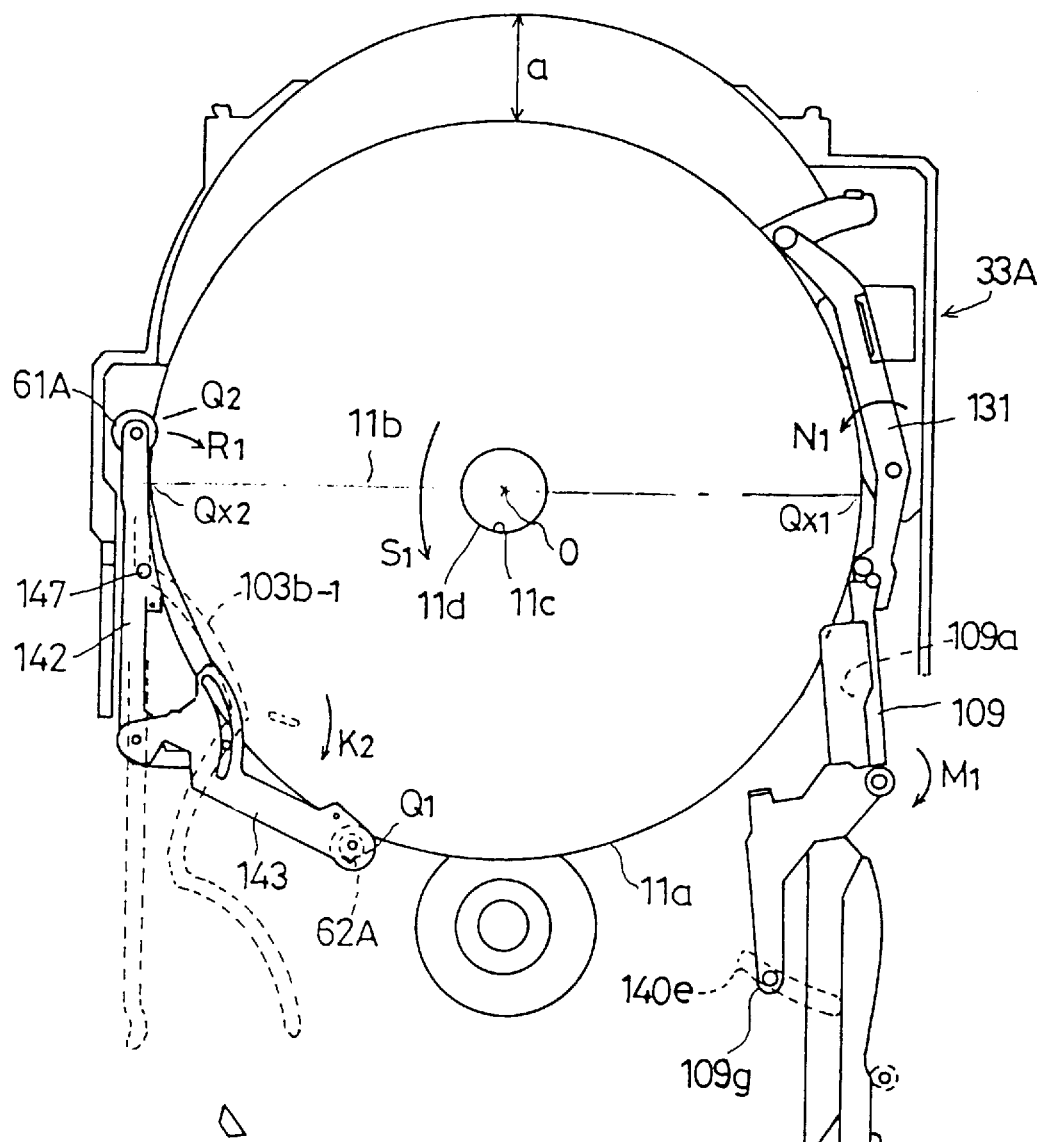
FIGS. 36A and 36B are illustrations for showing a state where a disc is partly pressed out of the disc accommodating unit.
Figure 36B:
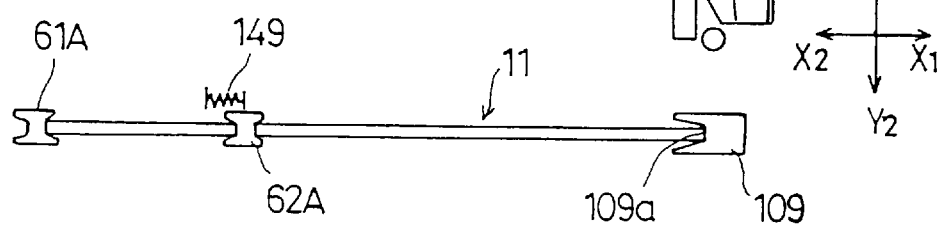

When a rotation of the loading arm 140 in the L1 direction is started, the state shown in FIGS. 36A and 36B is achieved first. The first disc arm 142 and the second disc arm 143 are moved slightly in the Y2 direction, and the elongated cam opening 140e guides the pin 109g of the eject lever 109 to rotate the eject lever 109 in the M1 direction. Due to the rotation of the eject lever 109, the initial state detecting switch 115 is turned on. Additionally, the stock arm 131 is rotated in the N1 direction, and the disc 11 is pushed in the Y2 direction by a distance a from the first disc accommodating unit 41A-1. In this state, the intersections between an outer edge 11a of the disc 11 and the diametral line 11b are referred to as QX2 and QX1, respectively, as shown in FIG. 34A.

A leading edge of the disc 11 in the Y2 direction contacts the I-shaped roller 62A and pushes it in the Y2 direction.

This causes the second disc arm 143 to rotate in the K2 direction against the spring 149. Thus, the line 11b, which extends in the X1–X2 direction and passes the center 0 of the disc 11, moves to a position further in the Y2 direction than the I-shaped roller 61A. That is, the I-shaped roller 61A contacts the disc 11 at a point Q2 along the outer edge 11a which is spaced away from the point QX2 in the Y1 direction. Additionally, due to the eject lever 109 being rotated in the M1 direction, a state is achieved in which the guide groove 109a of the inner side of the eject lever 109 aligns with the Y1–Y2 direction, that is, the outer edge 11a of the disc 11 can be guided by the guide groove 109a.

Figure 37A:
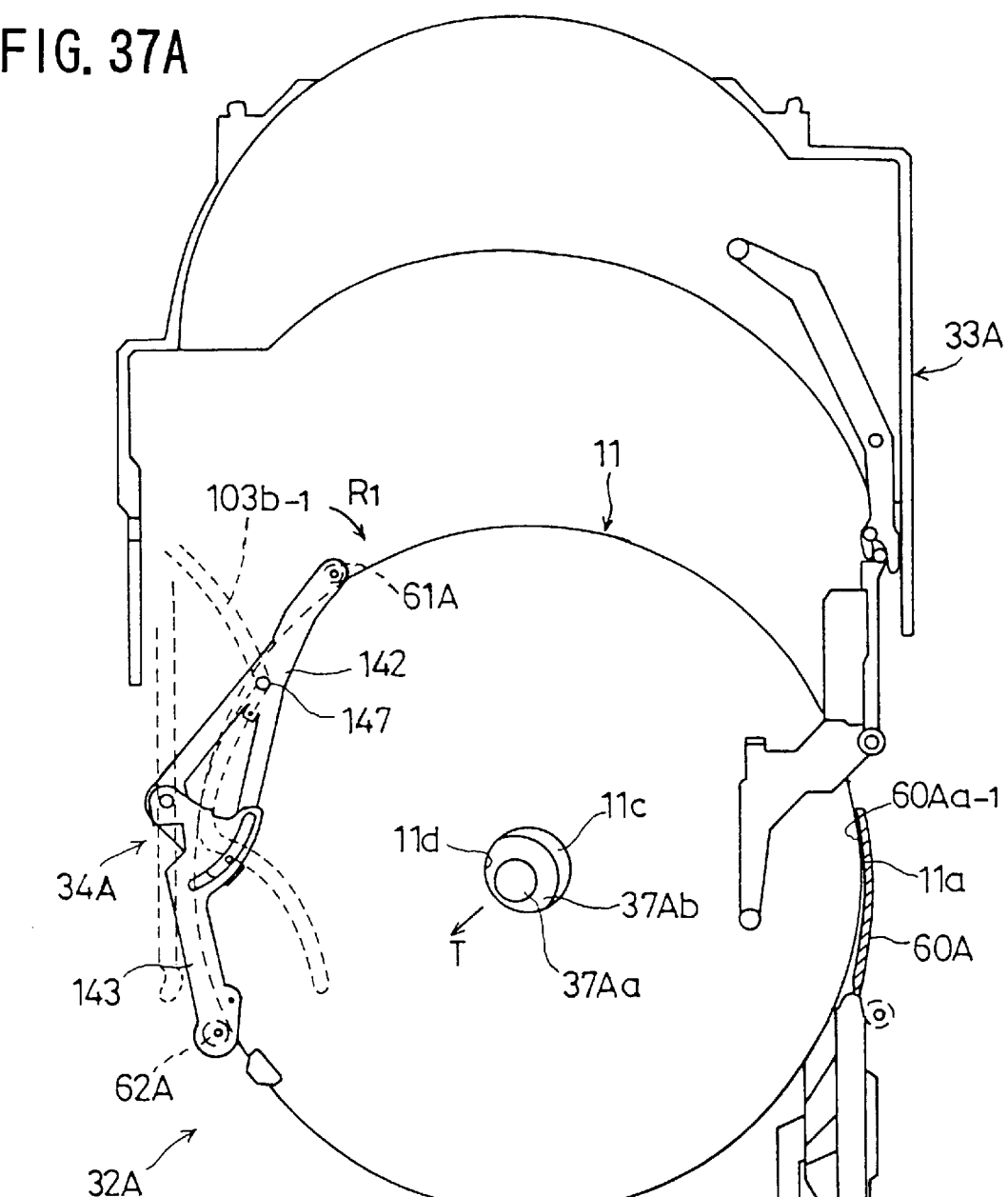
FIGS. 37A and 37B are illustrations for showing a state where the disc is conveyed to a position close to a reproducing position.

When the loading arm 140 is rotated in the L1 direction, the first disc arm 142 is moved in the Y2 direction and is rotated in the R1 direction due to the pin 147 being guided by the elongated guide opening 103b-1, as shown in FIG. 37A, so that the I-shaped roller 61A pushes the disc 11 in the Xi direction at the point Q2. Since the point Q2 is shifted from the point QX2 in the Y1 direction, a force is exerted on the disc 11 in the Y2 direction by the I-shaped roller 61A pushing the outer edge 11a of the disc 11 in the X1 direction. Thus, the disc 11 is pushed along the guide rail member 60A in the Y2 direction while moving first in the guide groove 109a of the eject lever 109 and then moving in the guide groove 6OAa of the guide rail member by rotating in the S1 direction which generates less frictional force.

Since the second disc arm 143 can be rotated in the K2 direction although it is against a force of the spring 149, that is, since the second disc arm 143 can be rotated in the direction to be open with respect to the first disc arm 142, the disc 11 is pushed out in the Y2 direction without restriction of the I-shaped roller 62A. Thus, the second disc arm 143 rotates in the opening direction K2 with respect to the first disc arm 142 by an amount corresponding to the disc 11 being pushed in the Y2 direction.

The disc 11 fits to the guide groove 109a of the eject lever 109 at the X1 side of the outer edge 11a as shown in FIG. 36B. Additionally, the disc 11 is supported by the I-shaped rollers 61A and 62A on the X2 side. Further, the I-shaped roller 62A is continuously pressed against the outer edge 11a of the disc 11 which causes the outer edge 11a to be continuously pressed against the guide groove 109a (guide groove 6OAa) and the I-shaped roller 61A. Thus, the disc 11 is supported at three points without play. Thus, the disc 11 is continuously and horizontally supported without falling off the conveying mechanism 34A after the disc 11 is moved out of the first disc accommodating section 41-1.

As mentioned above, the disc conveying mechanism 34A grasps the disc 11 which is partially pushed out of the first disc accommodating section 41-1, and conveys the disc 11 in the Y2 direction by the rotation of the loading arm 140 in the L1 direction. The friction between the disc 11 and each of the eject lever 109 and the guide rail member 60A is not sliding friction but rolling friction. Additionally, the friction between the disc 11 and each of the I-shaped rollers 61A and 62A is also rolling friction. Thus, the friction force exerted on the disc 11 during conveyance is extremely reduced.

When the loading arm 140 is rotated to a position where the slit 140g-6 is detected by the sensor 145, the disc conveying mechanism 34A is in a state as shown in FIG. 37A. Since the outer edge 11a of the disc 11 is pressed against an inner bottom surface 6OAa-1 of the guide groove 6OAa of the guide rail member 60A, a center opening 11c is slightly deflected from the turntable 37A. That is, an inner edge 11d of the center opening 11c is directly above a tapered surface 37Ab of a protrusion 37Aa at the center of the turntable 37A.

Figure 38A:
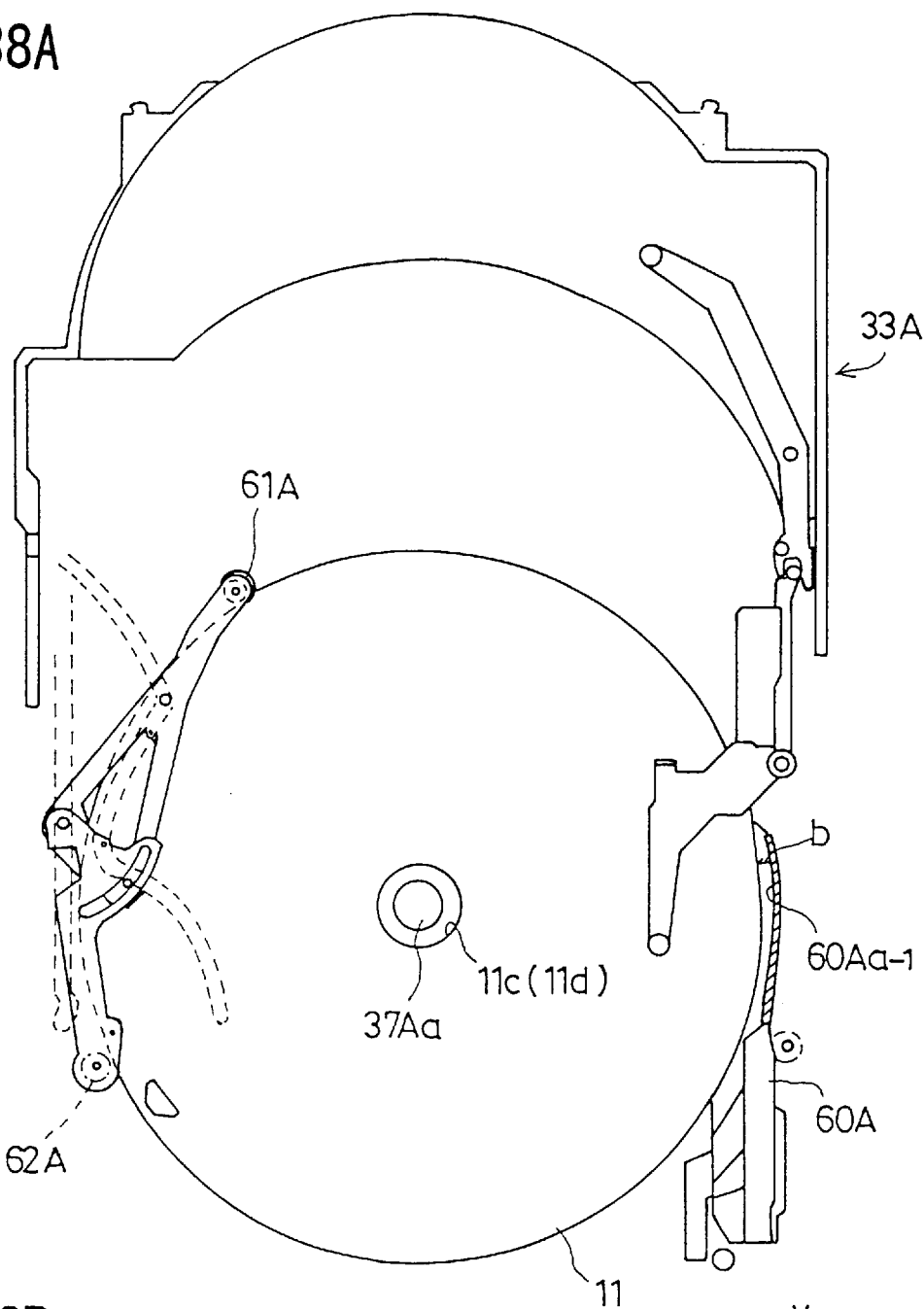
FIGS. 38A and 38B are illustrations for showing a state where the disc is clamped.
Figure 38B:
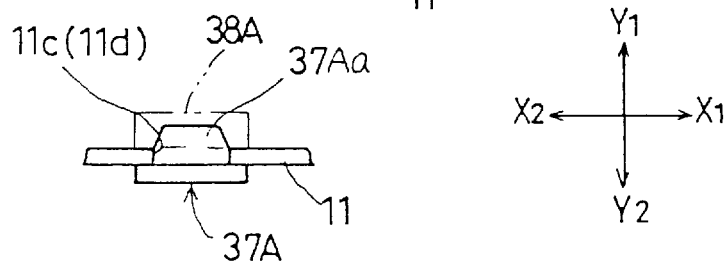

The turntable 37A is then moved upwardly in the Z1 direction, and the disc 11 is clamped by the turntable 37A and the clamper 38A near the center opening 11c. In the clamping process, since the tapered surface 37Ab guides the inner edge 11d of the center opening 11c, the disc 11 is moved slightly in the T direction which is between the X2 direction and the Y2 direction. Thus, the disc 11 is positioned as shown in FIGS. 38A and 38B, where the outer edge 11a of the disc 11 is slightly apart by a distance b from the inner bottom surface 6OAa-1 of the guide groove 6OAa of the guide rail member 60A.

It should be noted that the slight movement of the disc 11 in the T direction is performed without restriction while the second disc arm 143 is rotated against the force of the spring 149 by the outer edge 11a of the disc 11 being pressed against the I-shaped roller 62A in the T direction. Additionally, since the I-shaped rollers 62A continuously contact the outer edge 11a of the disc 11 after the disc 11 is moved in the T direction, the disc 11 is continuously supported without play even if the disc 11 is disengaged from the guide rail member 60A.

Figure 39:
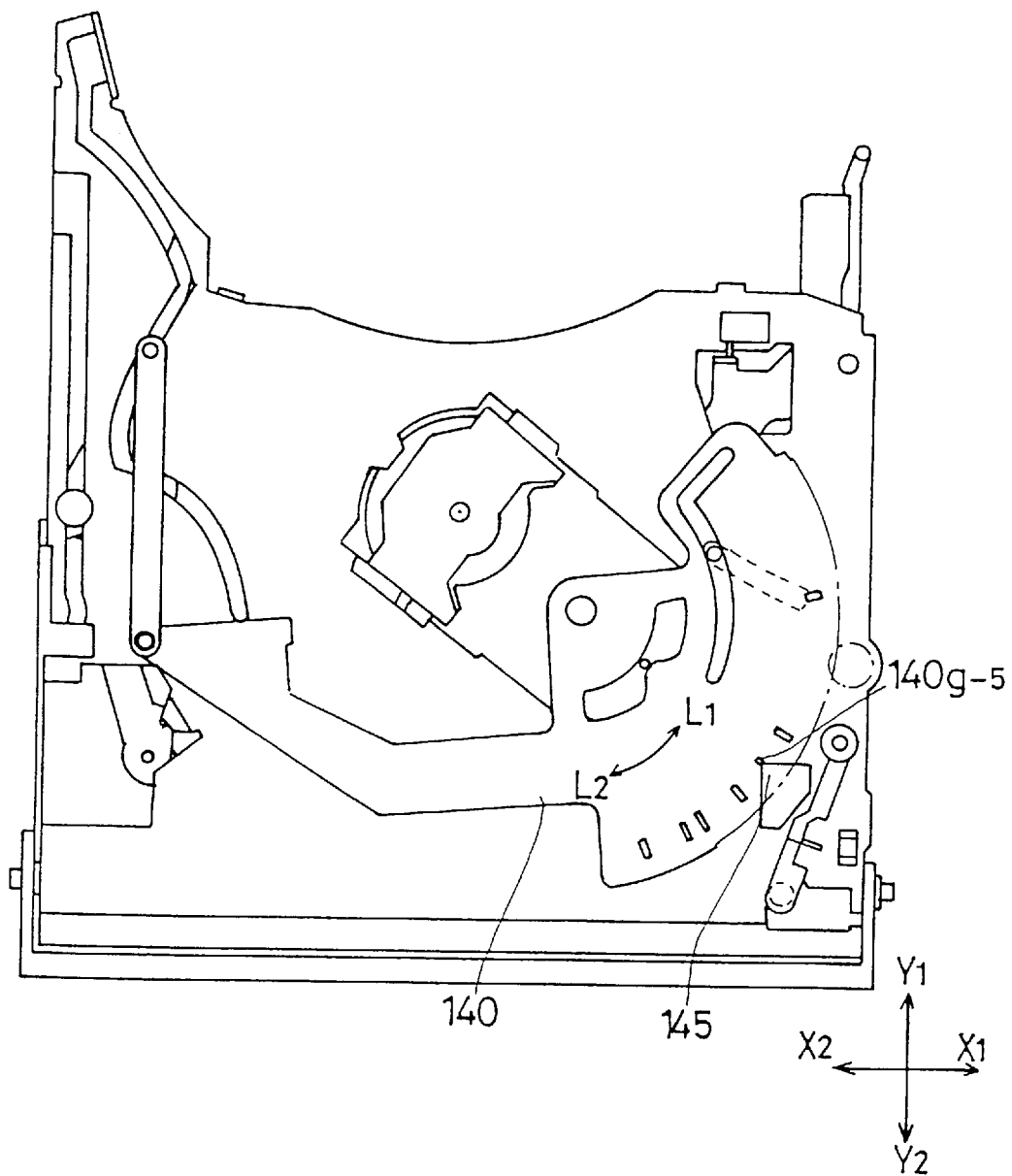
FIG. 39 is a plane view of a disc conveying mechanism in an initial state where the disc is reproduced.
Figure 40:
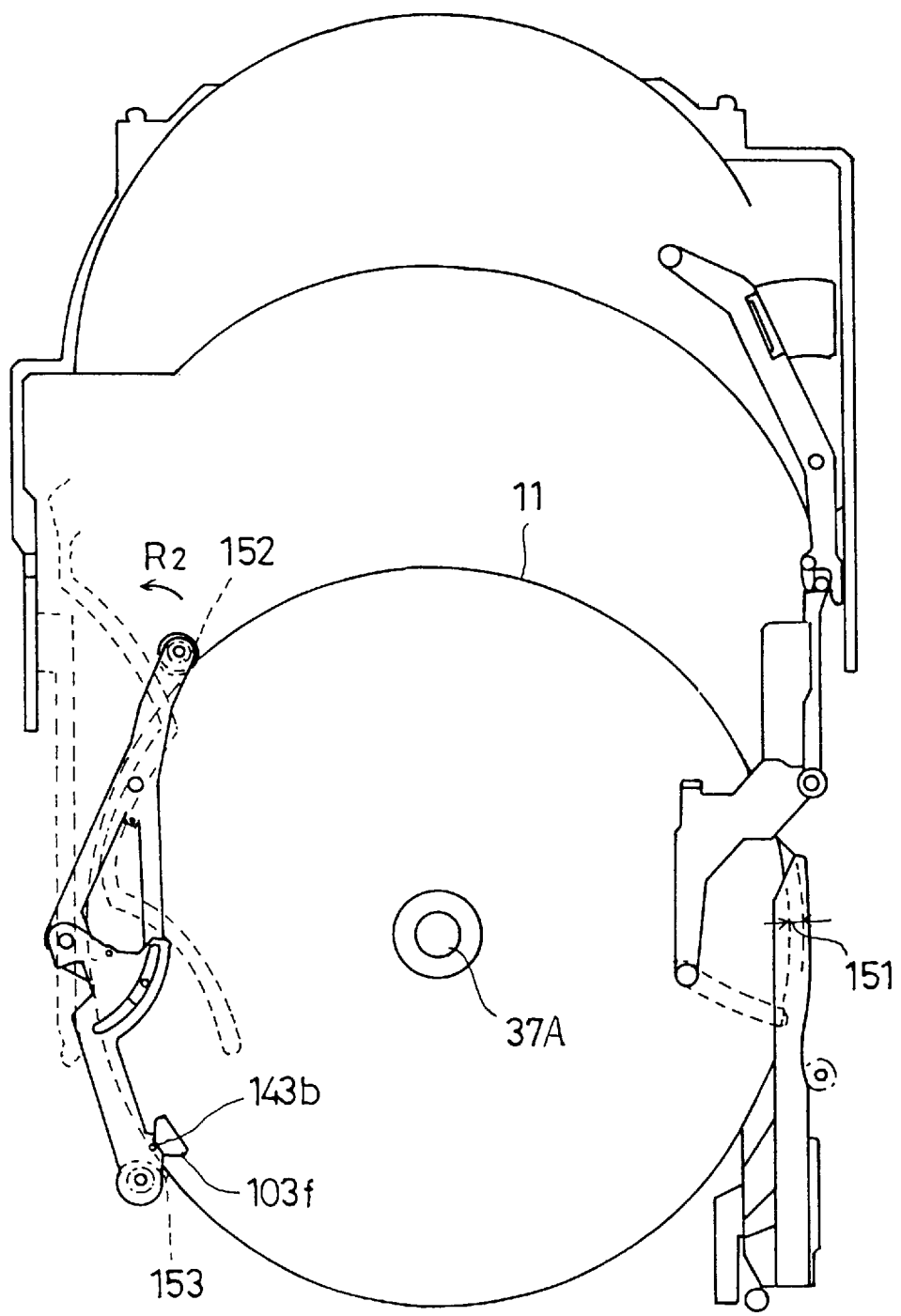
FIG. 40 is a plan view of the disc conveying mechanism in the initial state in which the chassis is removed.
Figure 41:
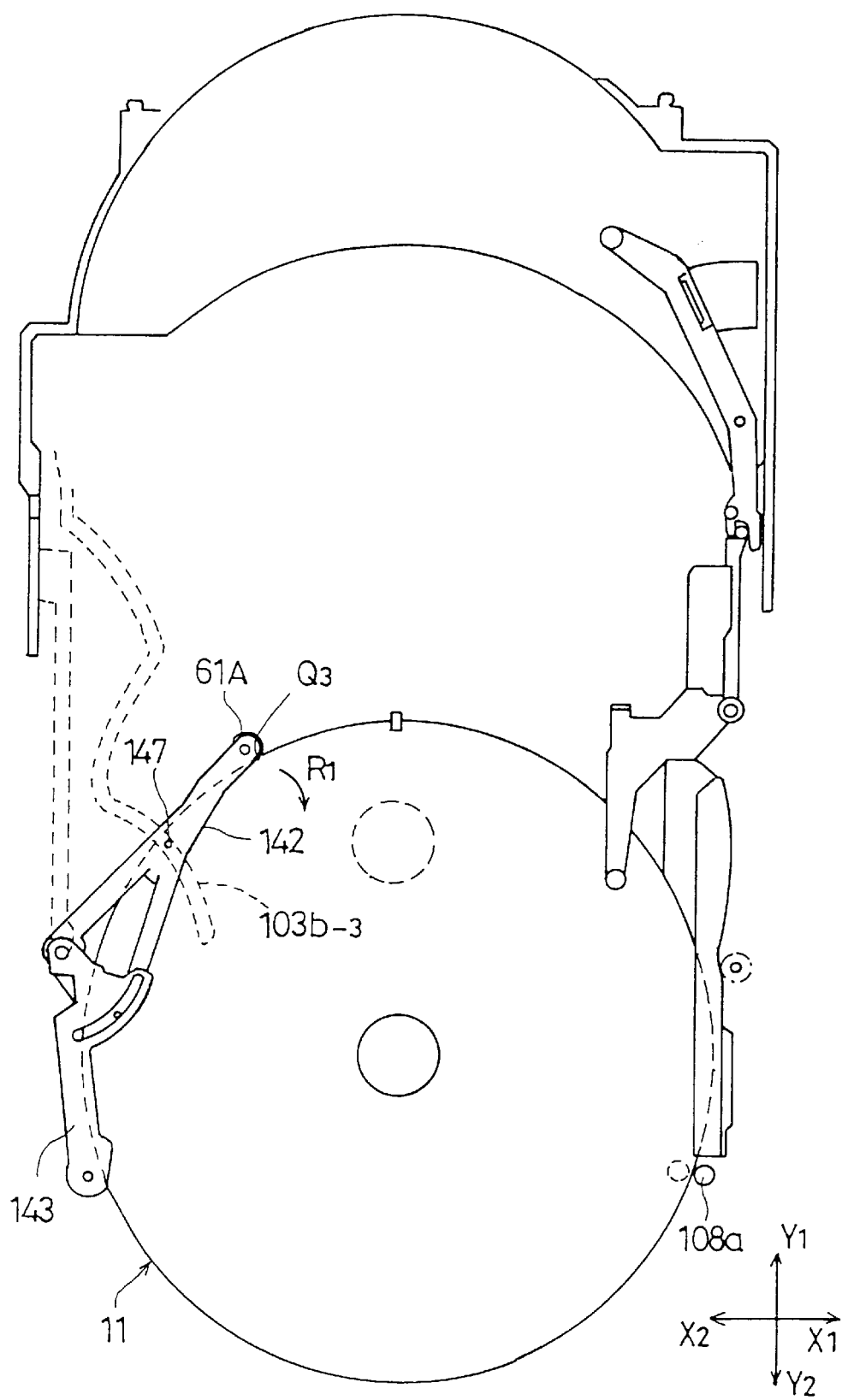
FIG. 41 is a plan view of the disc conveying mechanism in a state where the disc is rejected form the reproducing position.

The loading arm 140 is further rotated to a position shown in FIG. 39 where the slit 140g-5 is detected by the sensor 145, and is stopped at that position. At this time, the first disc arm 142 is moved in the Y2 direction due to the rotation of the loading arm 140 as shown in FIG. 40, and is rotated in the R2 direction due to the pin 147 being guided by the second elongated guide opening 103b-2. Thus, the I-shaped roller 61A is disengaged from the outer edge 11a of the disc 11 (FIG. 33-(D)). The second disc arm 143 is rotated in the K2 direction due to the pin 143b on the end overriding a cam 103f formed on the chassis 103. Thus, the I-shaped roller 62A is disengaged from the outer edge 11a of the disc 11 (FIG. 33-(D)). Thereby, gaps 151, 152 and 153 are provided between the outer edge 11a of the disc 11 and each of the I-shaped roller 61A, the I-shaped roller 62A and the inner bottom surface 6OAa-1 of the guide groove 6OAa of the guide rail member 60A, respectively. Thus, the disc 11 is released from confinement and is freely rotatable.

In this state, the disc 11 is rotated by the turntable rotating motor, and is reproduced by the optical pick-up 36A.

A description will now be given of an operation for accommodating the disc, for which a reproducing operation has ended, in the original first disc accommodating section 41A-1.

In this accommodating operation, the loading motor 174 is reversely rotated to move the I-shaped roller 61A to a position adjacent to the outer edge 11a of the disc 11. The I-shaped roller 62A is pressed by the outer edge 11a of the disc 11. Then, the turntable 37A is moved in the Z2 direction to release the disc 11 from being clamped. The I-shaped roller 62A presses the disc 11 to guide the disc 11 in the direction opposite to the T direction. The I-shaped rollers 61a, 62A and the guide rail member 60 supports the disc 11 at three points. Then, the loading arm 140 rotates in the L2 direction to the original position. When the loading arm 140 is rotated in the L2 direction, the first disc arm 142 and the second disc arm 143 are moved reversely in the reverse order as mentioned above. Thus, the disc 11 rolls in the direction opposite to the direction S to be conveyed in the Y1 direction while the disc 11 is supported by the I-shaped rollers 61A and 62A and the guide groove 6OAa (guide groove 109a).

A description will now be given of an operation for ejecting the disc 11 from the disc reproducing apparatus 30A.

In the ejecting operation, the loading motor 174 is rotated in the normal direction to move the turntable 37A in the Z2 direction. Thus, the disc 11 is released from being clamped. Then, the loading arm is further rotated to a position shown in FIG. 42 where the slit 140g-1 is detected by the sensor 145.

When the loading arm 140 is rotated to a position further from the position shown in FIG. 39 in the L1 direction, the first disc arm 142 is moved in the Y2 direction and is rotated in the R1 direction due to the pin 147 being guided by the third elongated guide opening 103b-3. Thus, the I-shaped roller 61A pushes the outer edge 11a of the disc 11 at the position Q3 in a direction between the direction X1 and the direction Y2. Thereby, the disc 11 is conveyed in the Y2 direction while rolling along the guide groove 6OAa in the S1 direction and while being pressed against the guide groove 6OAa of the guide rail member 60A by the I-shaped rollers 61A and 62A.

At this time, the second disc arm 143 is rotated in the K2 direction with respect to the first disc arm 142 due to the I-shaped roller 62A being pushed by the disc 11.

Additionally, the X1 side of the outer edge 11a of the disc 11 presses a pole portion 108a on an end of the insertion lever 108 so as to rotate the insertion lever 108 in the U1 direction against a force of a spring 116. That is, the disc 11 moves while pushing the pole portion 108a of the insertion lever 108, and an end in the Y2 direction exits from an opening of the disc insertion member 111.

When the loading arm 140 is rotated to a position shown in FIG. 42, the first disc arm 142 and the second disc arm 143 moves to a state shown in FIG. 43 in which the first disc arm 142 faces toward the X1 direction by rotating about 90 degrees in the R1 direction and the I-shaped roller 61A moves adjacent to the turntable 37A and presses a position Q10 on the Y1 side of the disc 11. Thus, one half (a portion to be grasped) of the disc 11 protrudes from a front bezel 39A of the disc reproducing apparatus 30A. Then, the operator can grasp and take out the disc 11 from the disc reproducing apparatus 30A. Additionally, in the disc conveying mechanism 34A, the loading motor 174 is reversed to be the disc waiting state immediately after the state shown in FIGS. 44 and 45 is achieved.

A description will now be given of an operation for inserting the disc 11 into the disc reproducing apparatus 30A.

Figure 44:
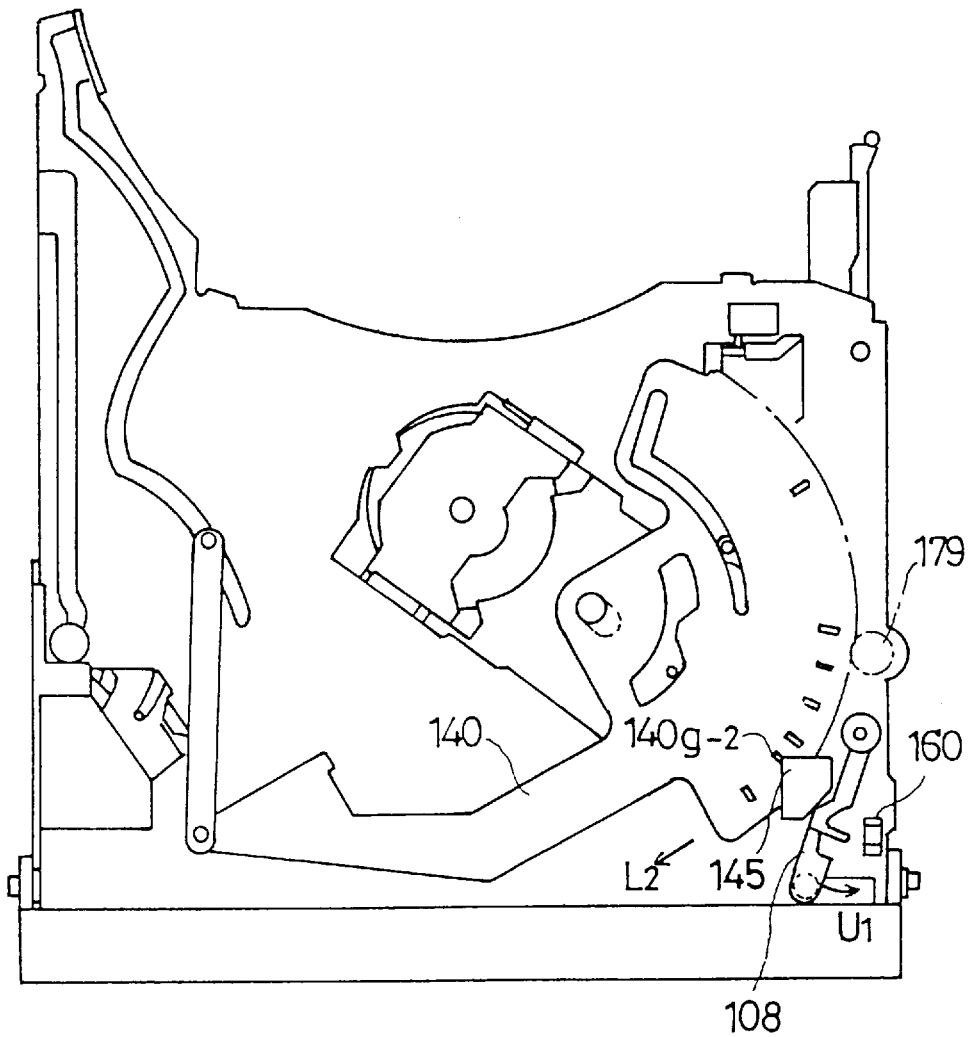
FIG. 44 is a plan view of the disc conveying mechanism when a disc is inserted.

When an operation for designating one of the disc accommodating sections is performed, the loading motor 174 is rotated to rotate the loading arm 140 to a position shown in FIG. 44 so that the disc conveying mechanism 34A is in the state shown in FIGS. 44 and 45. The insertion lever 108 is rotated in the U2 direction by the spring 116.

If the operator inserts the disc 11 into the disc reproducing apparatus 30A through the insertion opening 71A of the front bezel 39A and the opening 111a of the disc insertion opening member 111, the X2 side of the outer edge 1a of the disc 11 presses the I-shaped roller 62A to rotate the second disc arm 143 in the K2 direction. The X1 side of the outer edge 11a of the disc 11 presses the pole portion 108a of the end of the insertion lever 108 to rotate the insertion lever in the U1 direction against a force of the spring 116.

As three quarters of the disc 11 on the Y1 side is inserted, the disc insertion detector 106 is turned on by the disc 11. This causes a reverse rotation of the loading motor 174, and the loading arm 140 is rotated in the L2 direction. The disc 11 is pressed by the I-shaped roller 62A which extends around about one half of the disc 11. Thus, the disc 11 is conveyed in the Y1 direction while being supported by the I-shaped rollers 61A and 62A and the guide rail member 60A and while rolling in the S2 direction along the guide rail member 60A.

The position of the I-shaped roller 62A when the disc 11 is inserted by the operator is indicated by single dashed chain lines in FIG. 45. The I-shaped roller 62A is in contact with about one half of the disc 11 on the Y2 side.

The disc 11 to be conveyed is clamped once, and thereafter, the disc is unclamped and conveyed in the Y1 direction. The disc 11 is then conveyed in the Y1 direction so that the disc 11 is accommodated in the designated one of the disc accommodating sections of the disc accommodating unit 33A.

A description will now be given, with reference to FIGS. 46 and 47, of a structure of the disc accommodating unit 33A around the stock arm.

Figure 46:
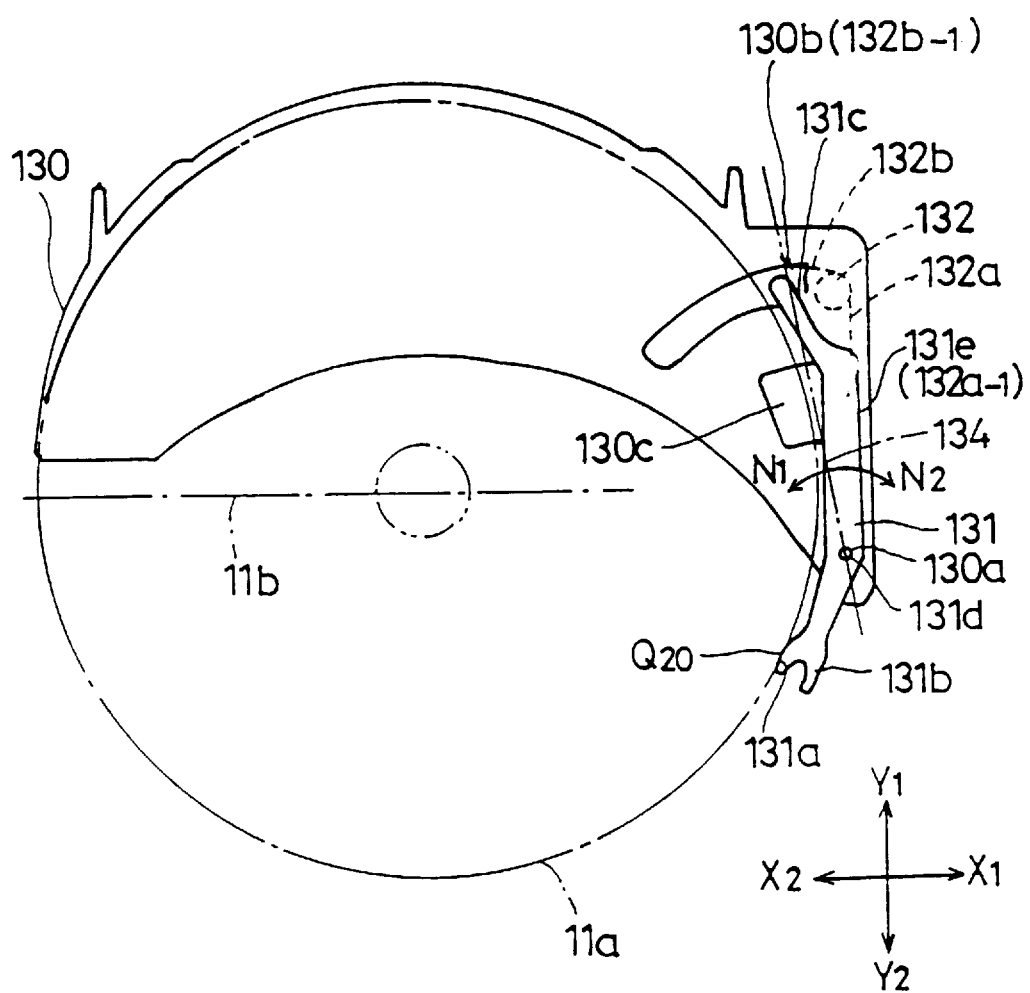
FIG. 46 is an illustration of a structure around a stock arm in a disc accommodating state.
Figure 47:
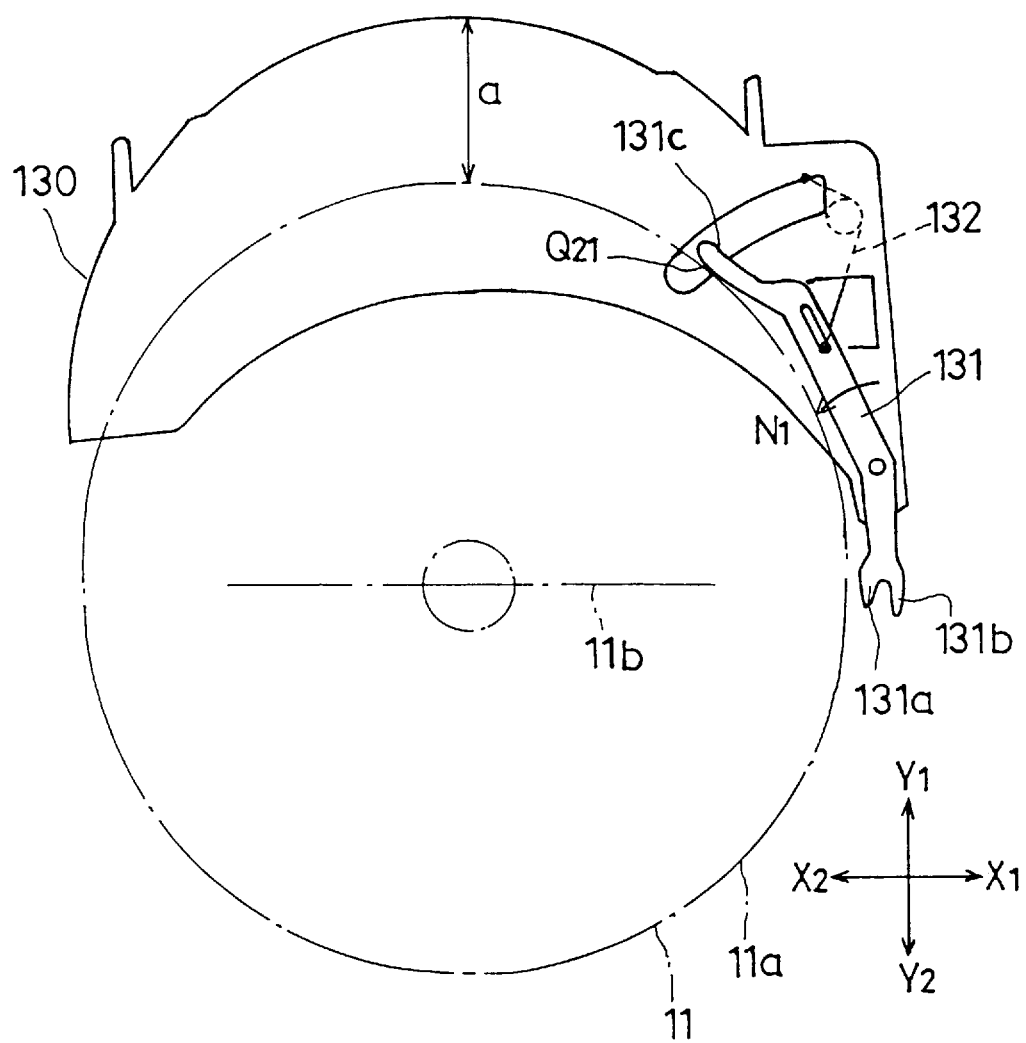
FIG. 47 is an illustration the structure around the stock arm when the disc is not present.

FIG. 46 shows a state where the disc is accommodated. FIG. 47 shows the disc accommodating unit 33A in a state where the disc is not accommodated.

The stock arm 131 as a holding member has generally a reversed C-shape. The stock arm 131 has the pressing finger 131a and an engaging finger 131b on the Y2 direction side, and has the pushing finger 131c on the Y1 direction side. The stock arm 131 is rotatably supported by the shaft portion 130a mounted on the separation plate 130. An opening 131d of the stock arm 131 is located in a position slightly offset from the center in the Y2 direction.

A torsion coil spring 132 (refer to FIG. 31, 46 and 47) is provided on the back side of the separation plate 130. An end 132a-1 of a first arm portion 132a of the torsion coil spring 132 is engaged to an opening 131e of the stock arm 131, and an end 132b-1 of a second arm portion 132b is engaged to an opening 130b of the separation plate 130. The torsion coil spring 132 is mounted between the stock arm 131 and the separation plate 130 so that an angle between the first and second arm portions 132a and 132b is elastically reduced. An opening 130c through which the arm portion 132a of the torsion coil spring is inserted is formed in the separation plate 130. The opening 130c limits a range of deflection of the first arm portion 132a so as to define a range of rotation of the stock arm 131.

The torsion coil spring 132 is provided for rotating the spring arm 131 stepwise. That is, the end 132a-1 of the first arm portion 132a traverses a line 134 (refer to FIG. 46) when the stock arm 131 is rotated. The line 134 is a line passing the opening 130b (corresponding to the end 132b-1 of the second arm portion 132b of the torsion coil spring 132) and a shaft portion 130a.

When the disc 11 is accommodated, an end 132a-1 of the first arm portion 132a is positioned on the X1 side of the line 134 as shown in FIG. 46. Thus, the stock arm 131 is rotated in the N2 direction by the torsion coil spring 132, and the position of the stock arm 131 is determined by the opening 130c. Thus, the outer edge 11a of the disc 11 is pressed by the pressing finger 131a at a point Q20 which is located on the Y2 side of the above-mentioned line 11b. Thereby, the disc 11 is prevented from being removed from the corresponding disc accommodating section, and is retained in the disc accommodating section.

When the eject lever 109 is rotated in the M1 direction, an end 109c of the eject lever 109 presses the engaging finger 131b. The stock arm 131 is rotated in the N1 direction while the angle between the first and second arm portions 132a and 132b is reduced, that is, a spring force is stored in the torsion coil spring 132. When the end 132a-1 of the first arm portion 132a moves in the X2 direction and passes the line 134, the stock arm 131 is urged by the torsion coil spring in the N1 direction. Thus, the stock arm 131 is powerfully rotated in the N1 direction to a position determined by the opening 130c as shown in FIG. 47.

The pressing finger 131a moves back in the X1 direction due to the rotation of the stock arm 131 in the N1 direction, and the pushing finger 131c pushes the outer edge 11a of the disc 11 at a point Q21 which is located on the Y1 side of the line 11b. Thus, the disc 11 is moved by the distance a in the direction Y2 from the corresponding disc accommodating section of the disc accommodating unit 33A so that the outer edge 11a of the disc 11 contacts the I-shaped rollers 61A and 62A.

An operation for accommodating the disc 11, which has been conveyed in the Y1 direction, in the corresponding disc accommodating section of the disc accommodating unit 33A can be surely performed in a similar manner in which the stock arm 131 is rotated stepwise in the N2 direction initially by the eject lever 109 and subsequently by the torsion coil spring 132 with a certain power.

Additionally, the outer edge 11a of the disc 11 is disengaged from the I-shaped rollers 61A and 62A, as shown in FIG. 35, when the pressing finger 131a of the stock arm 131 pushes and conveys the disc 11 in the Y1 direction. Thus, an operation of a selecting mechanism for selecting one of the discs in the disc accommodating unit 33A can be started.

A description will now be given, with reference to FIGS. 48 to 52, of a structure and operation of the drive mechanism assembly 110.

As shown in FIGS. 29 and 48, the drive mechanism assembly 110 comprises a chassis base 150, a slide member 105, a shaft 170 protruding downwardly from the chassis, gears 171 and 172 and semi-circle pinion gear 173, a loading motor 174 mounted on a back surface of the chassis base 150, a worm gear 175, a cam gear 177, gears 179 and 181, and link arm 183. The slide member 105 is supported on the back surface of the chassis base 150, and is slidable in the Y1 and Y2 directions by being guided by a pin and an elongated guide opening. The gear 171 comprises a worm wheel portion 171a and a gear portion 171b, and is rotatably supported by the shaft 170. The worm gear 175 is fixed on a spindle shaft of the loading motor 174, and is engaged with the worm wheel portion 171a. The cam gear 177 is supported by a shaft 176 mounted on the chassis base 150. The cam gear 177 has a cam groove 177a, and is engaged with the gear 172. The gear 179 is rotatably supported by a shaft 178 which is pivotally mounted to the chassis base 150. The gear 179 is engaged with the cam gear 177. The gears 181a and 181b are rotatably supported by shafts 180a and 180b mounted to the pinion gear 173, and are engaged with the gear 172 and the gear portion 171b, respectively. The link arm 183 is rotatably supported by a shaft 182 fixed on the chassis base 150. The link arm 183 comprises two pins 183a and 183b. The gear 179 is engaged with the rack gear 140d of the loading arm 140 so that the loading arm 140 is moved when the gear 179 is rotated.

The gear 181 does not rotate and stays in a position, when rotation of the pinion gear 173 is restricted, so as to transmit rotation of the gear portion 171b to the gear 172. On the other hand, when rotation of the gear 181 is not restricted, the gear 181 rotates around the gear 172 while spinning so that the pinion gear 173 is rotated. This is because rotation of the cam gear 177 is restricted by the cam groove 177a and the pin 183a, and the cam gear 177 and the gear 172 do not rotate and stay in the same positions.

The slide member 105 comprises a horizontal plate portion 105a and a vertical plate portion 105b. A trapezoid guide groove 105c is formed in the vertical plate portion 105b. A stepwise groove 105d is formed in the horizontal plate portion 105a. The pin 183a of the link arm 183 is engaged with the cam groove 177a. The pin 183b is engaged with the stepwise groove 105d. A rack gear 105e (refer to FIG. 49B) is formed on the horizontal plate portion 105a. The rack gear 105e is engaged with the pinion gear 173.

Figure 49A:
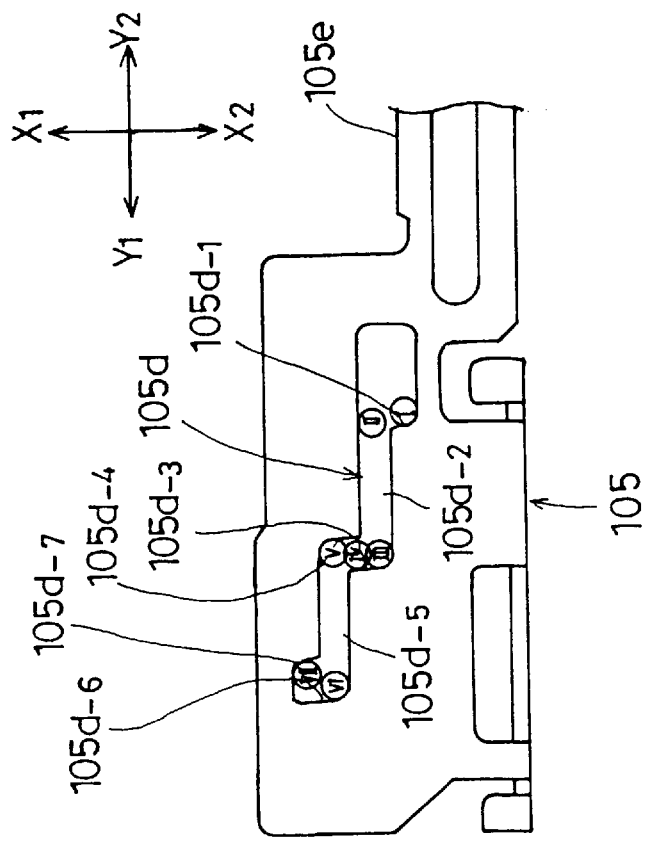
FIGS. 49A and 49B are illustrations for explaining a relationship between a pin position in a cam groove of a cam gear and a pin position in a stepwise groove of a slide member in the drive mechanism assembly.
Figure 49B:
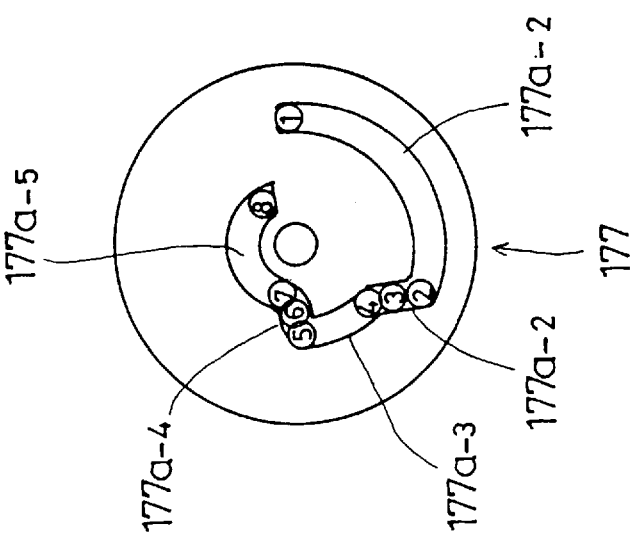

The stepwise groove 105d generally extends in the Y1–Y2 direction, and is configured by a combination of groove portions extending in the Y1 direction and step portions extending in the X1–X2 direction. That is, the stepwise groove 105d comprises, as shown in FIG. 49B, a first step portion 105d-1, a first groove portions 105d-2, a second step portion 105d-3, a third step portion 105d-4, a second groove portion 105d-5, a fourth step portion 105d-6 and a fifth step portion 105d-7, in that order in a direction from the Y2 side to the Y1 side.

The cam groove 177a is configured by an combination of arc-like grooves extending in a circumferential direction and radial groove portions extending in substantially radial directions of the cam gear 177. That is, the cam groove 177a comprises a first arc-like groove 177a-1, a first radial groove 177a-2, a second arc-like groove 177a-3, a second radial groove 177a-4 and a third arc-like groove 177a-5, in that order in a direction from a periphery toward the center.

The first groove 105d-2 of the stepwise groove 105d limits rotation of the link arm 183 to a position where the pin 183a is positioned in the first radial groove 177a-2. The second grove 105d-5 of the stepwise groove 105d limits rotation of the link arm 183 to a position where the pin 183a is positioned in the second radial groove 177a-4.

The first arc-like groove 177a-1 of the cam groove 177a limits rotation of the link arm 183 to a position where the pin 183b is positioned in the first step portion 105d-1. The second arc-like groove 177a-3 of the cam groove 177a limits rotation of the link arm 183 to positions where the pin 183b is positioned in the second and third step portions 105d-3 and 105d-4. The third arc-like groove 177a-5 of the cam groove 177a limits rotation of the link arm 183 to positions where the pin 183b is positioned in the fourth and fifth step portions 105d-6 and 105d-7.

When the cam gear 177 is rotated in the counterclockwise direction, the first radial groove 177a-2 of the cam groove 177a releases the limitation of rotation of the link arm 183 which is positioned where the pin 183b is in the first step portion 105d-1 so that the link arm 183 is rotated in the clockwise direction. The second radial groove 177a-4 of the cam groove 177a releases the limitation of rotation of the link arm 183 which is positioned where the pin 183b is in the second step portion 105d-3 so that the link arm 183 is rotated in the clockwise direction. When the cam gear 177 is rotated in the clockwise direction, the second radial groove 177a-4 and the first radial groove 177a-2 permits the link arm 183 to rotate in the counterclockwise direction.

Each of the first, second and fourth step portions 105d-1, 105d-3 and 105d-6 of the stepwise groove 105d contacts the pin 103b so as to limit movement of the slide member 105 in the Y2 direction. Each of the fifth and third step portions 105d-7 and 105d-4 contacts the pin 183 to limit movement of the slide member 106 in the Y2 direction. Additionally, as mentioned above, the pinion gear 173 is engaged with the rack gear 105e of the slide member 105.

Accordingly, the slide member 105 is not slidable, that is, the pinion gear 173 is not rotatable when the cam gear 177 is rotatable. On the other hand, the slide member 105 is slidable, that is, the pinion gear 173 is rotatable when the cam gear 177 is not rotatable.

It should be noted that the chassis base 150 has an arm portion 150a. The arm portion traverses under the disc conveying mechanism 34A. The arm portion 150a is provided with a pad 155 made of a synthetic resin. The pad 155 supports the disc 11 without damage between the disc accommodating unit 33A and the disc reproducing unit 32A.

A description will now be given of an operation of the drive mechanism assembly 110.

Figure 52:
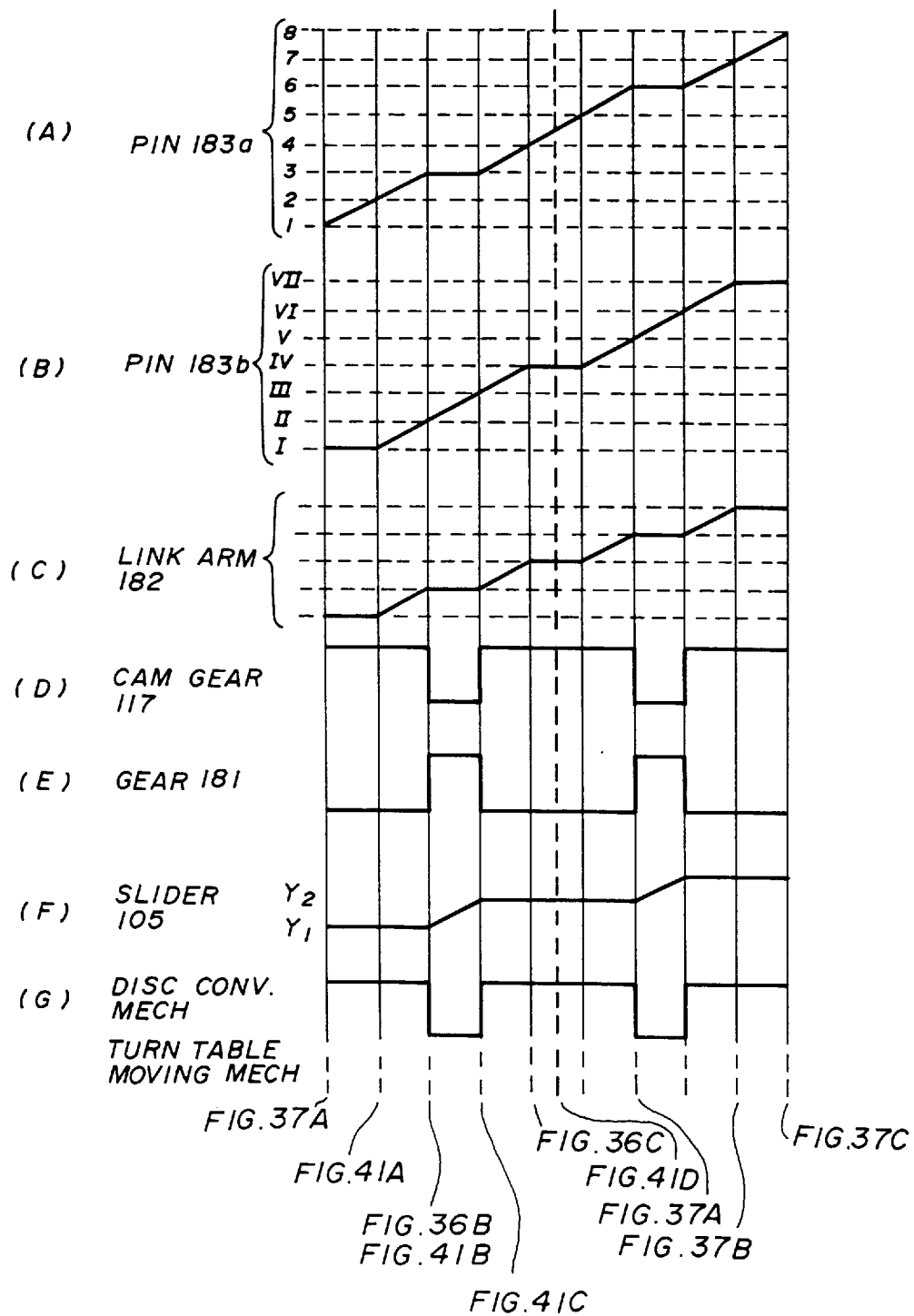
FIG. 52 is an operation chart of the drive mechanism assembly.

FIG. 52 shows an operation of each part of the drive mechanism assembly 110.

Figure 50A:
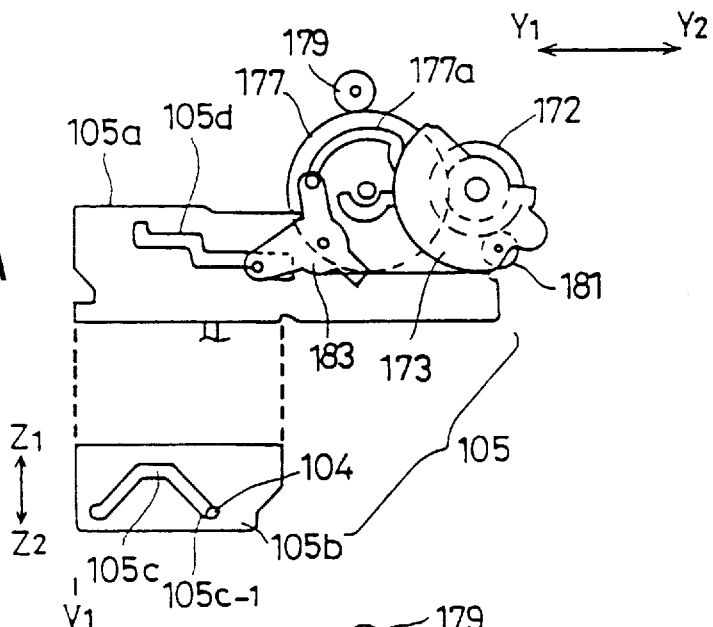
FIGS. 50A, 50B and 50C are illustrations for showing a disc clamping operation.

When the disc conveying mechanism 34A is in an initial state as shown in FIG. 34, the drive mechanism assembly 110 is in a state shown in FIG. 50A. In this state, the cam gear 177 is rotated in the clockwise direction. The pin 183a is located at a position 1 in the cam groove 177a (refer to FIG. 49A). The link arm 183 is rotated in the counterclockwise direction. The pin 183b is located at a position I in the stepwise groove 105d (refer to FIG. 49B). Accordingly, the slide member 105 is located in a position V1 as shown in FIG. 50A, and is not movable in the Y2 direction. Thus, the pinion gear 173 is not rotatable. The pin 104 is located in a position at an end of the trapezoid guide groove 105c.

When the motor 174 starts in a normal direction, the rotation of the motor is transmitted to the cam gear 177 through the worm gear 175 and the gears 171, 181 and 172. Thus, the cam gear 177 is rotated in the counterclockwise direction. The pin 183a moves from the position 11 to a position 2 in the cam groove 177a. The link arm 183 stays in the initial position until the pin 183a reaches the position 2. The pin 183b is still at the position I in the stepwise groove 105d. Thus, the slide member 105 is not movable in the Y2 direction, and the pinion gear 173 is not rotatable.

When the cam gear 177 is rotated in the counterclockwise direction, the gear 179 is rotated and consequently the loading arm 140 is rotated in the L1 direction. Thus, the disc conveying mechanism 34A conveys the disc 11 in the Y2 direction from, for example, the first disc accommodating section 41A-1.

Figure 37B:
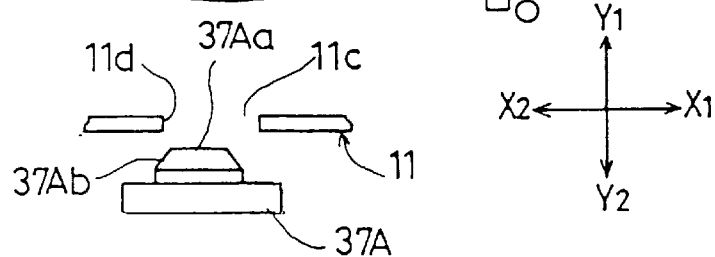
Figure 50B:
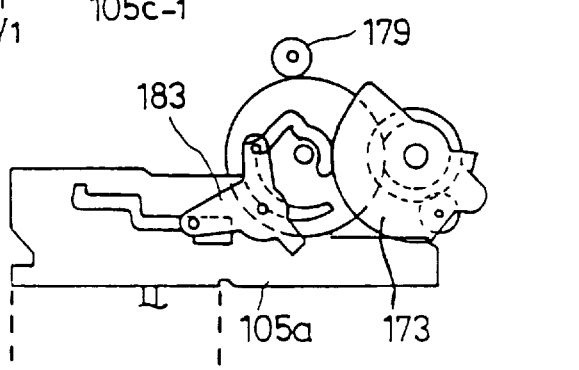
Figure 50C:
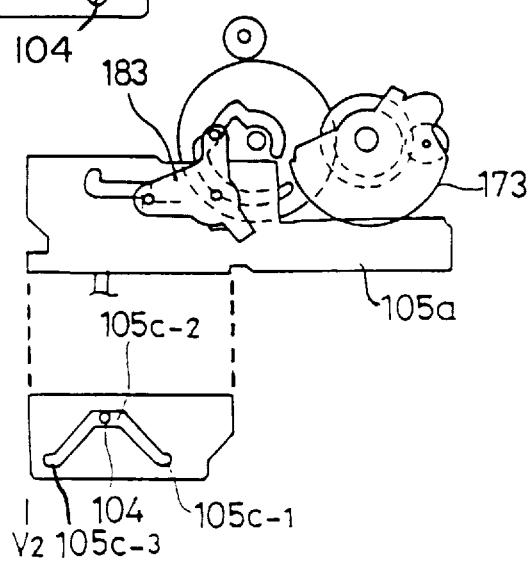

At a final stage of the conveying process for the disc 11 to a position shown in FIG. 37 (a position in which the slit 140g-6 is detected), the link arm 183 is rotated in the clockwise direction so that the pin 183a moves from the position 2 to a position 3 and the pin 183b reaches a position II as shown in FIG. 50B. Thus, the cam gear 177 becomes unrotatable, and the operation of the disc conveying mechanism is stopped. Alternatively, the slide member 150 becomes movable (the pinion gear 173 becomes rotatable). Thus, the gear 181 rotates around the gear 172 while spinning, and the pinion gear 173 is rotated. This results in the movement of the slide member 105 in the Y2 direction. As shown in FIG. 50C, the slide member 105 moves until the pin 183b reaches a position III, that is, a position V2 where the second step 105d-3 contacts the pin 183b. When the second step portion 105d-3 contacts the pin 183b, the movement of the slide member 105 is limited and is stopped.

In this state, the pin 104 is guided by a top portion 105c-2 of the trapezoid guide groove 105c. Thus, the disc reproducing unit 32A is rotated in the J direction, and the turntable 37A moves upwardly to clamp the disc 11.

When the pin 183b reaches the position III, the link arm 183 becomes rotatable in the clockwise direction. Then, the pin 183a is moved by the first radial groove 177a-2 and the link arm 183 is rotated in the clockwise direction until the pin 183a reaches a position 4 and the pin 183b reaches a position IV as shown in FIG. 50C. Thus, the slide member 105 becomes unmovable, and the cam gear 177 becomes rotatable in the counterclockwise direction. When the cam gear 177 rotates in the clockwise direction, the disc conveying mechanism 34A is operated to disengage the I-shaped rollers 61A and 62A from the outer edge 11a of the disc 11.

When the cam gear 177 is rotated in the counterclockwise direction and the pin 183a reached in the middle of a position 4 and a position 5, the slit 140g-6 is detected by the sensor 145. In this state, normally, the loading motor 174 is stopped and another motor (not shown in the figures) for rotating the turntable is started to rotate the disc 11 for a reproducing operation.

When the disc 11 is moved to the original first disc accommodating section 41A-1 after a reproducing operation is ended, the loading motor 174 is reversed. Then, the cam gear 177 is rotated in the clockwise direction first, and the I-shaped rollers 61A and 62A hold the disc 11. Then the slide member 105 in moved in the Y1 direction to unclamp the disc 11, and the cam gear 177 is rotated again in the clockwise direction. Thus, the unclamped disc 11 is conveyed in the Y1 direction.

When the disc is ejected, the loading motor 174 continues to rotate in a normal direction even if the slit 140g-6 is detected, and the cam gear 177 is rotated in the counterclockwise direction. Thus, the pin 183a is moved from the position 4 to the position 5 in the second arc-like groove 177a-3. The link arm 183 stays in the same position until the pin 183a reaches the position 5. The pin 183b is still at the position IV in the stepwise groove 105d. Thus, the slide member 105 is not movable in the Y2 direction, and the pinion 173 is not rotatable.

When the cam gear 177 rotates in the counterclockwise direction as mentioned above, the gear 179 is rotated, and the loading arm 140 is rotated in the L1 direction to a position where the slit 140g-4 is detected. Then, the disc conveying mechanism 34A holds the outer edge 11a of the disc 11.

Figure 51A:
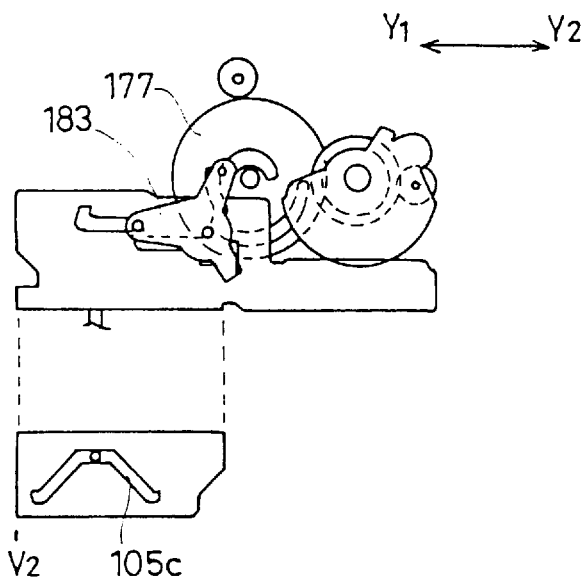
FIGS. 51A, 51B and 51C are illustrations for showing a disc unclamping operation.

After the pin 183a reaches the position 5, the pin 183a is moved by the radial groove 177a-4 to the position 6, and the pin 183b is moved to the position V as shown in FIG. 51A. Thereby, the cam gear 177 becomes unrotatable, and the slide member 105 becomes movable. Thus, the gear 181 is rotated around the gear 172 while spinning, and the pinion gear 173 is rotated, resulting in movement of the slide member 105 again in the Y2 direction. The slide member 105 moves until the pin 183b reaches the position IV, that is, the slide member is moved to the position V3 where the pin 183b contacts the fourth step 105d-6. When the fourth step 105d-6 contacts the pin 183b, the movement of the slide member is restricted and stopped.

In this state, the pin 104 is guided by a root portion 105c-3 of the trapezoid guide groove 105c on the Y1 side. The disc reproducing unit 32A is rotated in the J direction, and the turntable 37A is moved downward to unclamp the disc 11. As maintained above, the upward movement and downward movement of the turntable 37A can be achieved while the loading motor 174 is rotated in the normal direction, that is, without reversing the loading motor 174.

Figure 51B:
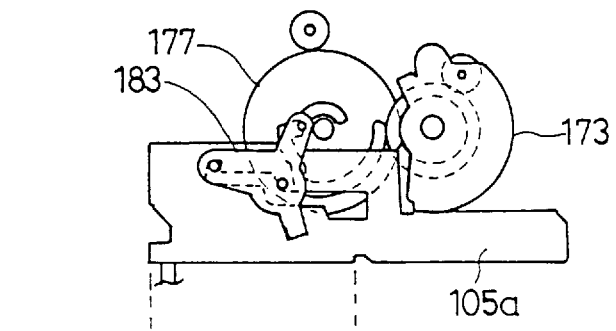

When the pin 183b reaches the position VI as shown in FIG. 51B, the link arm 183 becomes rotatable in the clockwise direction. Thus, the pin 183 is driven by the radial groove 177a-4, and the link arm 183 is rotated in the clockwise direction. Then, the pin 183a reaches a position 7, and the pin 183b reaches a position VII. The cam gear 177 becomes rotatable again. The slide member 105 is still in the state where the movement thereof is restricted.

Figure 51C:
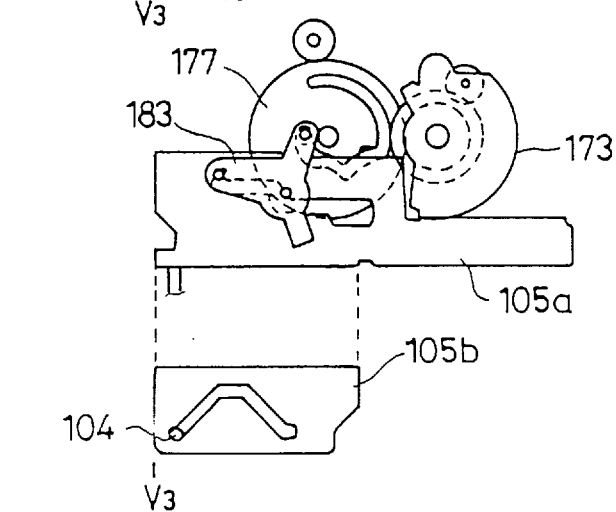

The cam gear 177 continues to rotate to a position shown in FIG. 51 in the counterclockwise direction. The gear 179 is rotated due to the rotation of the cam gear 177, and the loading arm 140 is further rotated in the L1 direction. Thus, the disc conveying mechanism 34A conveys the disc 11 in the Y2 direction from the reproducing position to outside the disc reproducing apparatus 30A. The loading motor is stopped when the slit 140g-2 is detected. At this time, the pin 183a is positioned between a position 8 and a position 7 which is the a disc waiting state.

It should be noted that a disc is inserted in this state, the loading motor 174 is rotated in the reverse direction, and the cam gear 177 and the slide member 105 are reversely operated so that the drive mechanism assembly 110 becomes the initial state as shown in FIG. 50A.

A description will now be given, with reference to FIGS. 51A to 55D, of a structure and an operation of a disc clamp mechanism 190.

Figure 53:
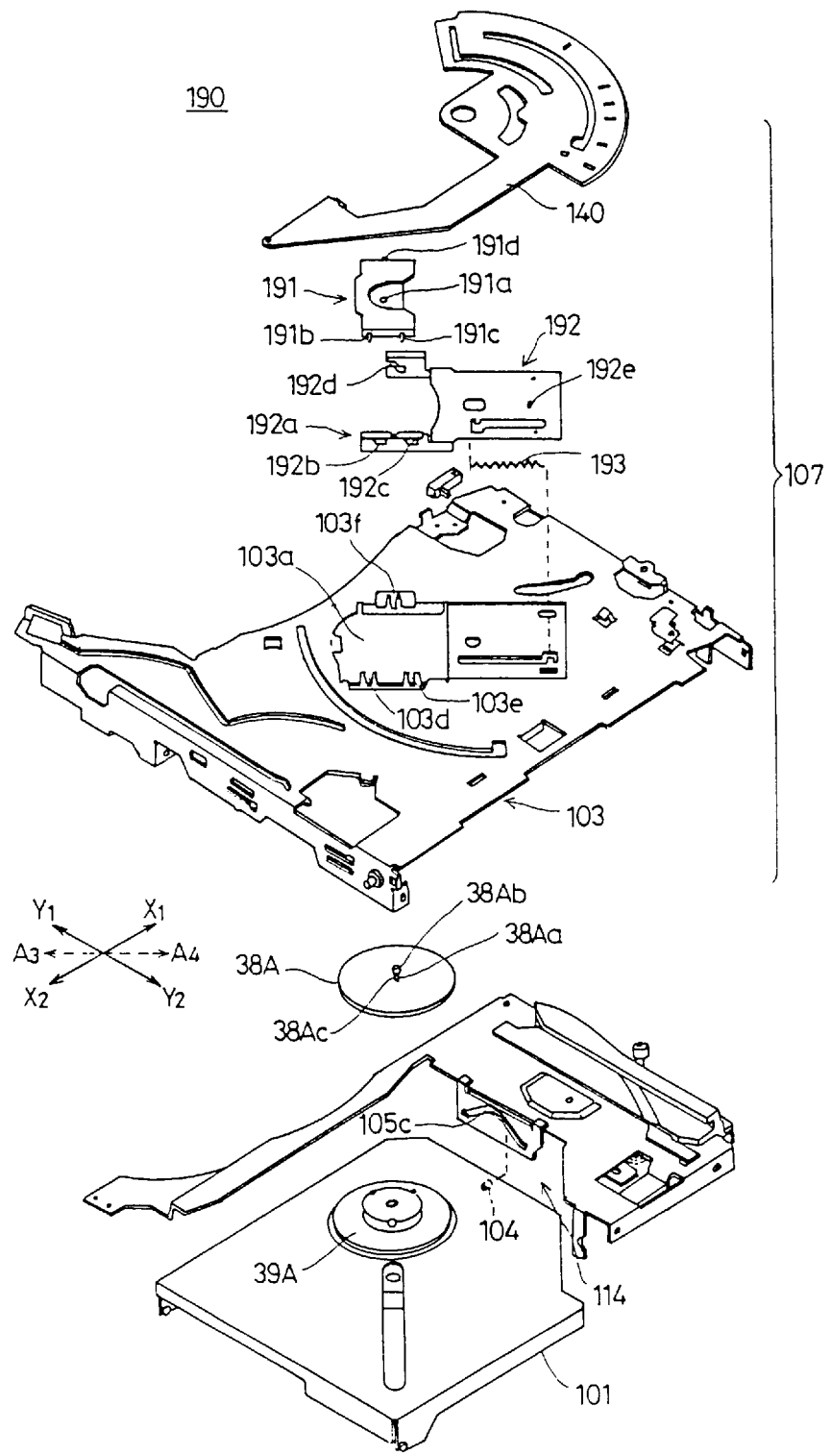
FIG. 53 is an exploded perspective view of a disc clamp mechanism.
Figure 54:
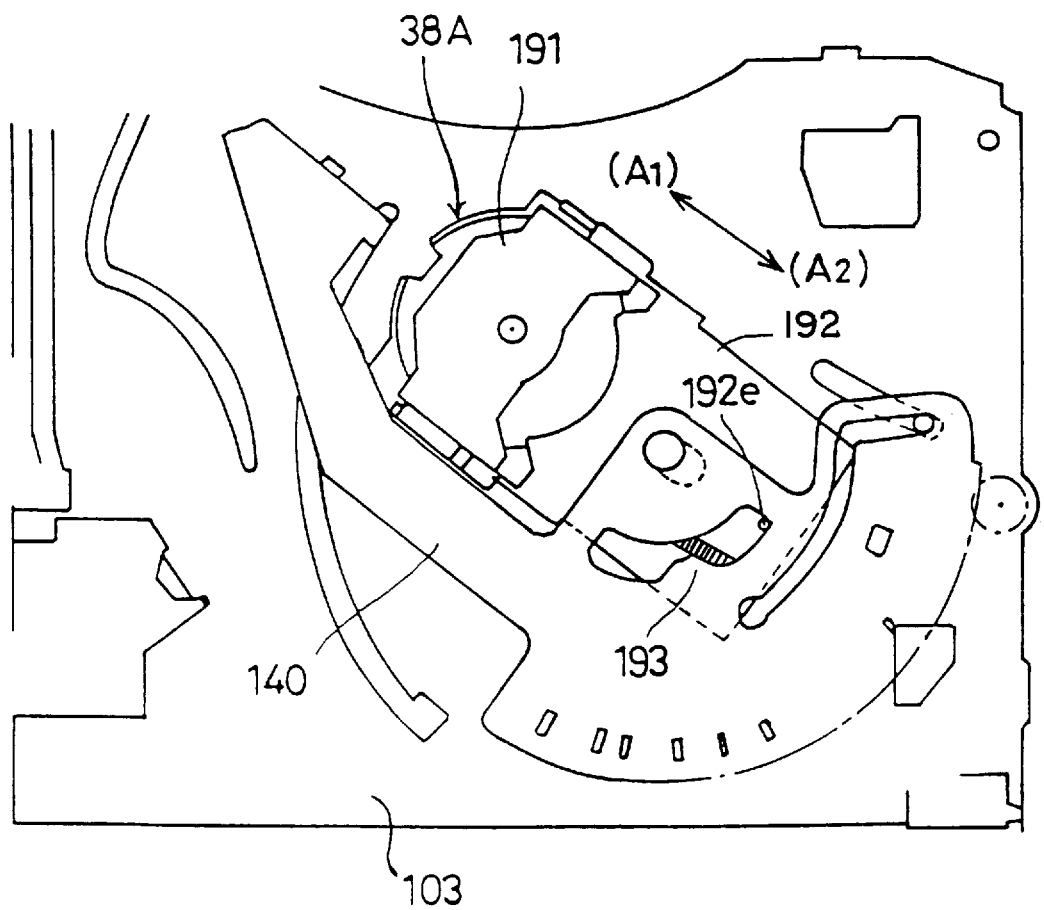
FIG. 54 is a plan view of the disc clamp mechanism.

The disc clamp mechanism 190 comprises, as shown in FIGS. 53 and 54, a clamper holder moving mechanism 107 which moves a clamper holder upwardly and downwardly and a turntable moving mechanism 114 which moves the turntable 37A upwardly and downwardly.

According to the disc clamp mechanism 190, a disc is not warped in an umbrella shape or a reversed umbrella shape when the disc is clamped.

The turntable moving mechanism 114 comprises, as shown in FIG. 53, the pin 104 and the trapezoid guide groove 105c formed in the vertical plate portion 105b of the slide member 105. The turntable moving mechanism 114 is provided for moving the turntable 37A upwardly and downwardly as shown in FIGS. 55A to 55D.

The clamper holder moving mechanism 107 comprises, as shown in FIG. 53, the clamper 38A and a clamper holder 191 and a clamp slider 192. The clamper 38A comprises a column portion 38Aa which extends upwardly in the center and a flange portion 38Ab which protrudes from an upper portion of the column portion 38Aa. An annular groove 38Ac is formed on the periphery of the column portion 38Aa and on the lower side of the flange 38Ab.

The clamper holder 191 has a center opening 191a in the center thereof. Additionally, the clamper holder 191 has pins 191b and 191c on one side thereof, and has a pin 191d on the other side thereof.

The clamper 38A is supported on the clamper holder 191 by an annular groove 38 being engaged with the center opening 191a. A width w1 of the annular groove 38Ac in the Z direction and a thickness t1 of the clamper holder 191 have a relationship w1<t1. Thus, the clamper 38A has a play with respect to the clamper holder 191 in an axial direction of the clamper 38A by a distance (t1–w1).

The pins 191b, 191c and 191d are engaged with the guide openings 103d, 103e and 103f formed in the chassis 103, respectively. The clamper holder 191 is movable in the Z1–Z2 direction. The clamper 38A protrudes on the back side of the chassis 103 by passing through the opening 103a.

The clamp slider 192 has a forked portion 192a and cam grooves 192b, 192c and 192d which are oblique to the forked portion 192a. A pin 192e is provided on the other end. The clamp slider 192 is slidably mounted on the chassis 103 in the A3–A4 direction in a state where the cam grooves 192b, 192c and 192d are engaged with the respective pins 191b, 191c and 191d. The direction A3 is a direction between the direction Y1 and the direction X2, and the A4 direction is a direction between the Y2 direction and the X1 direction. The pin 192e is engaged with the trapezoid cam 140f of the loading arm 140.

The clamp slider 192 is urged in the A4 direction by a tension coil spring 193. The trapezoid cam 140f comprises a top portion 140f-2 and oblique portions 140f-1, 140f-2 on each side of the top portion. The oblique cam groove 192b comprises an upper portion 192b-1, a lower portion 192b-3 and an oblique portion between the upper and lower portions 192b-1 and 192b-3.

The clamp slider 192 can be positioned in either of three positions P10, P11 and P12 in the A3–A4 direction by the cam 140f. Thereby, the clamper holder 191 can be positioned in one of the higher position Hu, the middle position Hm and the lower position Hl.

The higher position Hu is an avoidance support position in which the clamper holder 191 supports the flange 38Ab so as to support the clamper 38A in an avoidance position H10 away from and higher than the disc 11 so that the conveyance of the disc 11 is not interfered. The middle position Hm is a position in which the clamper 38A is supported at a position H11 which is the same height as the disc 11. The lower position Hl is a position where the clamper holder 191 is spaced from, that is, lower than the flange 38A.

A description will now be given of an operation of the disc clamp mechanism 190.

FIG. 33-(G) shows a movement of the clamper holder 191, and FIG. 33-(I) shows a movement of the turntable 37A.

A description will given first of a clamping operation for the disc 11.

In the initial state of the disc conveying mechanism 34A as shown in FIG. 34, the clamp slider 192 is located in the position P10 as shown in FIG. 55A. That is, the clamper holder 191 is positioned in the higher position Hu and the clamper 38A is positioned in the higher position H10. Additionally, the turntable 37A is positioned in the lower position H20 so that the turntable 37A does not interfere with the conveyance of the disc 11.

When the loading arm 140 is rotated by the loading motor 174 in the counterclockwise direction, and the disc 11 is conveyed to the reproducing position, the oblique portion 140f-1 of the cam 140f presses the pin 192e as shown in FIG. 55B. Additionally, the clamp slider 192 reaches moves in the A3 direction against a force of the spring 193 and reaches the position P11. The clamper holder 191 reaches the middle position Hm while the pin 191b is guided by the oblique portion 192b-2. Thus, the clamper 38A reaches the height H11.

In this state, the turntable moving mechanism 114 is operated as shown in FIG. 55C. That is, the turntable 37A is moved upwardly to the position H21 where the disc 11 is supported. A magnet 37Ac in the turntable 37A attracts an iron plate 38Ad in the clamper 38A so that the disc 11 is clamped on the turntable 37A.

By moving the turntable 37A upwardly after the clamper 38A is moved to the clamp position, a clamping operation can be performed by effectively using the magnetic attraction force of the magnet 37Ac of the turntable 37A which is exerted on the iron plate 38Ad of the clamper 38A.

Thereafter, the loading arm 140 is rotated in the counterclockwise direction, and a state shown in FIG. 55D is achieved. That is, the top portion 140f-2 of the cam 140f presses the pin 192e, and the clamp slider 192 moves further in the A3 direction to reach the position P12. The clamper holder 191 is moved to the lower position Hl while the pin 191b is guided by the lower portion 192b-3 so that the clamper holder 191 is separated from the flange portion 38Ab. Thus, the clamper holder 191 is floated within the annular groove 38Ac.

A description will be given of a case in which the disc 11 is offset from the reproducing position more than a predetermined allowable distance.

Figure 56A:
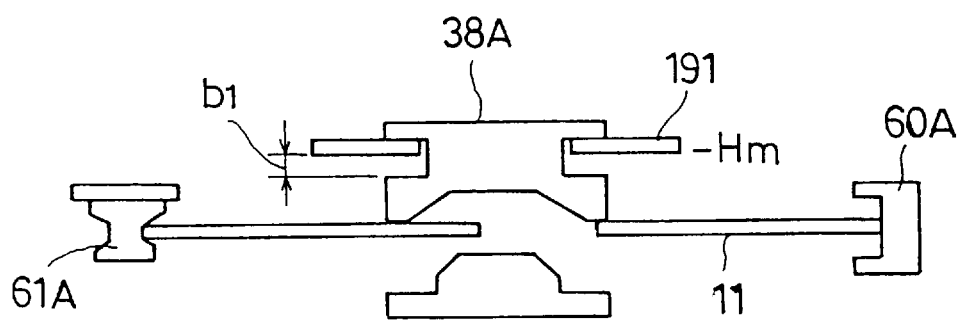
FIGS. 56A and 56B are illustrations for showing a state where the disc is not clamped normally.
Figure 56B:
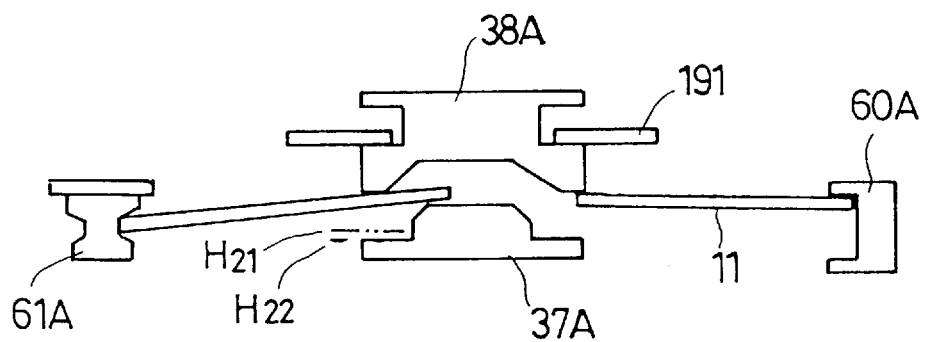

When the turntable 37A is moved upwardly, the turntable 37A presses near the center opening of the disc 11, causing a deformation of the disc 11 into an umbrella shape as shown in FIG. 56B.

As shown in FIG. 56A, the clamper holder 191 is already moved in the middle position, and room for the movement of the clamper 38A in the Z1 direction is limited to a distance b1. Thus, the upward movement of the turntable 37A is limited to the height H22 which is slightly lower than the normal height H21.

Accordingly, the upward movement of the center of the disc 11 is limited, and the deformation of the disc 11 in an umbrella shape is reduced.

A description will now be give of an operation for unclamping the disc.

When the loading motor 174 is reversed and the loading arm 140 is rotated in the clockwise direction, a state shown in FIG. 57A is achieved. That is, the oblique portion 140f-2 of the cam 140f presses the pin 192e, and the clamp slider 192 moves in the A3 direction to reach the position P11. The clamper holder 191 is slightly moved upwardly to the middle position Hm while the pin 191b is guided by the oblique portion 192b-2 so that the clamper holder 191 supports the flange portion 38Ab. Thus, the clamper 38A stays at the height H11.

In this state, the outer edge 11a of the disc 11 is held as shown in FIG. 57B, and the turntable moving mechanism 114 is operated to move the turntable 37A downwardly. Thus, the turntable 37A is separated from the clamper 38A, and reaches the position H20 so that the disc 11 is unclamped.

When the turntable 37A is moved downwardly, the magnet 37Ac of the turntable 37A and the iron plate 38Ad of the clamper 38A is forcibly separated. Until that time, the turntable clamper tends to move downward due to the downward movement of the turntable 37A. If the clamper 38A is moved downwardly, the disc 11 which is held on the outer edge 11a may be deformed into a reversed umbrella shape. However, the clamper holder 191 is already moved upwardly to the middle position to support the flange portion 38Ab of the clamper 38A. Thus, a downward movement of the clamper 38A is limited, and the deformation of the disc 11 in the reversed umbrella shape does not occur.

Thereafter, the loading arm 140 further rotates in the clockwise direction, and a state shown in FIG. 57C is achieved. That is, the pin 192e passes the top portion 140f-2 and reaches the root of the cam 140f. Thus, the clamp slider 192 moves in the A4 direction to the position P10. The clamper holder 191 is slightly moved upwardly to the higher position Hu while the pin 191b is guided by the upper portion 192b-1. Thus, the clamper 38A is moved upwardly to the higher position H10 so that the clamper 38A is separated from the unclamped disc 11.

A description will now be given, with reference to FIGS. 58 and 59A–59D, of a connecting mechanism between the disc reproducing unit 32A and the disc accommodating unit 33A.

Figure 58:
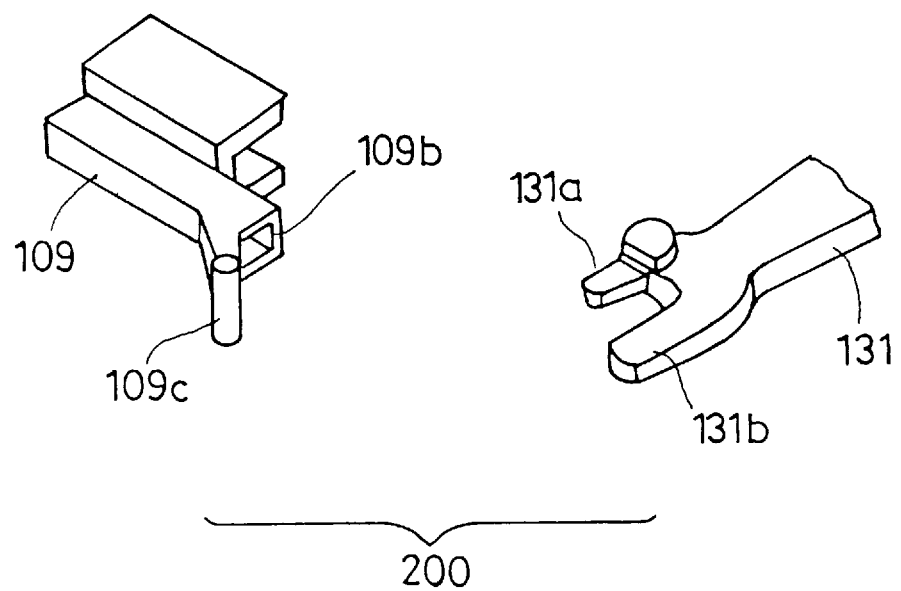
FIG. 58 is a perspective view of a part of a connecting mechanism between the disc reproducing unit and the disc accommodating unit.

The disc reproducing apparatus 30A comprises a connecting mechanism 200 shown in FIG. 58. The connecting mechanism 200 mechanically connects the disc reproducing unit 32A to the disc accommodating unit 33A when the disc conveying mechanism 34A is operated so as to prevent an operation of the rotating mechanism 35A. That is, the connecting mechanism 200 prevents the disc reproducing unit 32A and the disc accommodating unit 33A from being rotated while the conveying mechanism is operated.

The connecting mechanism 200 comprises, as shown in FIG. 58, a connection recess 109b provided at an end of the eject lever 109 and a pressing finger 131a formed at the end of the stock arm 131. That is, each part of the connecting mechanism 200 is an existing part, and no special part is used.

Figure 59A:
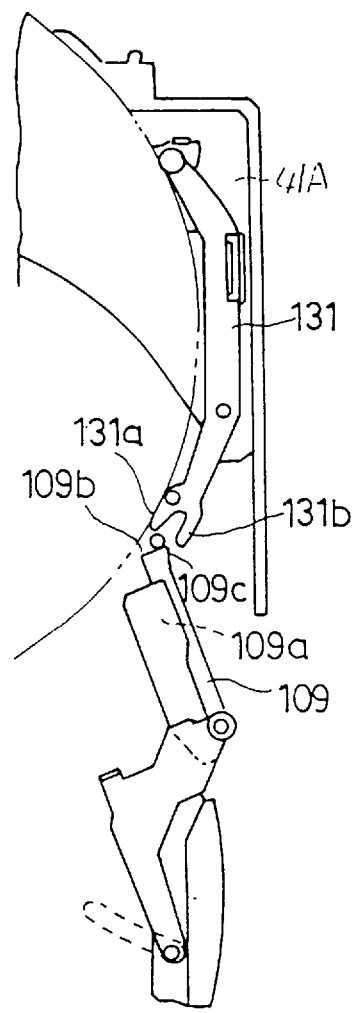
FIGS. 59A, 59B and 59C are illustrations for explaining an operation of the connecting mechanism.

When the disc conveying mechanism 34A is in the initial state as shown in FIG. 34, the eject lever 109 is located at the position shown in FIG. 59A. In this state, the eject lever 109 is not connected to the stock arm 131. Thus, the disc reproducing unit 32A and the disc accommodating unit 33A are not connected to each other, and are freely rotated. That is, both the disc reproducing unit 32A and the disc accommodating unit 33A can be rotated by operating the rotating mechanism 35A.

When the rotating mechanism 35A is operated, the disc reproducing unit 32A and the disc accommodating unit 33A are rotated so that the disc reproducing unit 32 is aligned with a desired disc accommodating section of the disc accommodating unit 33A. After that, the disc conveying mechanism 34A starts to operate. Then, the eject lever 109 is rotated in the M1 direction, and an end portion 109c of the eject lever 109 presses the engaging finger 131b of the stock arm 131. Thus, the stock arm 131 is rotated in the N1 direction.

Figure 59B:
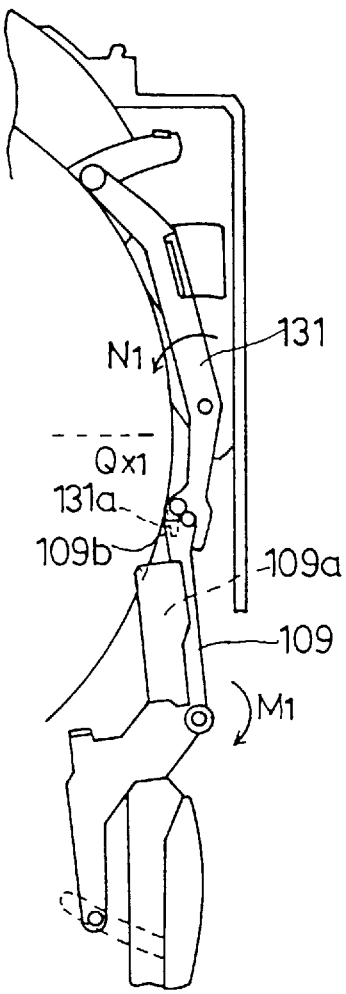
Figure 59C:
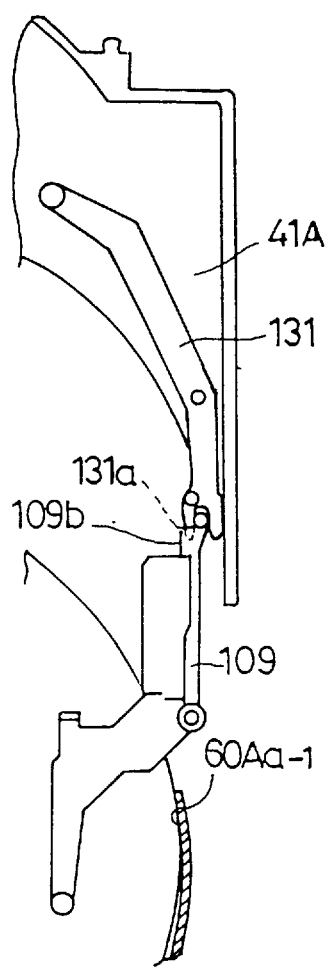

When the eject lever 109 begins to rotate in the M1 direction, the connection recess 109b is engaged with the pressing finger 131a of the stock arm 131 as shown in FIG. 59B. The eject lever 109 and the stock arm 131 are rotated to the positions shown in FIG. 59C where the pressing finger 131a deeply enters into the connection recess 109b, and thus the eject lever 109 and the stock arm 131 are mechanically connected to each other.

Accordingly, the disc reproducing unit 32A and the disc accommodating unit 33A are mechanically connected to each other, and rotation of the disc reproducing unit 33A and the disc accommodating unit is prevented. When the disc conveying mechanism 34A is operated, an operation of the rotating mechanism 35A is electrically prevented. However, there is a possibility that an error can occur in the electrical control of the rotating mechanism 35. In this embodiment, the disc reproducing unit 32A and the disc accommodating unit 33A do not rotate even when an operation of the rotating mechanism 35A is unintentionally started due to an error in the electrical control such as an electric noise. Thus, the disc reproducing unit 32A and the disc accommodating unit 33A are positively maintained in the appropriate, and the conveyance of the disc 11 by the disc conveying mechanism 34A is performed without problems.

Additionally, a collision of the disc 11 which is out of the disc accommodating unit 33A with the disc 11 which is accommodated in the disc accommodating unit 33A can be positively prevented. This prevents damage of the discs due to an accidental collision of the discs. Thus, the disc reproducing unit 32A and disc accommodating unit 33A are positioned close to each other as shown in FIG. 28 under a condition in which reliable operation is assured. Thus, the depth L10 of the disc reproducing apparatus 30A is reduced as much as possible. As a result, since the distance for conveying the disc 11 is short, a time for conveying the disc 11 is reduced.

It should be noted that the connecting mechanism 200 may be in a construction in which the end of the eject lever 109 is engaged with a part of the separation plate 130 of the disc accommodating unit 33A.

A description will now be given, with reference to FIGS. 60 to 62C, of the flap 112 and a flap opening mechanism 113.

Figure 60:
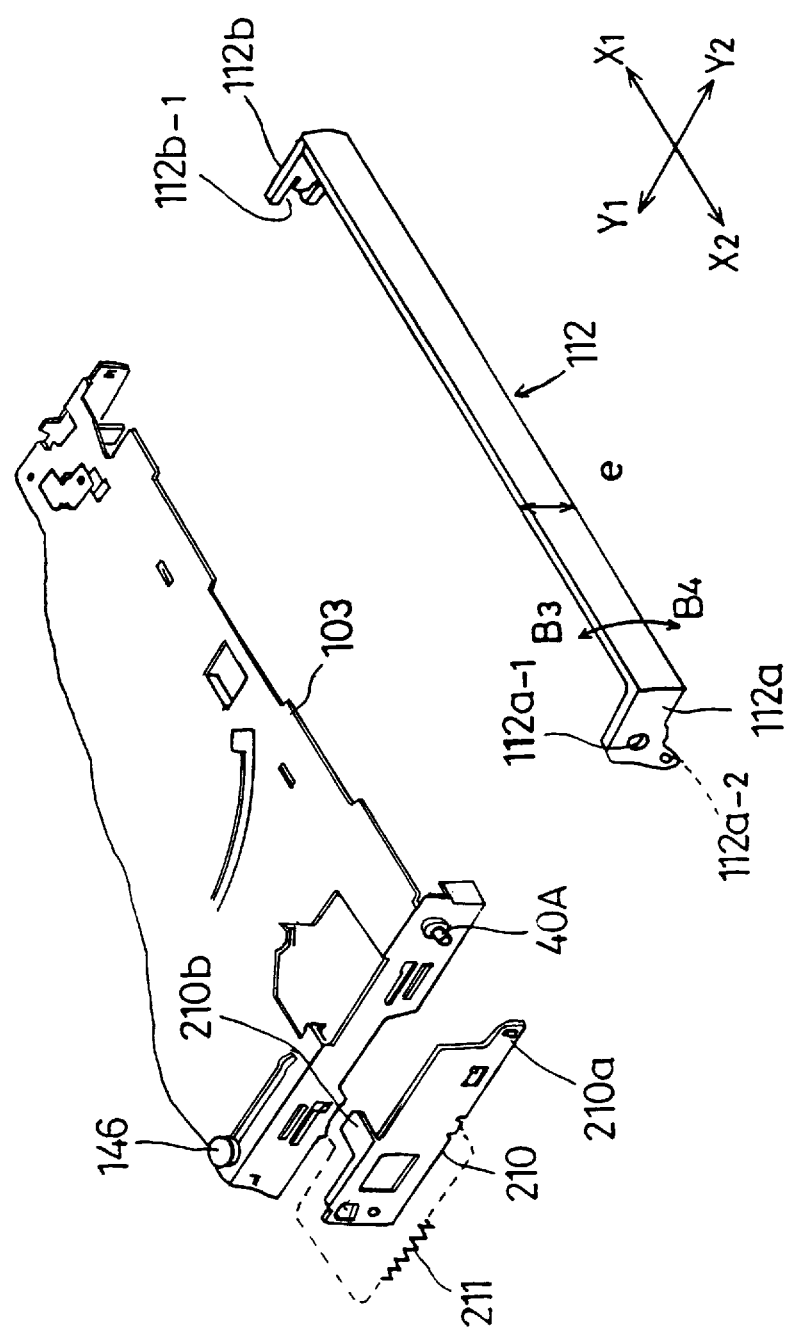
FIG. 60 is an exploded view of a flap opening mechanism.
Figure 61B:
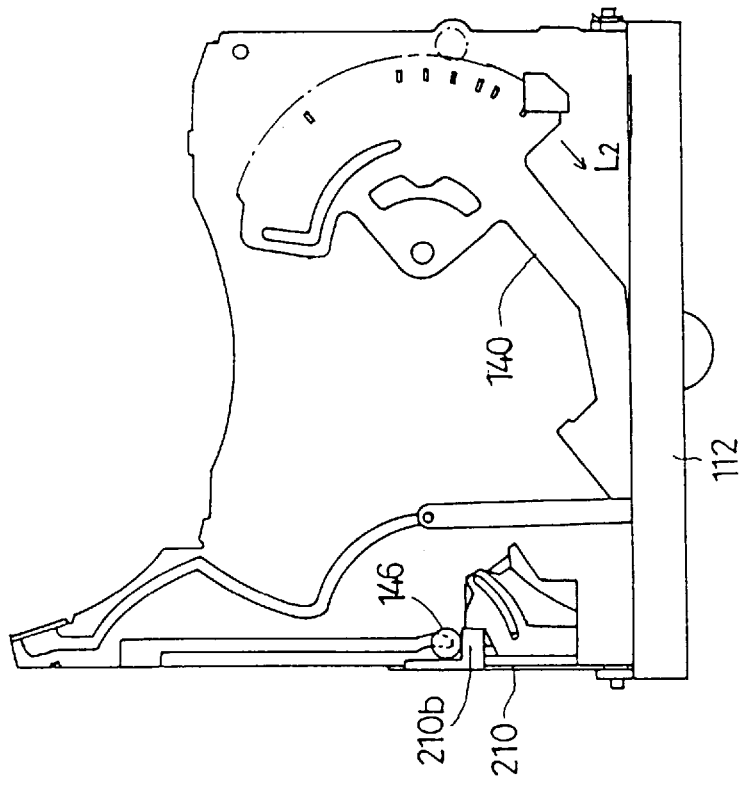
FIGS. 61A and 61B are illustrations for showing states where the flap is open and closed.
Figure 61A:
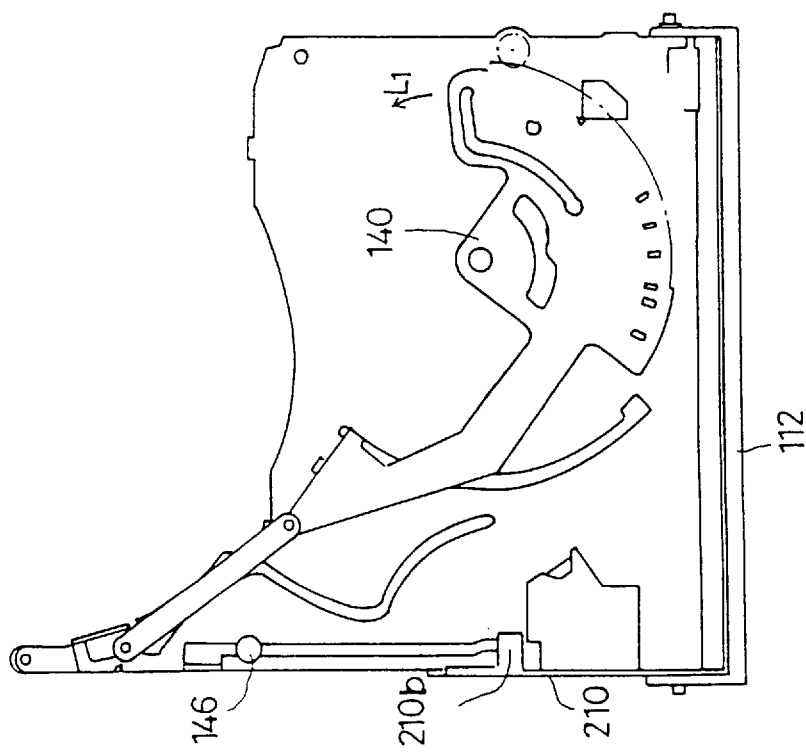

As shown in FIG. 60 and FIG. 61A, the flap 112 has an arm portion 112a on the X2 side and an arm portion 112b on the X1 side. An opening 112a-1 of the arm portion 112a is fit to a pin 40A provided to a side of the chassis 103 of the loading assembly 100, and an opening 112b-1 of the arm portion 112b is fit to a pin 40Aa on the opposite side of the chassis 103 so that the flap 112 is rotatable in the B3–B4 direction.

Figure 62A:
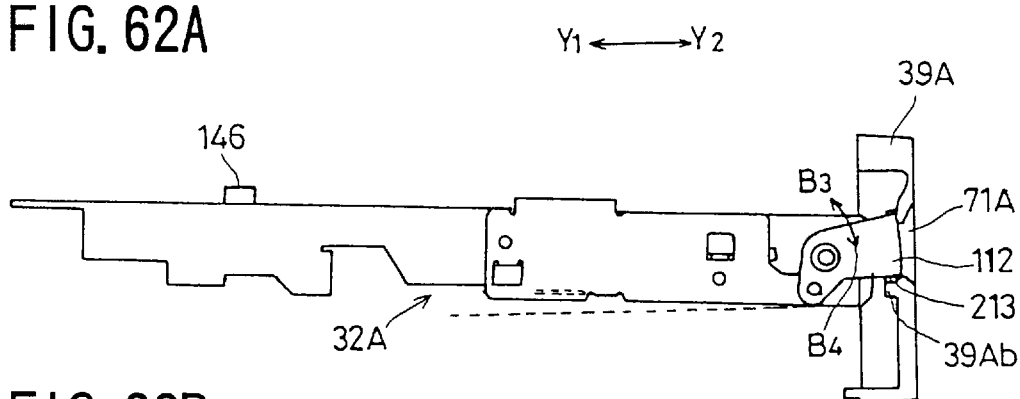
FIGS. 62A, 62B and 62C are illustrations for showing a state of the flap when the disc reproducing unit is rotated.
Figure 62B:
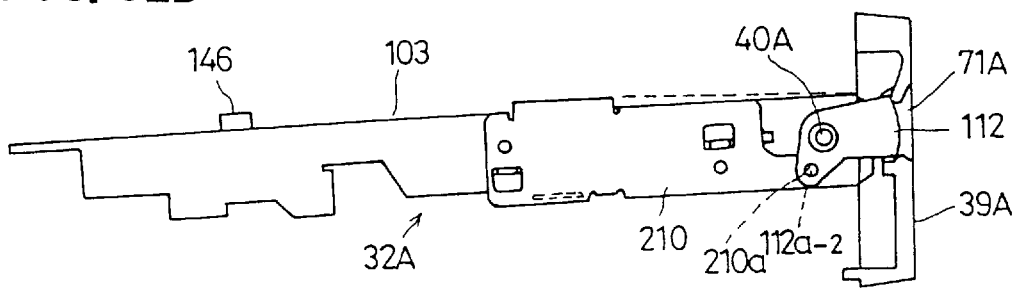

A slider 210 is slidably provided on the X2 side of the chassis 103 in the Y1–Y2 direction. An opening 210a of the slider 210 on the Y2 side is engaged with a pin 112a-2 of the arm portion 112a of the flap 112 so that he flap 112 and the slider 210 are connected to each other. The slider 210 is urged in the Y1 direction by a spring 211 so that the flap 112 is urged in the B4 direction which is a closing direction of the flap 112. The flap 112 closes the opening 71A as shown in FIGS. 62A and 62B.

The slider 210 further comprises a finger 210b. The finger 210b protrudes to a position where the finger 210b can be pressed by the pin 146.

Figure 62C:
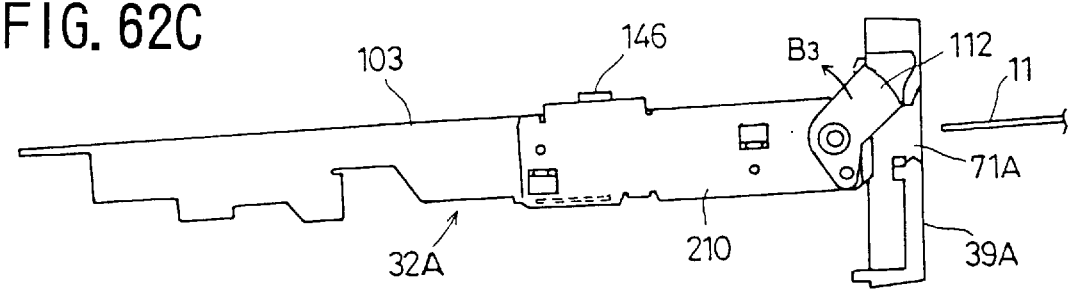

When the disc conveying mechanism 34A is operated to eject the disc 11 from the disc reproducing apparatus 30A, the pin 146 moving in the Y2 direction presses the finger 210b as shown in FIGS. 61B and 62C at the final stage of the operation, that is, immediately before the ejection of the disc 11. Thus the slider 210 is moved in the Y2 direction against a force of the spring 211. This movement of the slider rotates the flap 112 in the B3 direction, and the opening 71A of the front bezel 39A is opened. Immediately after the opening 71A is opened, the disc 11 protrudes from the opening 71A.

The flap 112 is mounted on the chassis of the loading assembly 100, and is urged in the B4 direction to close the opening 71A. When the opening 71A is closed, the flap 112 contacts a sponge 213 provided on a table portion 39Ab protruding on the back side of the opening 71A of the front bezel 39A.

Accordingly, when the rotating mechanism 35A is operated and the disc reproducing unit 32a rotates about the pins 40A and 40Aa as shown in FIGS. 62A and 62B, the flap 112 is allowed to continuously contact the sponge 213 on the table portion 39Ab since the slider 210 can be slightly moved. That is, the rotation of the disc reproducing unit 32A is absorbed by the movement of the slider 210, and the flap 112 is continuously closes the opening 71A. As mentioned above, since the positional relationship between the flap 112 and the front bezel 39A is not changed even when the disc reproducing unit 33A is rotated, there is no need to increase the size (height e) of the flap 112 and the size of the flap can be that sufficiently cover the opening 71A. Thus, the height of the disc reproducing apparatus 30A is reduced.

Additionally, since the flap 112 continuously contacts the sponge 213 on the table portion 39Ab, no gap is formed between the flap 112 and the sponge 213. Thus, a good dust proof function is provided to the opening 71A of the front bezel 39A of the disc reproducing apparatus 30A.

Further, since the flap 112 is positioned on the back side of the front bezel 39A, the flap 112 cannot be an obstacle for taking out the ejected disc 11 even if the disc is taken out while a finger of the operator is inserted in the center opening of the disc 11. Thus, the disc 11 can be taken out easily.

A description will now be given, with reference to FIGS. 63 to 65B, of a structure around the disc insertion opening member 111.

Figure 63:
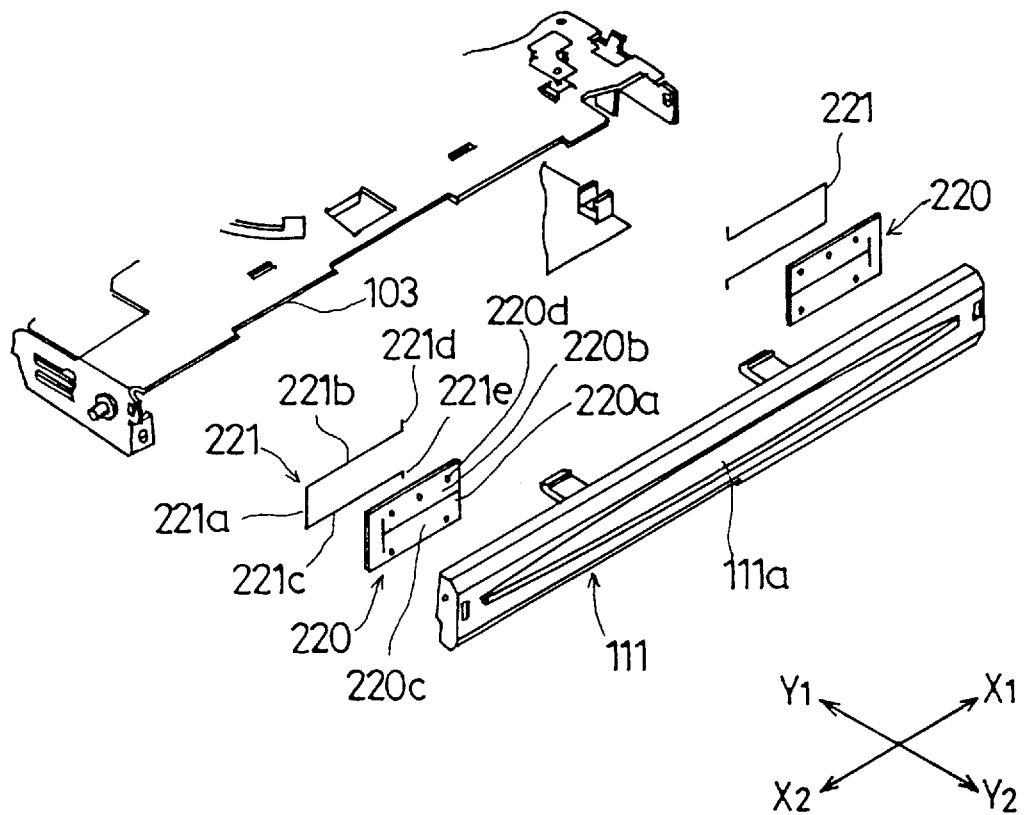
FIG. 63 is an exploded perspective view of a structure around a disc insertion opening member.
Figure 64A:
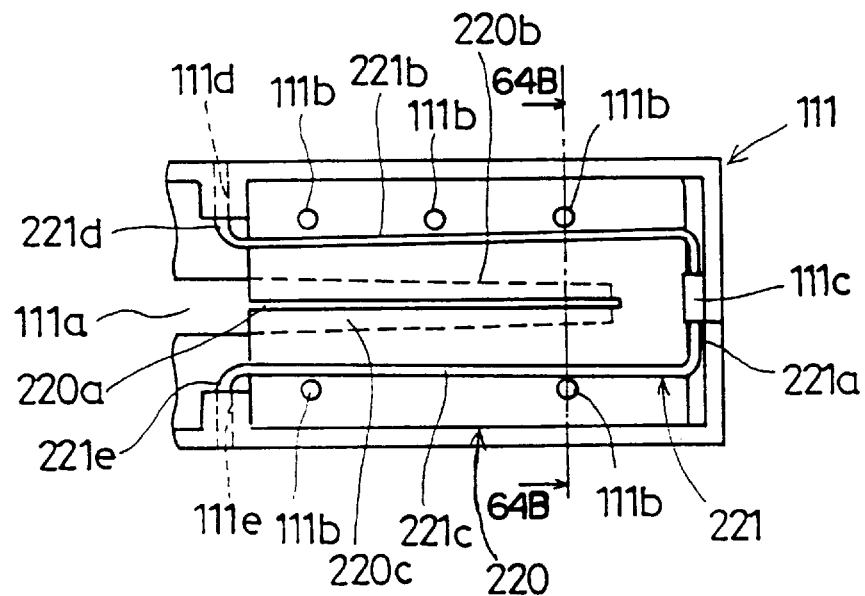
FIGS. 64A and 64B are illustrations for showing a mounting state of a disc supporting member.

A shown in FIGS. 63, 64A and 63B, a disc supporting member 220, which is formed by plastic molding, is mounted on the back side of the disc insertion opening member 111 on the X1 side and the X2 side. The disc supporting member 220 is provided with a plurality of openings 220d which correspond to a plurality of protrusions 111b formed on the back side of the disc insertion opening member 111.

A mounting member 221 comprises three arm portions 221a, 221b and 221c and finger portions 221d and 221e.

Each of the arm portions 221a, 221b and 221c is formed by a wire bent in a U-shape. An end of each of the finger portions 221d and 221e is bent outwardly.

As shown in FIG. 62A, a hook portion 111c and openings 111d and 111e are provided on the back side of the disc insertion opening member 111 in addition to the protrusions 111b. The hook portion 111c is provided for mounting the mounting member 221.

The disc supporting member 220 is positioned by the openings 220d being fit in the corresponding protrusions 111b. In this state, a slit 220a and wing portions 220b and 220c are located within an insertion opening 111a of the disc insertion opening member 111. The disc supporting member 220 is mounted to the back side 111f of the disc insertion opening member 111 by being pressed by the mounting member 221. The mounting member 220 is mounted to the disc insertion opening member 111 so that the arm portion 221b is engaged with the hook portion 111c, and the finger portions 221d and 221e are inserted into the corresponding openings 111d and 111e.

The arm portions 221b and 221c of the mounting member 221 extend along the corresponding protrusions 111 so as to hold the supporting member 220 as shown in FIG. 64A. According to this mounting structure, the disc supporting member is securely mounted on the disc insertion opening member 111 as strongly as is mounted by adhesive.

Figure 65A:
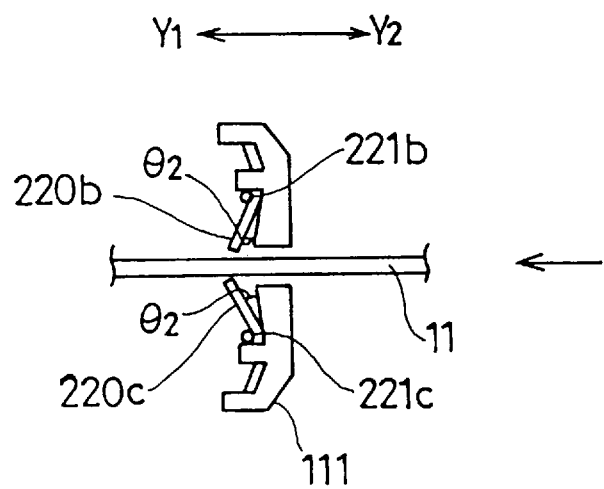
FIGS. 65A and 65B are illustrations for showing a state of the disc supporting member where the disc is being inserted and the disc is being ejected.
Figure 65B:
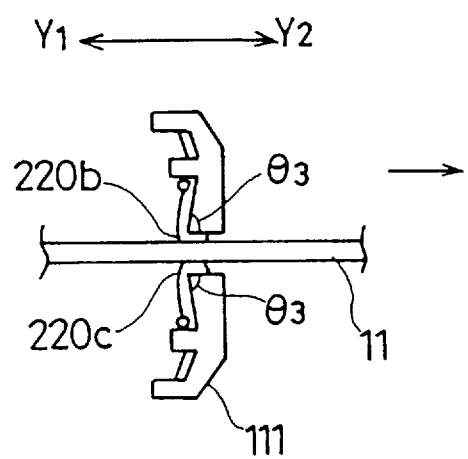

The disc supporting member 220 warps, when the disc 11 is inserted so that the wing portions 220b and 220c elastically bend as shown in FIG. 65A. The bent wing portions 220b and 220c hold the disc 11 therebetween by the returning force. When the disc 11 is ejected, the wing portions 220b and 220c are bent as shown in FIG. 65B so as to hold the disc 11 therebetween. The disc supporting member 220 is rubbed by the disc 11 each time the disc 11 is inserted and ejected, and is worn by friction. Thus, the supporting member is a consumable part which requires replacement after a predetermined period of use. The mounting member 221 can be removed easily by disengaging the finger portions 221d and 221efrom the corresponding openings 111d and 111e. The disc mounting member can be removed by removing the mounting member 221 for replacement. Thus, there is no need to replace the entire disc insertion opening member 111, thereby offering a good maintenance operation.

Figure 64B:
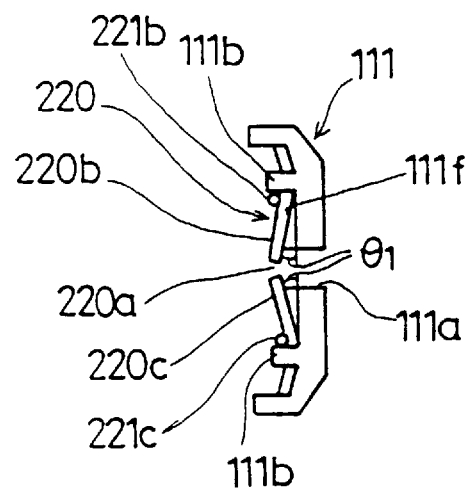

The back side of the disc supporting member 220 facing the back side 111f of the disc insertion opening member 111 is tapered as shown in FIG. 64B. Thus, the wing portions 220b and 220c are inclined, when it is mounted, by an angle θ1 with respect to the Y1–Y2 direction. Accordingly, when the disc 11 is inserted, an angle between the back side 111f and each of the wing portions 220b and 220c is limited to an angle θ2 as shown in FIG. 65A. The angle θ2 is smaller than an angle obtained when the wing potions 220b and 220c are aligned with a vertical plane by the angle θ1. Thus, the elastic returning force of the bent wing portions 220b and 220c is reduced. The resistive force exerted on the disc 11 by the wing portions 220b and 220c when the disc 11 is inserted is reduced, and thus the insertion of the disc 11 can be performed by a relatively small force with good feel.

It should be noted that the center of bending of each of the wing portions 220b and 220c is a position which is pressed by the corresponding arm portions 221b and 221c. That is, the pressed position is away from an edge of the insertion opening 11a in the vertical direction. If the disc supporting member 220 is mounted by adhesive, the center of bending may correspond to the edge of the insertion opening 11a. Thus, in this respect, the bending angle of the wing portions 220b and 220c is smaller than the conventional mounting structure of the mounting member 220.

When the disc 11 protrudes from the opening 71A or the protruding disc 11 is taken out, the wing portions 220*b* and 220*c* are bent by an angle θ3 as shown in FIG. 65B. That is, the bending angle of the wing portions 220*b* and 220*c* is increased by the angle θ1. Thus, the returning force of the wing portions 220*b* and 220*c* is increased, resulting in an increase in the holding force of the disc 11. Thus, even if fingers of the operator slip off the disc 11 when taking the disc from the insertion opening 111*a*, the disc 11 is held by the insertion opening 111*a* and does not fall.

It should be noted that the disc support member 220 may be made of rubber or sponge other than felt.

Additionally, the disc supporting member 220 may be applied to a structure for supporting a card-like recording medium.

A description will now be given, with reference to FIGS. 66 to 68, of a case in which the disc 11 is forcibly removed immediately after the disc conveying mechanism 34A initiates a disc conveying operation when the disc 11 is inserted from outside.

When the disc 11 is conveyed to the disc accommodating unit 33A as shown in FIGS. 22A to 22D and FIG. 66, the disc insertion detecting switch 160 is activated to detect the disc 11 when approximately one half of the disc 11 is inserted into the disc reproducing apparatus 30A. Then, a detector 106 provided in the disc reproducing apparatus 30A is activated to detect the disc 11 when approximately three quarters of the disc 11 are inserted in the disc reproducing apparatus 30A. Thereafter, the disc insertion detecting switch 160 is deactivated.

There is a possibility that the disc 11 could be forcibly removed immediately after conveyance of the disc 11 has been initiated because of a reason such as where the operator realizes that the disc 11 being inserted was incorrectly selected. In the disc reproducing apparatus 30A, measures are taken for such an abnormal operation so that there is no problem in the operation of the disc reproducing apparatus 30A.

That is, a state of the disc insertion detecting switch 160 and the detector 106 is monitored immediately after an operation of the disc conveying mechanism is initiated. If the disc insertion detecting switch 160 is turned off and the detector is turned on, it is determined that the operation is normal and the disc conveying is continued. Otherwise, it is determined that an abnormal condition has occurred and an error signal is generated so that the disc conveying mechanism 34A is returned to the initial state, that is, a state for receiving a disc.

Figure 66:
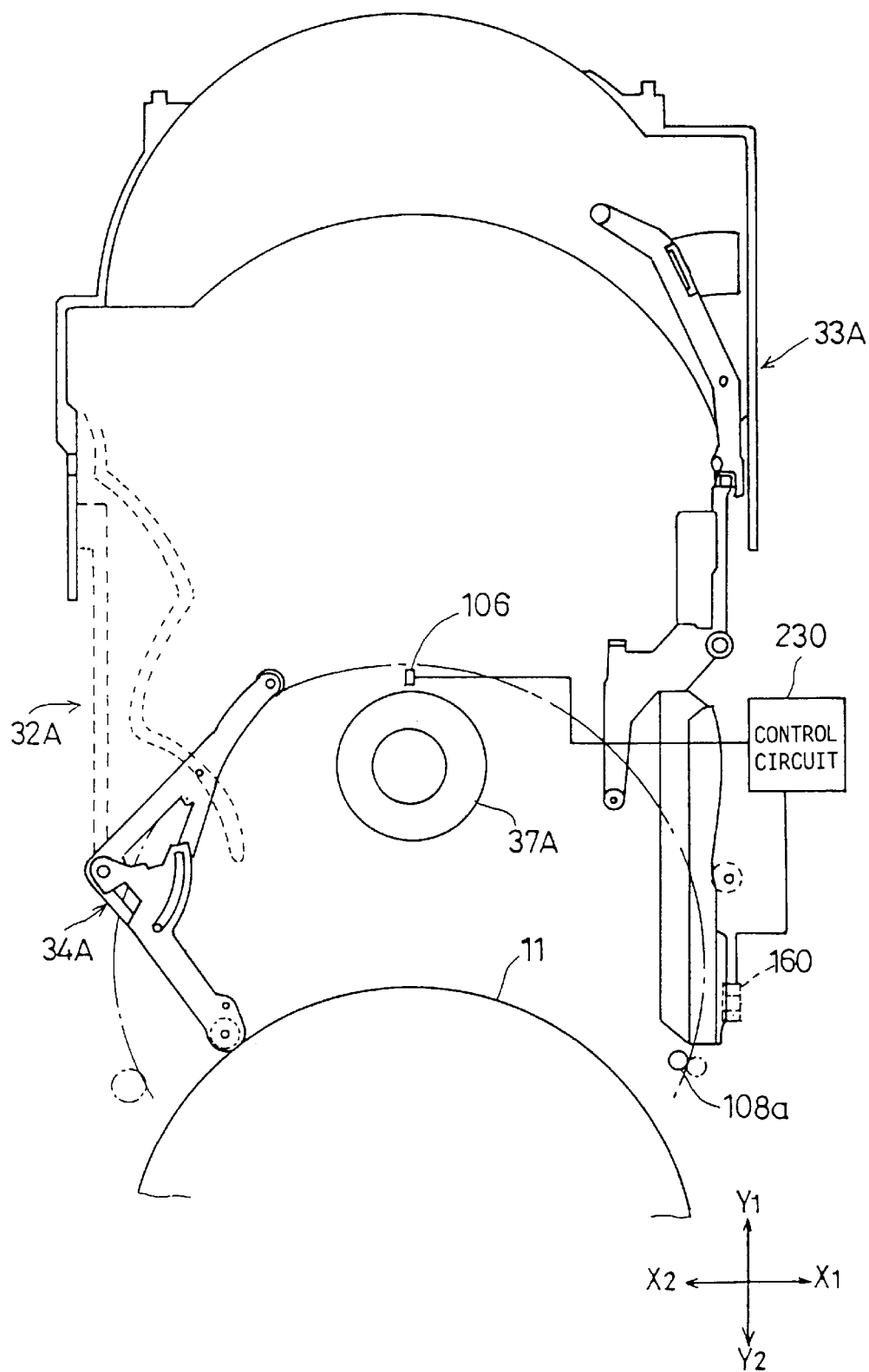
FIG. 66 is an illustration for showing a state where a disc is being inserted.

FIG. 68 is a flowchart of a control operation of a microcomputer provided in a control circuit 230 shown in FIG. 17 and 66.

When a control operation for detecting a disc insertion is started, the detector 106 is activated in step ST1. It is then determined, in step ST2, whether or not the detector 106 detects the disc 11. If it is determined, in step ST2, that the detector 106 is turned on, that is, a disc is detected by the detector 106, the detector 106 is deactivated in step ST3 and the loading motor 174 is reversed in step ST4. Then, if it is determined, in step ST5, that the slit 140*g*-3 is detected, it is determined, in step ST7, whether or not the disc insertion detecting switch 160 is turned off, that is, whether the disc 11 is detected by the disc inserting switch 160. If the determination in step ST7 is affirmative, it is determined, in step ST10, whether or not the detector 106 is turned off, that is, whether the disc 11 is detected by the detector 106. If the determination in step ST10 is affirmative, it is determined, in step ST12, whether or not the slit 140*g*-7 is detected. If the determination in step ST12 is affirmative, the loading motor 174 is stopped in step ST13.

If the determination in step ST7 is negative, or if the determination in step ST10 is negative, the routine proceeds to step ST14 to send an error signal.

It should be noted that the detector 106 is activated and deactivated in the process of steps ST1, ST3, ST9 and ST11 so that a light emitting diode of the detector 106 is turned on only when it is necessary. Additionally, the disc insertion detecting switch 160 is activated and deactivated in the process of steps ST6 and ST8 so that a light emitting diode of the disc insertion detecting switch 160 is turned on only when it is necessary. In FIG. 68, an arrow 231 indicates a time period for turning on the light emitting diode of the disc insertion detecting switch 160, and an arrow 232 indicates a time period for turning on the light emitting diode of the detector 106. That is, the light emitting diodes of the disc insertion detecting switch 160 and the detector 106 are not always turned on but turned on when it is necessary. Thus, power consumption of the light emitting diode is reduced.

Additionally, the slit 140*g*-3 is detected immediately before the flap 112 is closed. In this state, the entire disc is inserted in the apparatus if the loading operation is operated normally. This means that the disc cannot be removed after the slit 140*g*-3 is detected, and thus the removal of disc can be positively prevented.

Additionally, since the determination is made before the flap 122 is closed, the disc is prevented from being damaged due to a collision with the flap 112 being closed. Further, the determination is made before clamping (detection of the slit 140*g*-5), the data on the disc is prevented from being damaged due to the turntable colliding with the disc which is being removed.

It should be noted that the present invention is not limited to the CD-ROM, and may be applied to other discs such as CD, MD and DVD.

The present invention is not limited to the specifically disclosed embodiments, and variations and modifications may be made without departing from the scope of the present invention.

What is claimed is:

1. A recording medium reproducing apparatus for reproducing a selected one of a plurality of recording media accommodated therein, said recording medium reproducing apparatus comprising:

a recording medium reproducing unit reproducing one of said recording media;

a recording medium accommodating unit having a plurality of recording medium accommodating sections each accommodating one of said recording media;

a recording medium conveying mechanism conveying said recording media between said recording medium reproducing unit and said recording medium accommodation unit;

a recording medium reproducing unit supporting mechanism rotatably supporting said recording medium reproducing unit;

a recording medium accommodating unit supporting mechanism rotatably supporting said recording medium accommodating unit; and a rotating mechanism rotating both said recording medium reproducing unit and said recording medium accommodating unit when said one of said recording medium is conveyed between said recording medium reproducing unit and said recording medium accommodating unit so that said recording medium reproducing unit is substantially aligned with one of said recording medium accommodating sections, said rotating mechanism including a driving unit rotating one of said recording medium reproducing unit and said recording medium accommodating unit, said rotating mechanism further including a link arm having a first end and a second end opposite said first end, said first end engaging said recording medium reproducing unit, said second end engaging said recording medium accommodating unit, said link arm being rotatably supported at a position between said first end and said second end thereof so that one of said recording medium reproducing unit and said recording medium accommodating unit is rotated when the other one of said recording medium reproducing unit and said recording medium accommodating unit is rotated.

2. The recording medium reproducing apparatus as claimed in claim 1, wherein said rotating mechanism is engaged with both said recording medium reproducing unit and said recording medium accommodating unit so that said recording medium reproducing unit and said recording medium accommodating unit are rotated substantially simultaneously in reverse directions to each other.

3. The recording medium reproducing apparatus as claimed in claim 1, wherein said recording medium reproducing unit supporting mechanism rotatably supports said recording medium reproducing unit at a first position on a side opposite to said recording medium accommodating unit, and said recording medium accommodating unit supporting mechanism rotatably supports said recording medium accommodating unit at a second position on a side opposite to said recording medium reproducing unit.

4. The recording medium reproducing apparatus as claimed in claim 3, further comprises an insertion opening for inserting a recording medium from outside said recording medium reproducing apparatus into said recording medium reproducing unit, said insertion opening being located adjacent to said first position at which said recording medium reproducing unit is rotatably supported.

5. The recording medium reproducing apparatus as claimed in claim 1, wherein said recording media are disc-like recording media, and each of said recording medium accommodating sections has a holding member holding said one of said recording media accommodated therein, said holding member having a first end and a second end opposite to said first end, said holding member being rotatable at a position between said first end and said second end so that said first end contacts an outer edge of each said disc-like recording medium so as to hold said disc-like recording medium within a corresponding one of said recording medium accommodating sections and said second end presses said disc-like recording medium when said one of said recording media is conveyed toward said recording medium reproducing unit.

6. The recording medium reproducing apparatus as claimed in claim 5, wherein said recording medium conveying mechanism comprises a supporting mechanism having a first contact member and a second contact member contacting said disc-like recording medium to be conveyed, said first and second contact members contacting an outer edge of said disk-like recording medium on a side substantially opposite to said holding member.

* * * * *